United States Patent
Pennington et al.

(10) Patent No.: US 12,441,710 B2
(45) Date of Patent: *Oct. 14, 2025

(54) SUBSTITUTED PIPERIDINO COMPOUNDS AND RELATED METHODS OF TREATMENT

(71) Applicant: Alkermes, Inc., Waltham, MA (US)

(72) Inventors: Lewis D. Pennington, Arlington, MA (US); Younggi Choi, Stow, MA (US); Hoan Huynh, Waltham, MA (US); Brian M. Aquila, Marlborough, MA (US); Ingo Andreas Mugge, Waltham, MA (US); Yuan Hu, Waltham, MA (US); James R. Woods, Waltham, MA (US); Brian Kenneth Raymer, Holliston, MA (US); Jörg Martin Bentzien, White Plains, NY (US); Jonathan Ward Lehmann, Burlington, MA (US); Srinivasa Karra, Pembroke, MA (US); Roman A. Valiulin, Cambridge, MA (US); Daljit Matharu, Lexington, MA (US)

(73) Assignee: Alkermes, Inc., Waltham, MA (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/230,329

(22) Filed: Aug. 4, 2023

(65) Prior Publication Data

US 2024/0076283 A1 Mar. 7, 2024

Related U.S. Application Data

(63) Continuation of application No. 17/556,295, filed on Dec. 20, 2021, now Pat. No. 11,760,747.

(60) Provisional application No. 63/128,511, filed on Dec. 21, 2020.

(51) Int. Cl.
| | | |
|---|---|---|
| *C07D 401/14* | (2006.01) | |
| *A61P 25/26* | (2006.01) | |
| *C07D 211/98* | (2006.01) | |
| *C07D 401/04* | (2006.01) | |
| *C07D 471/04* | (2006.01) | |
| *C07D 487/04* | (2006.01) | |

(52) U.S. Cl.
CPC ............ *C07D 401/14* (2013.01); *A61P 25/26* (2018.01); *C07D 211/98* (2013.01); *C07D 401/04* (2013.01); *C07D 471/04* (2013.01); *C07D 487/04* (2013.01)

(58) Field of Classification Search
CPC ...................................................... A61P 25/26
See application file for complete search history.

(56) References Cited

U.S. PATENT DOCUMENTS

| | | |
|---|---|---|
| 5,635,599 A | 6/1997 | Pastan et al. |
| 6,428,985 B1 | 8/2002 | Bromberg et al. |
| 6,492,492 B1 | 12/2002 | Stayton et al. |
| 6,808,902 B1 | 10/2004 | Treuheit et al. |
| 7,211,253 B1 | 5/2007 | Way |
| 7,271,149 B2 | 9/2007 | Glaesner et al. |
| 7,696,322 B2 | 4/2010 | Bleck et al. |
| 7,829,679 B2 | 11/2010 | Ushida et al. |
| 7,928,074 B2 | 4/2011 | Khare |
| 8,063,182 B1 | 11/2011 | Brockhaus et al. |
| 8,163,522 B1 | 4/2012 | Brockhaus et al. |
| 8,258,163 B2 | 9/2012 | Yanagisawa et al. |
| 8,765,669 B2 | 7/2014 | Kajihara et al. |
| 8,933,197 B2 | 1/2015 | Stemmer et al. |
| 9,527,807 B2 | 12/2016 | Fukumoto et al. |
| 9,611,262 B2 | 4/2017 | Shireman et al. |
| 9,815,787 B2 | 11/2017 | Nagase et al. |
| 10,017,481 B2 | 7/2018 | Obrecht et al. |
| 10,287,305 B2 | 5/2019 | Fujimoto et al. |
| 10,351,522 B2 | 7/2019 | Nagase et al. |
| 10,377,770 B2 | 8/2019 | Aversa et al. |
| 10,428,023 B2 | 10/2019 | Kajita et al. |
| 10,508,083 B2 | 12/2019 | Fujimoto et al. |
| 10,584,097 B2 | 3/2020 | Kajita et al. |
| 10,898,737 B2 | 1/2021 | Fujimoto et al. |
| 11,472,805 B2 | 10/2022 | Chappie et al. |
| 11,479,552 B2 | 10/2022 | Yoshida et al. |
| 11,760,747 B2 * | 9/2023 | Pennington .......... C07D 401/06 514/259.31 |
| 2002/0127227 A1 | 9/2002 | Holmes et al. |
| 2002/0159969 A1 | 10/2002 | Agrawal et al. |
| 2003/0073822 A1 | 4/2003 | Lofling et al. |

(Continued)

FOREIGN PATENT DOCUMENTS

| | | |
|---|---|---|
| CN | 101962413 A | 2/2011 |
| CN | 107787322 A | 3/2018 |

(Continued)

OTHER PUBLICATIONS

Cox, C. D., et al., "Conformational analysis of N,N-disubstituted-1,4-diazepane orexin receptor antagonists and implications for receptor binding", Bioorganic & Medicinal Chemistry Letters, 19(11), DOI:10. 1016/J.BMCL.2009. 04.026, 2009, 2997-3001.

Irukayama-Tomobe, Y. , et al., "Nonpeptide orexin type-2 receptor agonist ameliorates narcolepsy-cataplexy symptoms in mouse models", PNAS, vol. 114, No. 22, 5731-5736.

McGaughey, G. , et al., "Shaping suvorexant: application of experimental and theoretical methods for driving synthetic designs", J. Comput. Aided Mol. Des., 28, 5-12.

Nagahara, T. , et al., "Design and Synthesis of Non-Peptide, Selective Orexin Receptor 2 Agonists", J. Med. Chem., 58, 7931-7937.

(Continued)

*Primary Examiner* — Jeffrey S Lundgren
*Assistant Examiner* — Eric Tran
(74) *Attorney, Agent, or Firm* — Elmore Patent Law Group, P.C.; Joseph C. Zucchero; Carolyn S. Elmore

(57) ABSTRACT

The present invention provides compounds useful for the treatment of narcolepsy or cataplexy in a subject in need thereof. Related pharmaceutical compositions and methods are also provided herein.

47 Claims, No Drawings

(56) References Cited

U.S. PATENT DOCUMENTS

| | | |
|---|---|---|
| 2003/0229226 A1 | 12/2003 | Okamoto et al. |
| 2004/0137580 A1 | 7/2004 | Holgersson et al. |
| 2005/0069552 A1 | 3/2005 | Bleck et al. |
| 2005/0260222 A1 | 11/2005 | Gupta et al. |
| 2005/0265995 A1 | 12/2005 | Tomlinson et al. |
| 2006/0110429 A1 | 5/2006 | Reiff et al. |
| 2007/0105767 A1 | 5/2007 | Kharbanda et al. |
| 2008/0045493 A1 | 2/2008 | Drescher et al. |
| 2008/0286211 A1 | 11/2008 | Barker et al. |
| 2009/0054489 A1 | 2/2009 | Hauske |
| 2010/0016547 A1 | 1/2010 | Ito et al. |
| 2010/0227394 A1 | 9/2010 | Bleck et al. |
| 2010/0285014 A1 | 11/2010 | Cox et al. |
| 2013/0217864 A1 | 8/2013 | Cho et al. |
| 2013/0295084 A1 | 11/2013 | Hunter et al. |
| 2013/0316404 A1 | 11/2013 | Roers et al. |
| 2013/0336925 A1 | 12/2013 | Alvarez et al. |
| 2014/0024650 A1 | 1/2014 | Fukumoto et al. |
| 2014/0056895 A1 | 2/2014 | Baurin et al. |
| 2014/0072581 A1 | 3/2014 | Dixit et al. |
| 2014/0234962 A1 | 8/2014 | Alvarez et al. |
| 2015/0071948 A1 | 3/2015 | Lazar et al. |
| 2016/0068583 A1 | 3/2016 | McCauley et al. |
| 2016/0175458 A1 | 6/2016 | Alvarez et al. |
| 2017/0114098 A1 | 4/2017 | Aivado et al. |
| 2017/0226137 A1 | 8/2017 | Fujimoto et al. |
| 2017/0233447 A1 | 8/2017 | Qin |
| 2018/0179151 A1 | 6/2018 | Nagase et al. |
| 2018/0289825 A1 | 10/2018 | Alvarez et al. |
| 2019/0031611 A1 | 1/2019 | Fujimoto et al. |
| 2019/0040010 A1 | 2/2019 | Kajita et al. |
| 2019/0167590 A1 | 6/2019 | Zamloot et al. |
| 2020/0017444 A1 | 1/2020 | Kajita et al. |
| 2020/0115399 A1 | 4/2020 | Fujimoto et al. |
| 2020/0207715 A1 | 7/2020 | Kajita et al. |
| 2020/0207734 A1 | 7/2020 | Kajita et al. |
| 2020/0247747 A1 | 8/2020 | Hattori et al. |
| 2020/0255403 A1 | 8/2020 | Bogen et al. |
| 2020/0385345 A1 | 12/2020 | Daini et al. |
| 2020/0385346 A1 | 12/2020 | Fujimoto et al. |
| 2020/0392149 A1 | 12/2020 | Mikami et al. |
| 2021/0078955 A1 | 3/2021 | Nagase et al. |
| 2021/0155636 A1 | 5/2021 | Pennington et al. |
| 2021/0198240 A1 | 7/2021 | Oda et al. |
| 2021/0269420 A1 | 9/2021 | Fujimoto et al. |
| 2022/0017514 A1 | 1/2022 | Kajita et al. |
| 2022/0017517 A1 | 1/2022 | Yoshida et al. |
| 2022/0081441 A1 | 3/2022 | Ideue et al. |
| 2022/0194926 A1 | 6/2022 | Pennington et al. |
| 2023/0037557 A1 | 2/2023 | Ito et al. |
| 2023/0042358 A1 | 2/2023 | Miyanohana et al. |
| 2023/0192692 A1 | 6/2023 | Li et al. |

FOREIGN PATENT DOCUMENTS

| | | | |
|---|---|---|---|
| CN | 108699065 A | | 10/2018 |
| EP | 2836485 B1 | | 1/2018 |
| EP | 3191468 B1 | | 12/2018 |
| EP | 3663281 A1 | | 6/2020 |
| EP | 3816154 A1 | | 5/2021 |
| EP | 3895707 A1 | | 10/2021 |
| EP | 3896060 A1 | | 10/2021 |
| JP | 2003508023 A | | 3/2003 |
| JP | 2003513656 A | | 4/2003 |
| JP | 2003514552 A | | 4/2003 |
| JP | 2004528014 A | | 9/2004 |
| JP | 2006517191 A | | 7/2006 |
| JP | 2008521489 A | | 6/2008 |
| JP | 2010536341 A | | 12/2010 |
| JP | 2022064180 A | | 4/2022 |
| WO | 1999046392 A1 | | 9/1999 |
| WO | 0103737 A1 | | 1/2001 |
| WO | 0158950 A1 | | 8/2001 |
| WO | 2002062375 A1 | | 8/2002 |
| WO | 2004033651 A2 | | 4/2004 |
| WO | 2004044006 A1 | | 5/2004 |
| WO | 2004101740 A2 | | 11/2004 |
| WO | 2005034863 A2 | | 4/2005 |
| WO | 2007020889 A1 | | 2/2007 |
| WO | 2007062844 A1 | | 6/2007 |
| WO | 2007063907 A1 | | 6/2007 |
| WO | 2008140595 A2 | | 11/2008 |
| WO | 2009153960 A1 | | 12/2009 |
| WO | 2010018233 A1 | | 2/2010 |
| WO | 2010127029 A1 | | 11/2010 |
| WO | 2010150192 A1 | | 12/2010 |
| WO | 2011076781 A1 | | 6/2011 |
| WO | 2011090762 A1 | | 7/2011 |
| WO | 2011122923 A2 | | 10/2011 |
| WO | 2012137982 A2 | | 10/2012 |
| WO | 2012146628 A1 | | 11/2012 |
| WO | 2012178137 A1 | | 12/2012 |
| WO | 2013026833 A1 | | 2/2013 |
| WO | 2013139697 A1 | | 9/2013 |
| WO | 2013184942 A1 | | 12/2013 |
| WO | 2014018572 A2 | | 1/2014 |
| WO | 2014023673 A1 | | 2/2014 |
| WO | 2014151910 A1 | | 9/2014 |
| WO | 2014198880 A1 | | 12/2014 |
| WO | 2015017548 A2 | | 2/2015 |
| WO | 2015117930 A1 | | 8/2015 |
| WO | 2016082677 A1 | | 6/2016 |
| WO | 2016100788 A1 | | 6/2016 |
| WO | 2016101119 A1 | | 6/2016 |
| WO | 2016133160 A1 | | 8/2016 |
| WO | 2017035354 A1 | | 3/2017 |
| WO | WO-2017135306 A1 * | 8/2017 | ........... A61K 31/435 |
| WO | 2017165464 A1 | | 9/2017 |
| WO | 2018005226 A2 | | 1/2018 |
| WO | 2019027058 A1 | | 2/2019 |
| WO | 2019063605 A1 | | 4/2019 |
| WO | 2019191327 A1 | | 10/2019 |
| WO | 2020004536 A1 | | 1/2020 |
| WO | 2020004537 A1 | | 1/2020 |
| WO | 2020122092 A1 | | 6/2020 |
| WO | 2020122093 A1 | | 6/2020 |
| WO | 2020158958 A1 | | 8/2020 |
| WO | 2020167701 A1 | | 8/2020 |
| WO | 2020167706 A1 | | 8/2020 |
| WO | 2021026047 A1 | | 2/2021 |
| WO | 2021048821 A1 | | 3/2021 |
| WO | 2021106975 A1 | | 6/2021 |
| WO | 2021108628 A1 | | 6/2021 |
| WO | 2021142083 A1 | | 7/2021 |
| WO | 2022014680 A1 | | 1/2022 |
| WO | 2022040058 A1 | | 2/2022 |
| WO | 2022040070 A1 | | 2/2022 |
| WO | 2022051583 A1 | | 3/2022 |
| WO | 2022051596 A1 | | 3/2022 |
| WO | 2022094012 A1 | | 5/2022 |
| WO | 2022109117 A1 | | 5/2022 |
| WO | 2022119888 A1 | | 6/2022 |
| WO | 2022132696 A1 | | 6/2022 |
| WO | 2022140316 A1 | | 6/2022 |
| WO | 2022140317 A1 | | 6/2022 |
| WO | 2022187231 A1 | | 9/2022 |
| WO | 2022207935 A1 | | 10/2022 |
| WO | 2022233872 A1 | | 11/2022 |
| WO | 2022250108 A1 | | 12/2022 |
| WO | 2022269049 A1 | | 12/2022 |
| WO | 2023017180 A1 | | 2/2023 |

OTHER PUBLICATIONS

Sabnis, R. W., "Novel 5-Alkyl Pyrrolidine Orexin Receptor Agonists for Treating Sleep Disorders", ACS Med. Chem. Lett., vol. 11, 11 (online at https://dx.doi.org/10.1021/acsmedchemlett.0c00501), Sep. 29, 2020, 2085-2086.

Turku, A., et al., "Orexin receptor agonist Yan 7874 is a weak agonist of orexin/hypocretin receptors and shows orexin receptor-independent cytotoxicity", PLOS ONE, 12(6): e0178526 (online at doi:10.1371/journal.pone.0178526), 1-15.

(56) References Cited

OTHER PUBLICATIONS

Yukitake, H., et al., "TAK-925, an orexin 2 receptor-selective agonist, shows robust wakepromoting effects in mice", Pharmacology, Biochemistry and Behavior, 187, 172794.
Publications Related to P18510-IL1RA Human, www.uniprot.org.
Uniprot Protein Database, Protein Accession Q8N3074, Human Mucin 20, accessed on Oct. 16, 2016.
"3-(Cycohexylmethoxy)piperidine", PubChem, CID 43196817, create date Jul. 21, 2009.
"4-[Pyrrolidin-3-yloxy)methyl]piperidine", Pubchem CID 130141993, Create date: Oct. 7, 2017.
Arai, R., et al., "Design of the linkers which effectively separate domains of a bifunctional fusion protein", Protein Eng, 14(8), 529-532, 2001.
Cao, W., et al., "Tim-4 inhibition of T-cell activation and T helper type 17 differentiation requires both the immunoglobuln V and mucin domains and occurs via the mitogen-activated protein kinase pathway", Immunology, 133, 179-189, 2011.
Chen, X., et al., "Fusion Protein Linkers: Property, Design and Functionality", Advanced Drug Delivery Reviews, 65, 1357-1369, 2012.
Czajkowsky, D. M., et al., "Fc-fusion proteins: new developments and future perspectives", EMBO Mol Med, 4(10)DOI 10.1002/emmm.201201379, Jul. 26, 2012, 1015-1028.
Ding, Y., et al., "A Single Amino Acid Determines the Immunostimulatory Activity of Interleukin 10", J. Exp. Med., 191(2), 213-223, 2000.
Fontenot, D., et al., "Human Immunodeficiency Virus (HIV) antigens: Structure and Serology of Multivalent Human Mucin MUC1-HIV V3 Chimeric Proteins", PNAS, 92, 315-319, 1995.
Hasanain, S., "Effect of Topical IL-1 RA On Signs And Symptoms Of Dry Eye Disease In Patients With Ocular Graftversus—host Disease (GVHD)", ARVO Annual Meeting, 53, Abstract 579, 2012.
Linderholm, A. L, et al., "Immunoglobulin Fc-Fusion Proteins Part 2: Therapeutic Uses and Clinical Development", Bioprocess Intl, 12(10), Nov. 1, 2014, 1-7, 2014.
Nomellini, J. F, et al., "S-Layer-Mediated Display of the Immunoglobulin G-Binding Domain of Streptococcal Protein G on the Surface of Caulobacter crescenius: Development of an Immunoactive Reagent", Appl. Environ. Micro Biol., 73(10), 2007, 3245-3253, 2007.
Shen, H., et al., "Deletion of the Linker Connecting the Catalytic and Cellulose-Binding Domains of Endoglucanase A (CenA) of Cellulomonas fimi Alters Its Conformation and Catalytic Activity", The Journal of Biological Chemistry, 266(17), 11335-11340, 1991.
Shimamoto, G., et al., "Peptibodies: A flexible alternative format to antibodies", MABS, 4(5), 586-591, 2012.
Vallee, S., et al., "Pulmonary Administration of Interferon Beta-1a-Fc Fusion Protein in Non-Human Primates Using an Immunoglobulin Transport Pathway", J linterferon & Cytokine Res, 32(4), 178-184, 2012.
Wriggers, W., et al., "Control of Protein Functional Dynamics by Peptide Linkers", Biopolymers (Peptide Science), 80, 736-746, 2005.
Wu, B., et al., "Pharmacokinetics of Peptide-Fe Fusion Proteins", J Pharm Sci., 103(1), 53-64, 2014.
Yoon, S., et al., "Conformational changes mediate interleukin-10 receptor 2 (IL-10R2) binding to IL-10 and assembly of the signaling complex", J Biol Chem., 281(46), 35088-96, 2006.
Zhang, J., et al., "Design and optimization of a linker for fusion protein construction", Progress in Natural Science, 19, 1197-1200, 2009.
Zhao, L., et al., "Eradication of non-Hodgkin lymphoma through the induction of tumor-specific T-cell immunity by CD20-Flex BiFP", Blood, 122(26), 4230-6, 2013.
Zheng, X. X, et al., "Administration of noncytolytic IL-10/Fc in murine models of lipopolysaccharide-induced septic shock and allogeneic islet transplantation", J. Immunol., 154(10), May 15, 1995, 5590-5600.
Zheng, X. X, et al., "I L-2 receptor-targeted cytolytic IL-2/Fc fusion protein treatment blocks diabetogenic autoimmunity in nonobese diabetic mice", J. Immunol., 163(7), Oct. 1, 1999, 4041-4048.
Zheng, X. X, et al., "Noncytolytic IL-10/Fc fusion protein prevents diabetes, blocks autoimmunity, and promotes suppressor phenomena in NOD mice", J. Immunol., 158(9), May 1, 1997, 4507-4513.

\* cited by examiner

SUBSTITUTED PIPERIDINO COMPOUNDS AND RELATED METHODS OF TREATMENT

RELATED APPLICATIONS

This application is a continuation of U.S. application Ser. No. 17/556,295, filed on Dec. 20, 2021, which claims the benefit of U.S. Provisional patent application Ser. No. 63/128,511, filed on Dec. 21, 2020. The entire contents of the above-identified applications are herein incorporated by reference.

TECHNICAL FIELD

The present invention relates to substituted piperidino compounds, particularly, substituted piperidino compounds having agonist activity.

BACKGROUND OF THE INVENTION

Orexin is a neuropeptide synthesized and released by a subpopulation of neurons within the lateral hypothalamus and its surrounding regions. It consists of two subtypes: orexin A and orexin B. Orexin A and orexin B bind to orexin receptors. Orexin receptors are G protein-coupled receptors expressed preferentially in the brain. There are two subtypes (type 1 and type 2) of orexin receptors (Cell, Vol. 92, 573-585, 1998). Activation of orexin receptors is known to be important for a variety of central nervous system functions, such as maintenance of wakefulness, energy homeostasis, reward processing and motivation (Saper et al., TRENDS in Neuroscience 2001; Yamanaka et al., Neuron 2003; Sakurai, Nature Reviews Neuroscience 2014).

Narcolepsy is a neurological disease that results in excessive daytime sleepiness, sudden bouts of muscular paralysis (cataplexy), and disrupted sleep patterns (Mahoney et al., Nature Reviews Neuroscience, 2019). It is known that narcolepsy is caused by the degeneration of orexin neurons. Narcoleptic symptoms can be modeled in transgenic mice engineered to degenerate orexin neurons, and their symptoms can be reversed by intraventricular administration of orexin peptides (Proc. Natl. Acad. Sci. USA, Vol. 101, 4649-4654, 2004). Studies of orexin-2 receptor knockout mice have suggested that the orexin-2 receptor plays a preferential role in maintaining wakefulness (Cell, Vol. 98, 437-451, 1999, Neuron, Vol. 38, 715-730, 2003). As such, orexin-2 receptor agonists can be therapeutic agents for narcolepsy or other disorders exhibiting excessive daytime sleepiness, such as Parkinson's disease (CNS Drugs, Vol. 27, 83-90, 2013; Brain, Vol. 130, 2007, 1586-1595).

A compound having agonist activity at the orexin-2 receptor is hypothesized to be useful as a novel therapeutic agent for narcolepsy, idiopathic hypersomnia, hypersomnia, sleep apnea syndrome, disturbance of consciousness such as coma and the like, narcolepsy syndrome, hypersomnolence syndrome characterized by hypersomnia (e.g., in Parkinson's disease, Guillain-Barre syndrome or Kleine Levin syndrome), Alzheimer's disease, obesity, insulin resistance syndrome, cardiac failure, diseases related to bone loss, or sepsis and the like. (Cell Metabolism, Vol. 9, 64-76, 2009; Neuroscience, Vol. 121, 855-863, 2003; Respiration, Vol. 71, 575-579, 2004; Peptides, Vol. 23, 1683-1688, 2002; WO 2015/073707; Journal of the American College of Cardiology, Vol. 66, 2015, pages 2522-2533; WO 2015/048091; WO 2015/147240).

Some compounds having orexin-2 receptor agonist activity have been reported (U.S. Pat. No. 8,258,163; WO 2015/088000; WO 2014/198880; Journal of Medicinal Chemistry, Vol. 58, pages 7931-7937; US 20190040010; US 20190031611; US 20170226137). However, it is considered that these compounds are not satisfactory, for example, in terms of activity, pharmacokinetics, permeability into the brain/central nervous system or safety, and the development of an improved compound having orexin-2 receptor agonist activity is desired.

SUMMARY OF THE INVENTION

The present invention aims to provide substituted piperidino compounds having orexin-2 receptor agonist activity.

Accordingly, in an initial aspect, the present invention provides a compound represented by Formula I-A or a pharmaceutically acceptable salt thereof:

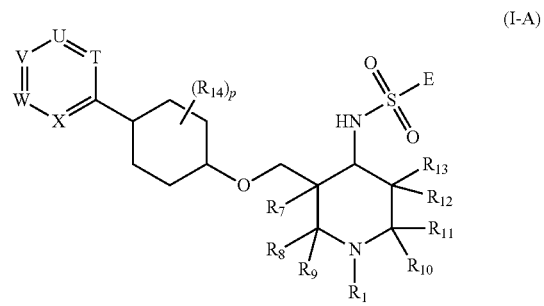

(I-A)

or a pharmaceutically acceptable salt thereof;
wherein:
T is $CR_6$ or N;
U is $CR_5$ or N;
V is $CR_4$ or N;
W is $CR_3$ or N;
X is $CR_2$ or N;
and provided that

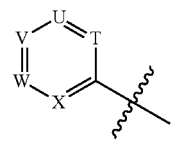

includes no more than 3 nitrogen atoms in the ring;
E is selected from the group consisting of $NR_aR_b$, $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, and $C_1$-$C_3$ alkylene-(4- to 10-membered heterocyclyl) wherein the $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl;
$R_a$ and $R_b$ are each, independently, H or unsubstituted $C_1$-$C_3$ alkyl;
$R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted or substituted with one or more halogen, hydroxyl, unsubstituted $C_1$-$C_3$ alkyl, or $C_1$-$C_3$ alkyl substituted with one or more halogen or deuterium;

$R_c$ and $R_d$ are each, independently, H, unsubstituted $C_1$-$C_3$ alkyl, or $C_1$-$C_3$ alkyl substituted with one or more halogen or deuterium;

n is 0 or 1;

each of $R_2$, $R_3$, $R_4$, $R_5$, and $R_6$, when present, is, independently, selected from the group consisting of H, halogen, deuterium, hydroxyl, cyano, unsubstituted $C_1$-$C_3$alkyl, and $C_1$-$C_3$alkyl substituted with one or more halogen or deuterium;

each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium;

or, alternatively, $R_8$ and $R_{11}$, together form an unsubstituted $C_1$-$C_3$ alkylene or a $C_1$-$C_3$ alkylene substituted with one or more halogen;

or, alternatively, $R_9$ and $R_{10}$, together form an unsubstituted $C_1$-$C_3$ alkylene or a $C_1$-$C_3$ alkylene substituted with one or more halogen;

p is 0, 1, 2, 3, or 4; and each $R_{14}$ is, independently, selected from the group consisting of deuterium, halogen, hydroxyl, and cyano.

In one embodiment, provided herein are compounds of Formula I-A having the structure of Formula I or a pharmaceutically acceptable salt thereof:

(I)

or a pharmaceutically acceptable salt thereof;
wherein:
T is $CR_6$ or N;
U is $CR_5$ or N;
V is $CR_4$ or N;
W is $CR_3$ or N;
X is $CR_2$ or N;
and provided that includes no more than 3 nitrogen atoms in the ring;

E is selected from the group consisting of $NR_aR_b$, $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, and $C_1$-$C_3$ alkylene-(4- to 10-membered heterocyclyl) wherein the $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl;

$R_a$ and $R_b$ are each, independently, H or unsubstituted $C_1$-$C_3$ alkyl;

$R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted or substituted with one or more halogen, hydroxyl, unsubstituted $C_1$-$C_3$ alkyl, or $C_1$-$C_3$ alkyl substituted with one or more halogen or deuterium;

$R_c$ and $R_d$ are each, independently, H, unsubstituted $C_1$-$C_3$ alkyl, or $C_1$-$C_3$ alkyl substituted with one or more halogen or deuterium;

n is 0 or 1;

each of $R_2$, $R_3$, $R_4$, $R_5$, and $R_6$, when present, is, independently, selected from the group consisting of H, halogen, deuterium, hydroxyl, cyano, unsubstituted $C_1$-$C_3$ alkyl, and $C_1$-$C_3$ alkyl substituted with one or more halogen or deuterium;

each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium;

or, alternatively, $R_8$ and $R_{11}$, together form an unsubstituted $C_1$-$C_3$ alkylene or a $C_1$-$C_3$ alkylene substituted with one or more halogen;

or, alternatively, $R_9$ and $R_{10}$, together form an unsubstituted $C_1$-$C_3$ alkylene or a $C_1$-$C_3$ alkylene substituted with one or more halogen;

p is 0, 1, 2, 3, or 4; and each $R_{14}$ is, independently, selected from the group consisting of deuterium, halogen, hydroxyl, and cyano.

Also provided herein is a pharmaceutical composition comprising a compound of Formula I-A or I, or a pharmaceutically acceptable salt thereof, and a pharmaceutically acceptable carrier.

In another aspect, provided herein is a method of treating narcolepsy in a subject in need thereof comprising administering to the subject a compound of Formula I-A or I, or a pharmaceutically acceptable salt thereof.

In another aspect, provided herein is a method of treating cataplexy in a subject in need thereof comprising administering to the subject a compound of Formula I-A or I, or a pharmaceutically acceptable salt thereof.

DETAILED DESCRIPTION OF THE INVENTION

Provided herein are compounds, e.g., the compounds of Formula I-A or I, or pharmaceutically acceptable salts thereof, that are useful in the treatment of narcolepsy or cataplexy in a subject.

In a non-limiting aspect, these compounds may modulate the orexin-2 receptor. In a particular embodiment, the compounds provided herein are considered orexin-2 agonists. As such, in one aspect, the compounds provided herein are useful in treatment of narcolepsy in a subject by acting as an agonist of the orexin-2 receptor.

Definitions

Listed below are definitions of various terms used to describe this invention. These definitions apply to the terms as they are used throughout this specification and claims, unless otherwise limited in specific instances, either individually or as part of a larger group.

Unless defined otherwise, all technical and scientific terms used herein generally have the same meaning as commonly understood by one of ordinary skill in the art to which this invention belongs. Generally, the nomenclature used herein and the laboratory procedures in cell culture, molecular genetics, organic chemistry, and peptide chemistry are those well-known and commonly employed in the art.

As used herein, the articles "a" and "an" refer to one or to more than one (i.e., to at least one) of the grammatical object of the article. By way of example, "an element" means one element or more than one element. Furthermore, use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

As used to herein, the term "$EC_{50}$" refers to the concentration of a compound required to achieve an effect that is 50% of the maximal observed effect of a compound.

The term "agonist," as used herein, refers to a compound that, when contacted with a target of interest (e.g., the orexin-2 receptor), causes an increase in the magnitude of a certain activity or function of the target compared to the magnitude of the activity or function observed in the absence of the agonist.

The term "treat," "treated," "treating," or "treatment" includes the diminishment or alleviation of at least one symptom associated or caused by the state, disorder or disease being treated. In certain embodiments, the treatment comprises bringing into contact with the orexin-2 receptor an effective amount of a compound of the invention for conditions related to narcolepsy or cataplexy.

As used herein, the term "prevent" or "prevention" means no disorder or disease development if none had occurred, or no further disorder or disease development if there had already been development of the disorder or disease. Also considered is the ability of one to prevent some or all of the symptoms associated with the disorder or disease.

As used herein, the term "patient," "individual" or "subject" refers to a human or a non-human mammal. Non-human mammals include, for example, livestock and pets, such as ovine, bovine, porcine, canine, feline and murine mammals. Preferably, the patient, subject, or individual is human.

As used herein, the terms "effective amount," "pharmaceutically effective amount," and "therapeutically effective amount" refer to a nontoxic but sufficient amount of an agent to provide the desired biological result. That result may be reduction or alleviation of the signs, symptoms, or causes of a disease, or any other desired alteration of a biological system. An appropriate therapeutic amount in any individual case may be determined by one of ordinary skill in the art using routine experimentation.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the term "pharmaceutically acceptable salt" refers to derivatives of the disclosed compounds wherein the parent compound is modified by converting an existing acid or base moiety to its salt form. Examples of pharmaceutically acceptable salts include, but are not limited to, mineral or organic acid salts of basic residues such as amines; alkali or organic salts of acidic residues such as carboxylic acids; and the like. The pharmaceutically acceptable salts of the present invention include the conventional non-toxic salts of the parent compound formed, for example, from non-toxic inorganic or organic acids. The pharmaceutically acceptable salts of the present invention can be synthesized from the parent compound which contains a basic or acidic moiety by conventional chemical methods. Generally, such salts can be prepared by reacting the free acid or base forms of these compounds with a stoichiometric amount of the appropriate base or acid in water or in an organic solvent, or in a mixture of the two; generally, nonaqueous media like ether, ethyl acetate, ethanol, isopropanol, or acetonitrile are preferred. The phrase "pharmaceutically acceptable salt" is not limited to a mono, or 1:1, salt. For example, "pharmaceutically acceptable salt" also includes bis-salts, such as a bis-hydrochloride salt. Lists of suitable salts are found in Remington's Pharmaceutical Sciences, 17th ed., Mack Publishing Company, Easton, Pa., 1985, p. 1418 and Journal of Pharmaceutical Science, 66, 2 (1977), each of which is incorporated herein by reference in its entirety.

As used herein, the term "composition" or "pharmaceutical composition" refers to a mixture of at least one compound useful within the invention with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, pulmonary, and topical administration.

As used herein, the term "pharmaceutically acceptable carrier" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound useful within the invention within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound useful within the invention, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations.

As used herein, "pharmaceutically acceptable carrier" also includes any and all coatings, antibacterial and antifungal agents, and absorption delaying agents, and the like that are compatible with the activity of the compound useful within the invention and are physiologically acceptable to the patient. Supplementary active compounds may also be incorporated into the compositions. The "pharmaceutically acceptable carrier" may further include a pharmaceutically acceptable salt of the compound useful within the invention. Other additional ingredients that may be included in the pharmaceutical compositions used in the practice of the invention are known in the art and described, for example in Remington's Pharmaceutical Sciences (Genaro, Ed., Mack Publishing Co., 1985, Easton, PA), which is incorporated herein by reference.

As used herein, the term "alkyl," by itself or as part of another substituent means, unless otherwise stated, a straight or branched chain hydrocarbon having the number of carbon atoms designated (i.e., $C_{1-6}$ alkyl means an alkyl having one to six carbon atoms) and includes straight and branched chains. Examples include methyl, ethyl, propyl, isopropyl, butyl, isobutyl, tert-butyl, pentyl, neopentyl, and hexyl. Other examples of $C_1$-$C_6$-alkyl include ethyl, methyl, isopropyl, isobutyl, n-pentyl, and n-hexyl.

As used herein, the term "halo" or "halogen" alone or as part of another substituent means, unless otherwise stated, a fluorine, chlorine, bromine, or iodine atom, preferably, fluorine, chlorine, or bromine, more preferably, fluorine or chlorine.

As used herein, the term "alkylene" refers to divalent aliphatic hydrocarbyl groups, for example, having from 1 to 4 carbon atoms that are either straight-chained or branched. This term includes, by way of example, methylene (—$CH_2$—), ethylene (—$CH_2CH_2$—), n-propylene (—$CH_2CH_2CH_2$—), iso-propylene (—$CH_2CH(CH_3)$—), and the like.

As used herein, the term "alkenyl" denotes a monovalent group derived from a hydrocarbon moiety containing at least two carbon atoms and at least one carbon-carbon double bond. The double bond may or may not be the point of attachment to another group. Alkenyl groups (e.g., $C_2$-$C_8$-alkenyl) include, but are not limited to, for example, ethenyl, propenyl, prop-1-en-2-yl, butenyl, 1-methyl-2-buten-1-yl, heptenyl, octenyl and the like.

As used herein, the term "alkynyl" denotes a monovalent group derived from a hydrocarbon moiety containing at least two carbon atoms and at least one carbon-carbon triple bond. The triple bond may or may not be the point of attachment to another group. Alkynyl groups (e.g., $C_2$-$C_8$-alkynyl) include, but are not limited to, for example, ethynyl, propynyl, prop-1-yn-2-yl, butynyl, 1-methyl-2-butyn-1-yl, heptynyl, octynyl and the like.

As used herein, the term "alkoxy," refers to the group —O-alkyl, wherein alkyl is as defined herein. Alkoxy includes, by way of example, methoxy, ethoxy, n-propoxy, isopropoxy, n-butoxy, sec-butoxy, t-butoxy and the like.

As used herein, the term "cycloalkyl" means a non-aromatic carbocyclic system that is partially or fully saturated having 1, 2 or 3 rings wherein such rings may be fused. The term "fused" means that a second ring is present (i.e., attached or formed) by having two adjacent atoms in common (i.e., shared) with the first ring. Cycloalkyl also includes bicyclic structures that may be bridged or spirocyclic in nature with each individual ring within the bicycle varying from 3-8 atoms. The term "cycloalkyl" includes, but is not limited to, cyclopropyl, cyclobutyl, cyclopentyl, cyclohexyl, bicyclo[3.1.0]hexyl, spiro[3.3]heptanyl, and bicyclo[1.1.1]pentyl.

As used herein, the term "heterocyclyl" means a non-aromatic carbocyclic system containing 1, 2, 3 or 4 heteroatoms selected independently from N, O, and S and having 1, 2 or 3 rings wherein such rings may be fused, wherein fused is defined above. Heterocyclyl also includes bicyclic structures that may be bridged or spirocyclic in nature with each individual ring within the bicycle varying from 3-8 atoms, and containing 0, 1, or 2 N, O, or S atoms. The term "heterocyclyl" includes cyclic esters (i.e., lactones) and cyclic amides (i.e., lactams) and also specifically includes, but is not limited to, epoxidyl, oxetanyl, tetrahydrofuranyl, tetrahydropyranyl (i.e., oxanyl), pyranyl, dioxanyl, aziridinyl, azetidinyl, pyrrolidinyl, 2,5-dihydro-1H-pyrrolyl, oxazolidinyl, thiazolidinyl, piperidinyl, morpholinyl, piperazinyl, thiomorpholinyl, 1,3-oxazinanyl, 1,3-thiazinanyl, and the like.

As used herein, the term "bridged bicyclic heterocyclyl" refers to non-aromatic heterocyclic ring systems in which two rings share more than two atoms. The bridged bicyclic ring system can be, for example, [3.2.1] bicyclic ring systems such as azabicyclo[3.2.1]octane or [3.1.1] bicyclic ring systems such as azabicyclo[3.1.1]heptane.

It is to be understood that if an aryl, heteroaryl, cycloalkyl, or heterocyclyl moiety may be bonded or otherwise attached to a designated moiety through differing ring atoms (i.e., shown or described without denotation of a specific point of attachment), then all possible points are intended, whether through a carbon atom or, for example, a trivalent nitrogen atom. For example, the term "pyridinyl" means 2-, 3- or 4-pyridinyl, the term "thiophenyl" means 2- or 3-thiophenyl, and so forth.

As used herein, the term "substituted" means that an atom or group of atoms has replaced hydrogen as the substituent attached to another group.

Compounds of the Invention

Accordingly, in an initial aspect, the present invention provides a compound represented by Formula I-A or a pharmaceutically acceptable salt thereof:

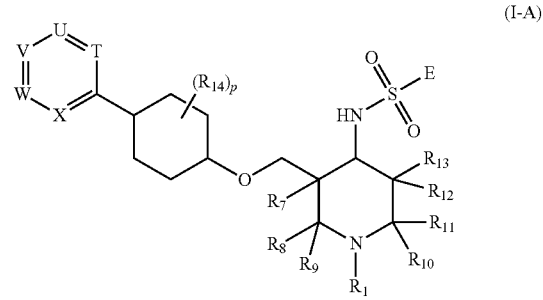

(I-A)

or a pharmaceutically acceptable salt thereof;
wherein:
T is $CR_6$ or N;
U is $CR_5$ or N;
V is $CR_4$ or N;
W is $CR_3$ or N;
X is $CR_2$ or N;

and provided that

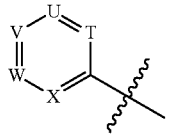

includes no more than 3 nitrogen atoms in the ring;

E is selected from the group consisting of $NR_aR_b$, $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, and $C_1$-$C_3$ alkylene-(4- to 10-membered heterocyclyl) wherein the $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl;

$R_a$ and $R_b$ are each, independently, H or unsubstituted $C_1$-$C_3$ alkyl;

$R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted or substituted with one or more halogen, hydroxyl, unsubstituted $C_1$-$C_3$ alkyl, or $C_1$-$C_3$ alkyl substituted with one or more halogen or deuterium;

$R_c$ and $R_d$ are each, independently, H, unsubstituted $C_1$-$C_3$ alkyl, or $C_1$-$C_3$ alkyl substituted with one or more halogen or deuterium;

n is 0 or 1;

each of $R_2$, $R_3$, $R_4$, $R_5$, and $R_6$, when present, is, independently, selected from the group consisting of H, halogen, deuterium, hydroxyl, cyano, unsubstituted $C_1$-$C_3$alkyl, and $C_1$-$C_3$alkyl substituted with one or more halogen or deuterium;

each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium;

or, alternatively, $R_8$ and $R_{11}$, together form an unsubstituted $C_1$-$C_3$ alkylene or a $C_1$-$C_3$ alkylene substituted with one or more halogen;

or, alternatively, $R_9$ and $R_{10}$, together form an unsubstituted $C_1$-$C_3$ alkylene or a $C_1$-$C_3$ alkylene substituted with one or more halogen;

p is 0, 1, 2, 3, or 4; and each $R_{14}$ is, independently, selected from the group consisting of deuterium, halogen, hydroxyl, and cyano.

In one embodiment, provided herein are compounds of Formula I-A having the structure of Formula I or a pharmaceutically acceptable salt thereof:

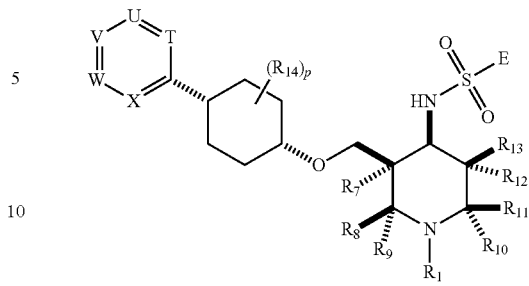

(I)

or a pharmaceutically acceptable salt thereof;
wherein:
T is $CR_6$ or N;
U is $CR_5$ or N;
V is $CR_4$ or N;
W is $CR_3$ or N;
X is $CR_2$ or N;
and provided that

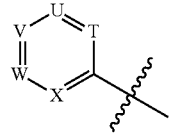

includes no more than 3 nitrogen atoms in the ring;

E is selected from the group consisting of $NR_aR_b$, $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, and $C_1$-$C_3$ alkylene-(4- to 10-membered heterocyclyl) wherein the $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl;

$R_a$ and $R_b$ are each, independently, H or unsubstituted $C_1$-$C_3$ alkyl;

$R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted or substituted with one or more halogen, hydroxyl, unsubstituted $C_1$-$C_3$ alkyl, or $C_1$-$C_3$ alkyl substituted with one or more halogen or deuterium;

$R_c$ and $R_d$ are each, independently, H, unsubstituted $C_1$-$C_3$ alkyl, or $C_1$-$C_3$ alkyl substituted with one or more halogen or deuterium;

n is 0 or 1;

each of $R_2$, $R_3$, $R_4$, $R_5$, and $R_6$, when present, is, independently, selected from the group consisting of H, halogen, deuterium, hydroxyl, cyano, unsubstituted $C_1$-$C_3$alkyl, and $C_1$-$C_3$alkyl substituted with one or more halogen or deuterium;

each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium;

or, alternatively, $R_8$ and $R_{11}$, together form an unsubstituted $C_1$-$C_3$ alkylene or a $C_1$-$C_3$ alkylene substituted with one or more halogen;

or, alternatively, $R_9$ and $R_{10}$, together form an unsubstituted $C_1$-$C_3$ alkylene or a $C_1$-$C_3$ alkylene substituted with one or more halogen;

p is 0, 1, 2, 3, or 4; and each $R_{14}$ is, independently, selected from the group consisting of deuterium, halogen, hydroxyl, and cyano.

In one embodiment of Formula (I),

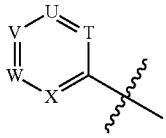

is selected from the group consisting of:

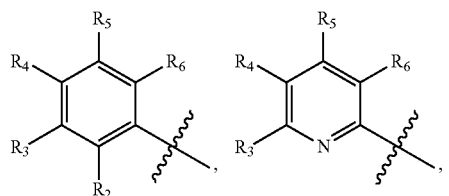

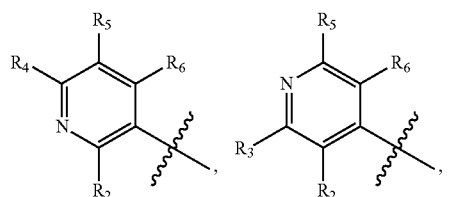

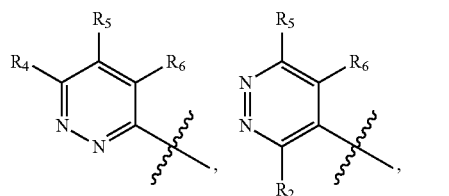

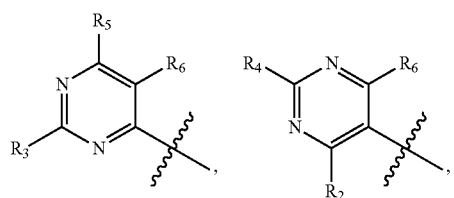

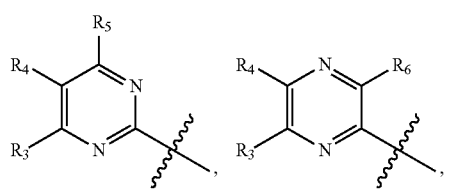

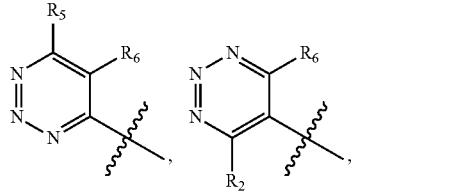

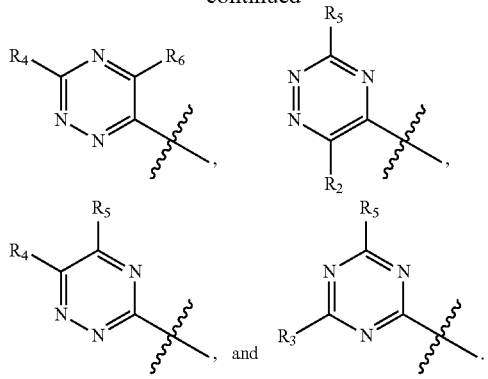

In another embodiment of Formula

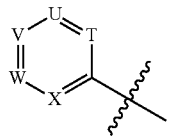

is selected from the group consisting of:

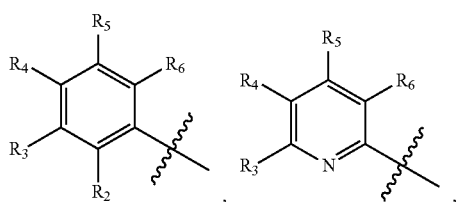

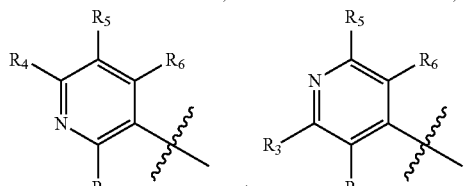

In another embodiment of Formula (I),

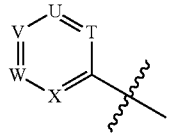

is selected from the group consisting of:

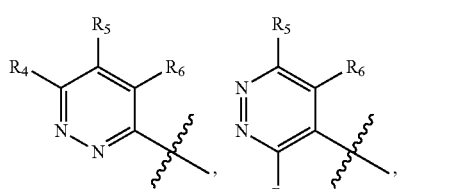

-continued
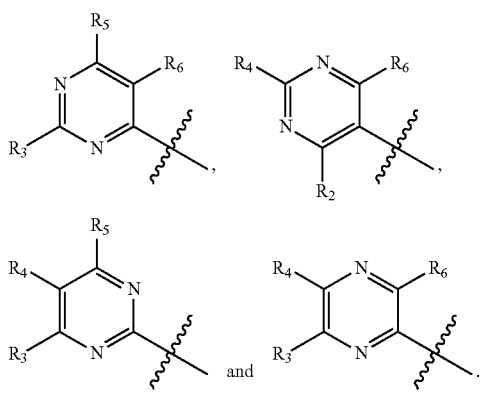
In another embodiment of Formula (I),
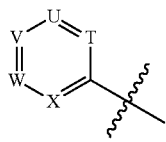
is selected from the group consisting of:
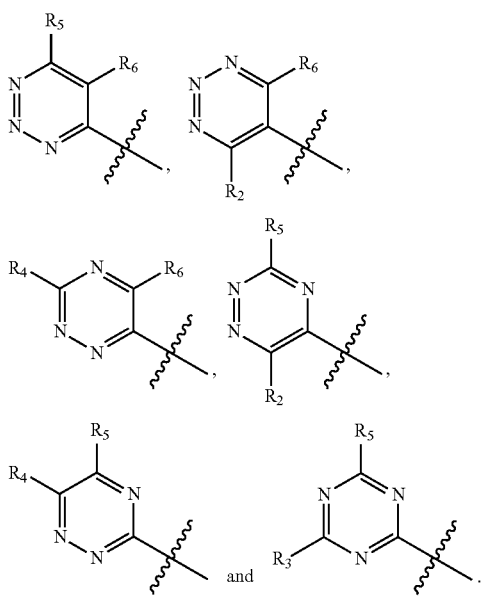
In another embodiment of Formula (I),
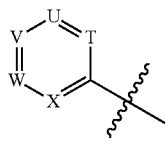
is selected from the group consisting of:
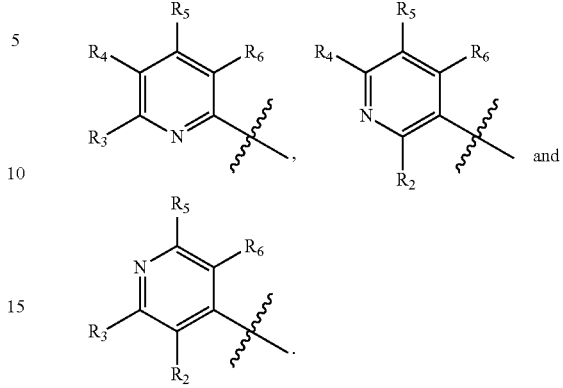
In another embodiment of Formula (I)
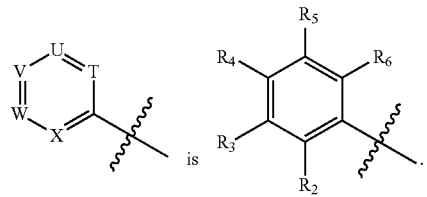
In another embodiment of Formula (I)
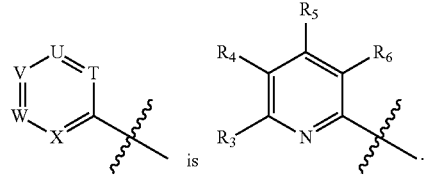
In another embodiment of Formula (I),
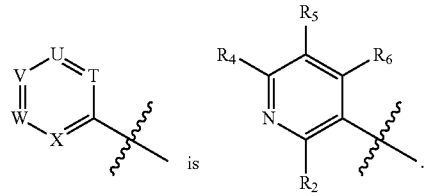
In another embodiment of Formula (I),
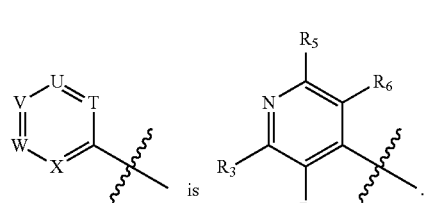

In another embodiment of Formula (I),

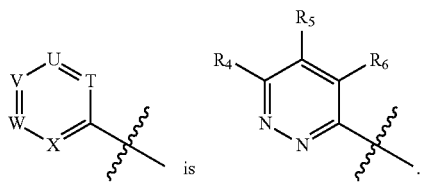 is

In another embodiment of Formula (I),

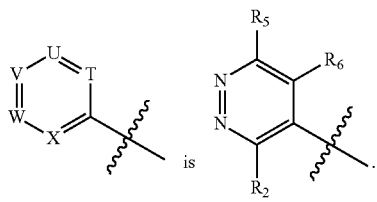 is

In another embodiment of Formula (I),

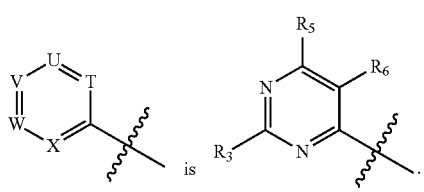 is

In another embodiment of Formula (I),

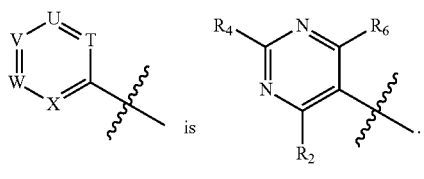 is

In another embodiment of Formula (I),

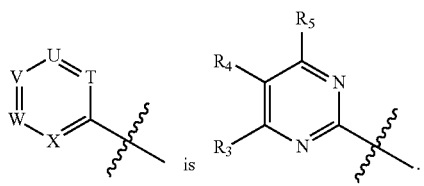 is

In another embodiment of Formula (I),

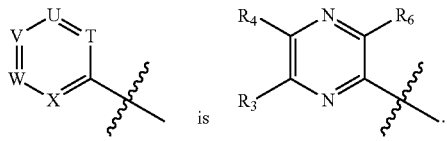 is

In another embodiment of Formula (I),

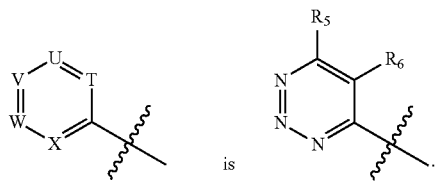 is

In another embodiment of Formula (I),

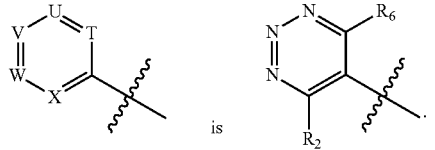 is

In another embodiment of Formula (I),

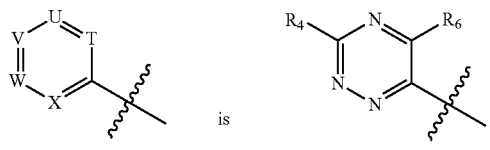 is

In another embodiment of Formula (I),

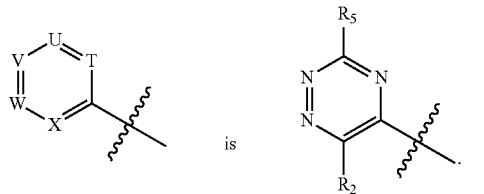 is

In another embodiment of Formula (I),

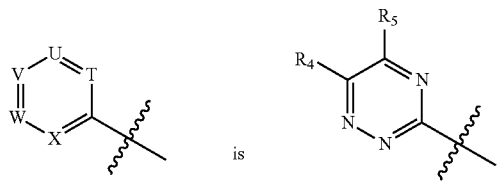 is

In another embodiment of Formula (I),

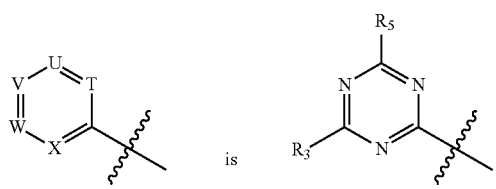 is

In another embodiment of Formula (I), p is 0. In another embodiment of Formula (I), p is 1. In another embodiment of Formula (I), p is 2. In another embodiment of Formula (I), p is 3. In another embodiment of Formula (I), p is 4. In another embodiment of Formula (I), p is 0, 1 or 2.

In another embodiment of Formula (I), p is 0 or 1.

In another embodiment of Formula (I), p is 1 and $R_{14}$ is deuterium. In another embodiment of Formula (I), p is 1 and $R_{14}$ is halogen. In another embodiment of Formula (I), p is 1 and $R_{14}$ is fluorine. In another embodiment of Formula (I), p is 1 and $R_{14}$ is hydroxyl. In another embodiment of Formula (I), p is 1 and $R_{14}$ is cyano. In another embodiment of Formula (I), p is 2 and each $R_{14}$ is hydroxyl. In another embodiment of Formula (I), p is 2 and each $R_{14}$ is halogen. In another embodiment of Formula (I), p is 2 and each $R_{14}$ is fluorine.

In another embodiment of Formula (I), E is $NR_aR_b$. In another embodiment of Formula (I), E is $C_1$-$C_3$ alkylene-$NR_aR_b$. In another embodiment of Formula (I), E is unsubstituted $C_1$-$C_3$ alkyl, unsubstituted $C_2$-$C_4$ alkenyl or unsubstituted $C_2$-$C_4$ alkynyl. In another embodiment of Formula (I), E is $C_1$-$C_3$ alkyl, $C_2$-$C_4$ alkenyl or $C_2$-$C_4$ alkynyl substituted with one or more halogen, hydroxyl, $C_1$-$C_3$ alkyl, or $C_1$-$C_3$ alkoxyl. In another embodiment of Formula (I), E is unsubstituted $C_1$-$C_3$ alkyl. In another embodiment of Formula (I), E is $C_1$-$C_3$ alkyl substituted with one or more halogen, hydroxyl, $C_1$-$C_3$ alkyl, or $C_1$-$C_3$ alkoxyl. In another embodiment of Formula (I), E is unsubstituted $C_3$-$C_8$ cycloalkyl. In another embodiment of Formula (I), E is $C_3$-$C_8$ cycloalkyl substituted with one or more halogen, hydroxyl, $C_1$-$C_3$ alkyl, or $C_1$-$C_3$ alkoxyl. In another embodiment of Formula (I), E is unsubstituted $C_1$-$C_3$ alkylene-($C_3$-$C_8$ cycloalkyl). In another embodiment of Formula (I), E is $C_1$-$C_3$ alkylene-($C_3$-$C_8$ cycloalkyl) substituted with one or more halogen, hydroxyl, $C_1$-$C_3$ alkyl, or $C_1$-$C_3$ alkoxyl. In another embodiment of Formula (I), E is unsubstituted 4- to 10-membered heterocyclyl. In another embodiment of Formula (I), E is 4- to 10-membered heterocyclyl substituted with one or more halogen, hydroxyl, $C_1$-$C_3$ alkyl, or $C_1$-$C_3$ alkoxyl. In another embodiment of Formula (I), E is unsubstituted $C_1$-$C_3$ alkylene-(4- to 10-membered heterocyclyl). In another embodiment of Formula (I), E is $C_1$-$C_3$ alkylene-(4- to 10-membered heterocyclyl) substituted with one or more halogen, hydroxyl, $C_1$-$C_3$ alkyl, or $C_1$-$C_3$ alkoxyl.

In another embodiment of Formula (I), E is $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl), wherein the $C_1$-$C_3$alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl.

In another embodiment of Formula (I), E is $C_1$-$C_3$ alkyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl), wherein the $C_1$-$C_3$alkyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4- to 10-membered heterocyclyl) is unsubstituted or substituted with one or more halogen, hydroxyl, $C_1$-$C_3$ alkyl, or $C_1$-$C_3$ alkoxyl.

In another embodiment of Formula (I), E is $C_1$-$C_3$ alkyl, $C_3$-$C_8$ cycloalkyl, or $C_1$-$C_3$ alkylene-($C_3$-$C_8$ cycloalkyl), wherein the $C_1$-$C_3$alkyl, $C_3$-$C_8$ cycloalkyl, or $C_1$-$C_3$ alkylene-($C_3$-$C_8$ cycloalkyl) is unsubstituted or substituted with one or more halogen, hydroxyl, $C_1$-$C_3$ alkyl, or $C_1$-$C_3$ alkoxyl.

In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted. In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium.

In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted and further wherein n is 0. In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is unsubstituted and further wherein n is 1. In another embodiment of Formula (I), $R_1$ is $(CR_cR_d)_n$—($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 1.

In another embodiment of Formula (I), $R_1$ is $(CR_cR_d)_n$—($C_6$-$C_{10}$ aryl) wherein the aryl is unsubstituted. In another embodiment of Formula (I), $R_1$ is $(CR_cR_d)_n$—($C_6$-$C_{10}$ aryl) wherein the aryl is substituted with one or more halogen, hydroxyl, unsubstituted $C_1$-$C_3$ alkyl, or $C_1$-$C_3$ alkyl substituted with one or more halogen or deuterium.

In another embodiment of Formula (I), $R_1$ is $(CR_cR_d)_n$—($C_6$-$C_{10}$ aryl) wherein the aryl is unsubstituted and further wherein n is 0. In another embodiment of Formula (I), $R_1$ is $(CR_cR_d)_n$—($C_6$-$C_{10}$ aryl) wherein the aryl is substituted with one or more halogen, hydroxyl, unsubstituted $C_1$-$C_3$ alkyl, or $C_1$-$C_3$ alkyl substituted with one or more halogen or deuterium and further wherein n is 0.

In another embodiment of Formula (I), $R_1$ is $(CR_cR_d)_n$—($C_6$-$C_{10}$ aryl) wherein the aryl is unsubstituted and further wherein n is 1. In another embodiment of Formula (I), $R_1$ is $(CR_cR_d)_n$—($C_6$-$C_{10}$ aryl) wherein the aryl is substituted with one or more halogen, hydroxyl, unsubstituted $C_1$-$C_3$ alkyl, or $C_1$-$C_3$ alkyl substituted with one or more halogen or deuterium and further wherein n is 1.

In another embodiment of Formula (I), $R_1$ is $(CR_cR_d)_n$-(5- to 10-membered heteroaryl) wherein the heteroaryl is unsubstituted. In another embodiment of Formula (I), $R_1$ is $(CR_cR_d)_n$-(5- to 10-membered heteroaryl) wherein the heteroaryl is substituted with one or more halogen, hydroxyl, unsubstituted $C_1$-$C_3$ alkyl, or $C_1$-$C_3$ alkyl substituted with one or more halogen or deuterium.

In another embodiment of Formula (I), $R_1$ is $(CR_cR_d)_n$-(5- to 10-membered heteroaryl) wherein the heteroaryl is unsubstituted and further wherein n is 0. In another embodiment of Formula (I), $R_1$ is $(CR_cR_d)_n$-(5- to 10-membered heteroaryl) wherein the heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

In another embodiment of Formula (I), $R_1$ is $(CR_cR_d)_n$-(5- to 10-membered heteroaryl) wherein the heteroaryl is unsubstituted and further wherein n is 1. In another embodiment of Formula (I), $R_1$ is $(CR_cR_d)_n$-(5- to 10-membered heteroaryl) wherein the heteroaryl is substituted with one or more halogen, hydroxyl, unsubstituted $C_1$-$C_3$ alkyl, or $C_1$-$C_3$ alkyl substituted with one or more halogen or deuterium and further wherein n is 1.

In another embodiment of Formula (I), $R_1$ is $(CR_cR_d)_n$-(phenyl) or $(CR_cR_d)_n$-(5- to 7-membered heteroaryl) wherein the phenyl or heteroaryl is unsubstituted. In another embodiment of Formula (I), $R_1$ is $(CR_cR_d)_n$-(phenyl) or $(CR_cR_d)_n$-(5- to 7-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium.

In another embodiment of Formula (I), $R_1$ is $(CR_cR_d)_n$-(phenyl) or $(CR_cR_d)_n$-(5- to 7-membered heteroaryl) wherein the phenyl or heteroaryl is unsubstituted and further wherein n is 0. In another embodiment of Formula (I), $R_1$ is $(CR_cR_d)_n$-(phenyl) or $(CR_cR_d)_n$-(5- to 7-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

In another embodiment of Formula (I), $R_1$ is $(CR_cR_d)_n$-(phenyl) or $(CR_cR_d)_n$-(5- to 7-membered heteroaryl) wherein the phenyl or heteroaryl is unsubstituted and further wherein n is 1. In another embodiment of Formula (I), $R_1$ is $(CR_cR_d)_n$-(phenyl) or $(CR_cR_d)_n$-(5- to 7-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 1.

In another embodiment of Formula (I), $R_1$ is $(CR_cR_d)_n$-(phenyl) or $(CR_cR_d)_n$-(6-membered heteroaryl) wherein the phenyl or heteroaryl is unsubstituted. In another embodiment of Formula (I), $R_1$ is $(CR_cR_d)_n$-(phenyl) or $(CR_cR_d)_n$-(6-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium.

In another embodiment of Formula (I), $R_1$ is $(CR_cR_d)_n$-(phenyl) or $(CR_cR_d)_n$-(6-membered heteroaryl) wherein the phenyl or heteroaryl is unsubstituted and further wherein n is 0. In another embodiment of Formula (I), $R_1$ is $(CR_cR_d)_n$-(phenyl) or $(CR_cR_d)_n$-(6-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

In another embodiment of Formula (I), $R_1$ is $(CR_cR_d)_n$-(phenyl) or $(CR_cR_d)_n$-(6-membered heteroaryl) wherein the phenyl or heteroaryl is unsubstituted and further wherein n is 1. In another embodiment of Formula (I), $R_1$ is $(CR_cR_d)_n$-(phenyl) or $(CR_cR_d)_n$-(6-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 1.

In another embodiment of Formula (I), each of $R_2$, $R_3$, $R_4$, $R_5$, and $R_6$, when present, is, independently, selected from the group consisting of H, halogen, hydroxyl, cyano, unsubstituted $C_1$-$C_3$alkyl, and $C_1$-$C_3$alkyl substituted with one or more halogen.

In another embodiment of Formula (I), each of $R_2$, $R_3$, $R_4$, $R_5$, and $R_6$, when present, is, independently, selected from the group consisting of H, halogen, hydroxyl, and unsubstituted $C_1$-$C_3$alkyl.

In another embodiment of Formula (I), each of $R_2$, $R_3$, $R_4$, $R_5$, and $R_6$, when present, is, independently, selected from the group consisting of H, halogen, and unsubstituted $C_1$-$C_3$alkyl.

In another embodiment of Formula (I), each of $R_2$, $R_3$, $R_4$, $R_5$, and $R_6$, when present, is, independently, selected from H or halogen. In another embodiment of Formula (I), each of $R_2$, $R_3$, $R_4$, $R_5$, and $R_6$, when present, is, independently, selected from H or fluorine. In another embodiment of Formula (I), each of $R_2$, $R_3$, $R_4$, $R_5$, and $R_6$, when present, is, independently, selected from H or chlorine. In another embodiment of Formula (I), each of $R_2$, $R_3$, $R_4$, $R_5$, and $R_6$, when present, is, independently, selected from H or unsubstituted $C_1$ alkyl. In another embodiment of Formula (I), each of $R_2$, $R_3$, $R_4$, $R_5$, and $R_6$, when present, is, independently, selected from H or hydroxyl. In another embodiment of Formula (I), each of $R_2$, $R_3$, $R_4$, $R_5$, and $R_6$, when present, is H.

In another embodiment of Formula (I), each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium.

In another embodiment of Formula (I), $R_8$ and $R_{11}$, together, form an unsubstituted $C_1$-$C_3$ alkylene or a $C_1$-$C_3$ alkylene substituted with one or more halogen. In another embodiment of Formula (I), $R_8$ and $R_{11}$, together, form an unsubstituted $C_2$ alkylene or a $C_2$ alkylene substituted with one or more halogen. In another embodiment of Formula (I), $R_8$ and $R_{11}$, together, form an azabicyclo[3.2.1]octanyl bridged bicyclic heterocyclyl.

In another embodiment of Formula (I), $R_9$ and $R_{10}$, together, form an unsubstituted $C_1$-$C_3$ alkylene or a $C_1$-$C_3$ alkylene substituted with one or more halogen. In another embodiment of Formula (I), $R_9$ and $R_{10}$, together, form an unsubstituted $C_2$ alkylene or a $C_2$ alkylene substituted with one or more halogen. In another embodiment of Formula (I), $R_9$ and $R_{10}$, together, form an azabicyclo[3.2.1]octanyl bridged bicyclic heterocyclyl.

In another embodiment of Formula (I), each of $R_7$, $R_8$, $R_9$, $R_{10}$, $R_{11}$, $R_{12}$, and $R_{13}$ is, independently, H, halogen, or unsubstituted $C_1$-$C_3$ alkyl. In another embodiment of Formula (I), each of $R_7$, $R_8$, $R_9$, $R_{10}$, $R_{11}$, $R_{12}$, and $R_{13}$ is, independently, H, fluorine, or unsubstituted $C_1$-$C_3$ alkyl. In another embodiment of Formula (I), each of $R_7$, $R_8$, $R_9$, $R_{10}$, $R_{11}$, $R_{12}$, and $R_{13}$ is, independently, H, halogen, or unsubstituted $C_1$ alkyl. In another embodiment of Formula (I), each of $R_7$, $R_8$, $R_9$, $R_{10}$, $R_{11}$, $R_{12}$, and $R_{13}$ is, independently, H or unsubstituted $C_1$ alkyl. In another embodiment of Formula (I), each of $R_7$, $R_8$, $R_9$, $R_{10}$, $R_{11}$, $R_{12}$, and $R_{13}$ is, independently, H or halogen. In another embodiment of Formula (I), each of $R_7$, $R_8$, $R_9$, $R_{10}$, $R_{11}$, $R_{12}$, and $R_{13}$ is H.

In another embodiment of Formula (I), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H. In another embodiment of Formula (I), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or halogen. In another embodiment of Formula (I), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(5- to 10-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(5- to 10-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(5- to 10-membered heteroaryl), each of $R_2$, $R_3$, $R_4$, $R_5$, and $R_6$, when present, is H, and each of $R_7$, $R_8$, $R_9$, $R_{10}$, Ru, $R_{12}$, and $R_{13}$ is H or halogen. In another embodiment of Formula (I), $R_1$ is $(CR_cR_d)_n$-(5- to 10-membered heteroaryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(5- to 7-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(5- to 7-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(5- to 7-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(5- to 7-membered heteroaryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(6-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(6-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(6-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(6-membered heteroaryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(6-membered heteroaryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(6-membered heteroaryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(6-membered heteroaryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(6-membered heteroaryl), n is 0, each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(6-membered heteroaryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(6-membered heteroaryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(6-membered heteroaryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(6-membered heteroaryl), n is 1, each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$-$C_{10}$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$-$C_{10}$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$-$C_{10}$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$-$C_{10}$ aryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$ aryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$ aryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$ aryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$ aryl), n is 0, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$ aryl), n is 0, each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$ aryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$ aryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$ aryl), n is 1, each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$ aryl), n is 1, each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(6-membered heteroaryl), n is 0, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(6-membered heteroaryl), n is 0, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(6-membered heteroaryl), n is 0, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(6-membered heteroaryl), n is 0, and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$-(6-membered heteroaryl), n is 1, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$-(6-membered heteroaryl), n is 1, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$-(6-membered heteroaryl), n is 1, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$-(6-membered heteroaryl), n is 1, and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$ aryl), n is 0, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$ aryl), n is 0, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$ aryl), n is 0, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$ aryl), n is 0, and each of $R_7$, $R_8$, $R_9$, $R_{10}$, $R_{11}$, $R_{12}$, and $R_{13}$ is H or fluorine.

In another embodiment of Formula (I), $R_1$ is $(CR_cR_d)_n$—($C_6$ aryl), n is 1, and each of $R_7$, $R_8$, $R_9$, $R_{10}$, $R_{11}$, $R_{12}$, and $R_{13}$ is H. In another embodiment of Formula (I), $R_1$ is $(CR_cR_d)_n$—($C_6$ aryl), n is 1, and each of $R_7$, $R_8$, $R_9$, $R_{10}$, $R_{11}$, $R_{12}$, and $R_{13}$ is H or unsubstituted $C_1$-$C_3$ alkyl. In another embodiment of Formula (I), $R_1$ is $(CR_cR_d)_n$—($C_6$ aryl), n is 1, and each of $R_7$, $R_8$, $R_9$, $R_{10}$, $R_{11}$, $R_{12}$, and $R_{13}$ is H or halogen. In another embodiment of Formula (I), $R_1$ is $(CR_cR_d)_n$—($C_6$ aryl), n is 1, and each of $R_7$, $R_8$, $R_9$, $R_{10}$, $R_{11}$, $R_{12}$, and $R_{13}$ is H or fluorine.

Each of the embodiments described herein with respect to compounds of Formula I also applies to compounds of Formula I-A.

Certain embodiments of compounds of Formula I-A or I, or pharmaceutically acceptable salts thereof, are shown below in Table 1. Compounds of Formula I-A or I, or pharmaceutically acceptable salts thereof, and compounds of Table 1, or pharmaceutically acceptable salts thereof, collectively or individually are sometimes referred to herein as "compounds of the invention" or "compounds provided herein"

TABLE 1

| Structure | Compound No. |
|---|---|
| (structure) | 1 |
| (structure) | 2 |
| (structure) | 3 |
| (structure) | 4 |
| (structure) | 5 |

TABLE 1-continued

| Structure | Compound No. |
|---|---|
| (3-fluorophenyl-cyclohexyl-oxymethyl-piperidinyl-pyridinyl methanesulfonamide) | 6 |
| (4-fluorophenyl-cyclohexyl-oxymethyl-piperidinyl-pyridinyl methanesulfonamide) | 7 |
| (pyrimidin-4-yl-cyclohexyl-oxymethyl-piperidinyl-pyridinyl methanesulfonamide) | 8 |
| (pyrazin-2-yl-cyclohexyl-oxymethyl-piperidinyl-pyridinyl methanesulfonamide) | 9 |
| (phenyl-cyclohexyl-oxymethyl-piperidinyl-pyridinyl methanesulfonamide) | 10 |
| (pyrimidin-2-yl-cyclohexyl-oxymethyl-piperidinyl-pyridinyl methanesulfonamide) | 11 |
| (pyrimidin-5-yl-cyclohexyl-oxymethyl-piperidinyl-pyridinyl methanesulfonamide) | 12 |
| (pyridazin-4-yl-cyclohexyl-oxymethyl-piperidinyl-pyridinyl methanesulfonamide) | 13 |

TABLE 1-continued
| Structure | Compound No. |
|---|---|
| 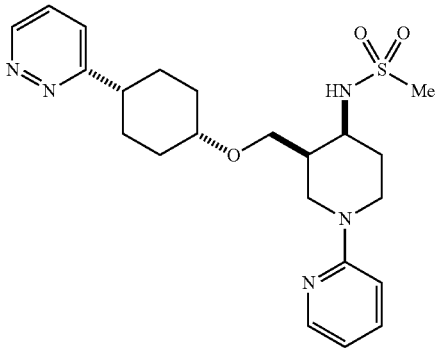 | 14 |
| 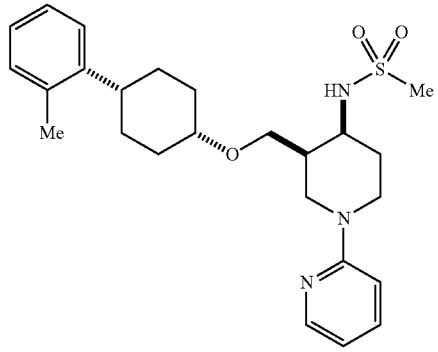 | 15 |
| 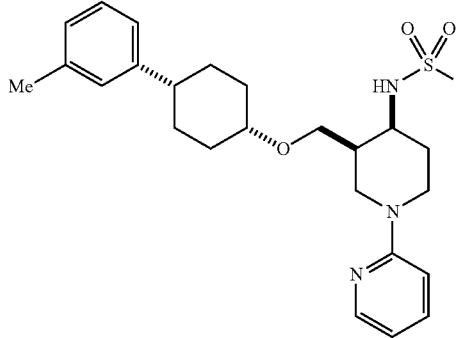 | 16 |
| 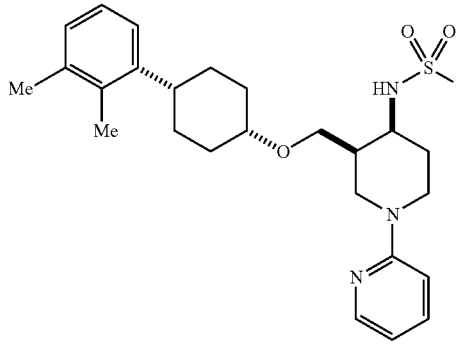 | 17 |
| 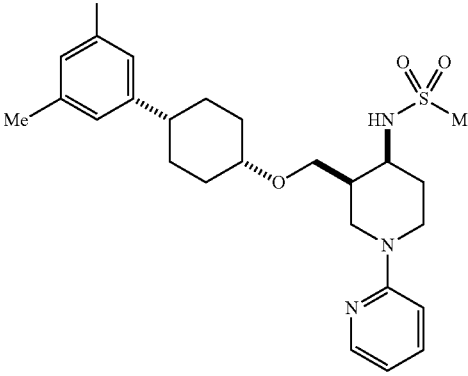 | 18 |
| 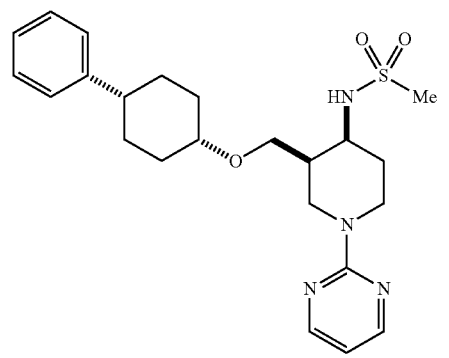 | 19 |
| 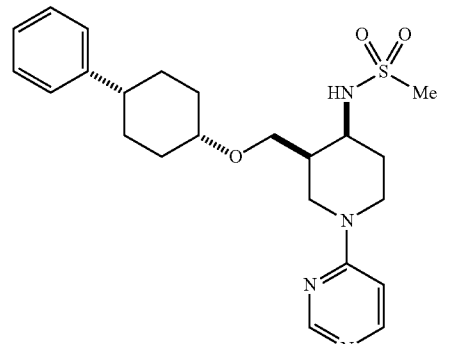 | 20 |
| 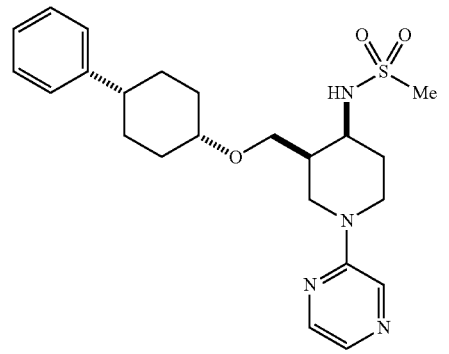 | 21 |

TABLE 1-continued

| Structure | Compound No. |
|---|---|
| (structure) | 22 |
| (structure) | 23 |
| (structure) | 24 |
| (structure) | 25 |
| (structure) | 26 |
| (structure) | 27 |
| (structure) | 28 |
| (structure) | 29 |

TABLE 1-continued

| Structure | Compound No. |
|---|---|
| (2-hydroxyphenyl-cyclohexyl-OCH2-piperidine(N-2-pyridyl)-NHS(O)2Me) | 30 |
| (3-hydroxyphenyl-cyclohexyl-OCH2-piperidine(N-2-pyridyl)-NHS(O)2Me) | 31 |
| (4-hydroxyphenyl-cyclohexyl-OCH2-piperidine(N-2-pyridyl)-NHS(O)2Me) | 32 |
| (3-CF3-phenyl-cyclohexyl-OCH2-piperidine(N-2-pyridyl)-NHS(O)2Me) | 33 |
| (3-chlorophenyl-cyclohexyl-OCH2-piperidine(N-2-pyridyl)-NHS(O)2Me) | 34 |
| (3-cyanophenyl-cyclohexyl-OCH2-piperidine(N-2-pyridyl)-NHS(O)2Me) | 35 |
| (phenyl-cyclohexyl-OCH2-piperidine(N-benzyl)-NHS(O)2Me) | 36 |
| (phenyl-cyclohexyl-OCH2-piperidine(N-(1-phenylethyl))-NHS(O)2Me) | 37 |

TABLE 1-continued
| Structure | Compound No. |
|---|---|
| 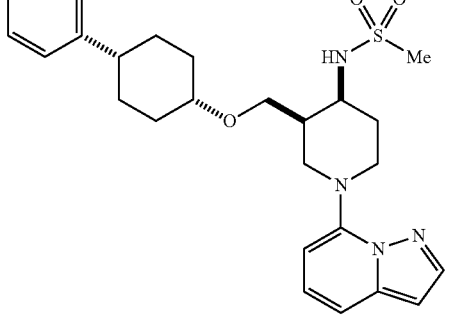 | 38 |
| | 39 |
| | 40 |
| | 41 |
| 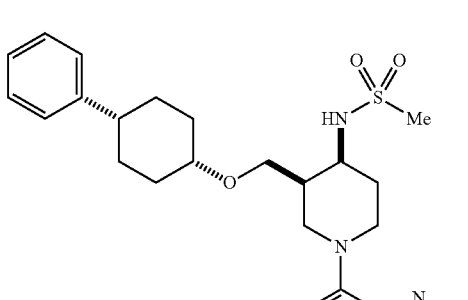 | 42 |
| | 43 |
| | 44 |
| | 45 |

TABLE 1-continued
| Structure | Compound No. |
|---|---|
| 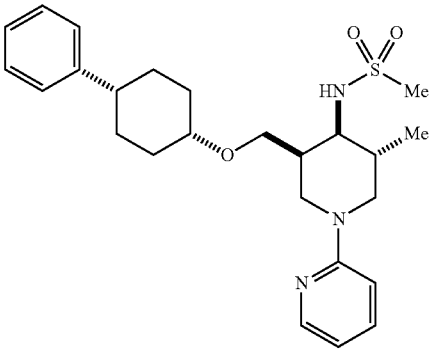 | 46 |
| 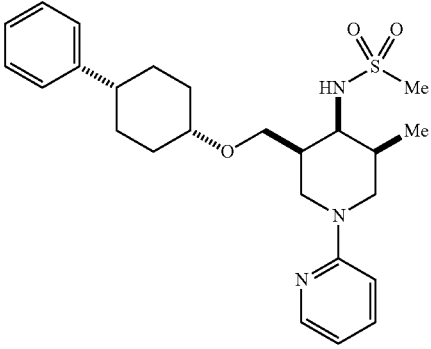 | 47 |
| 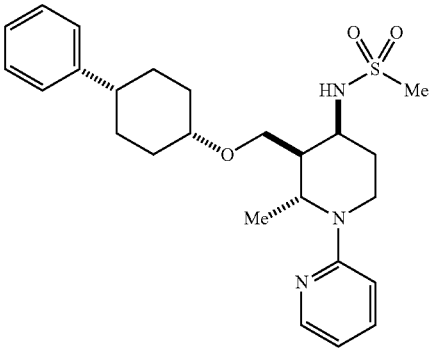 | 48 |
| 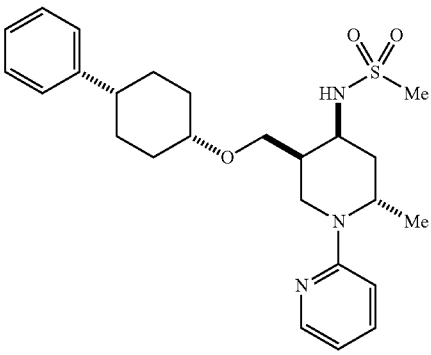 | 49 |
| 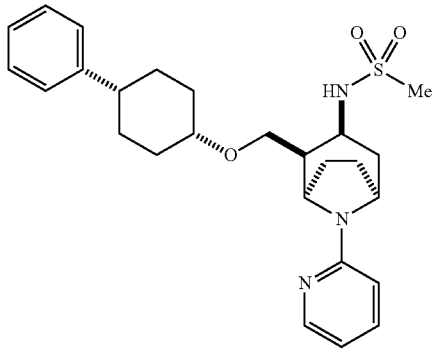 | 50 |
| 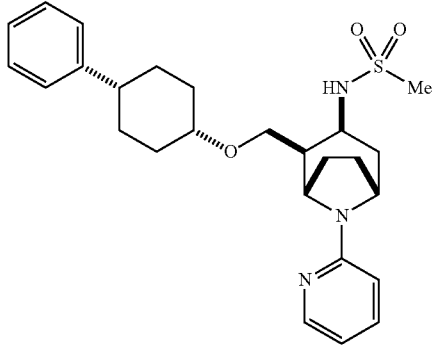 | 51 |
| 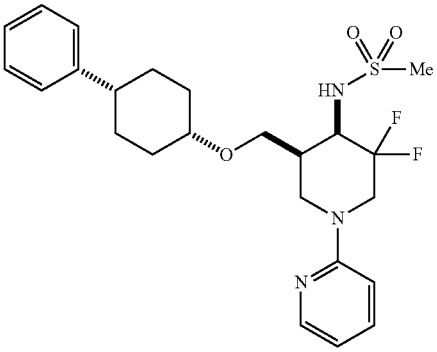 | 52 |
| 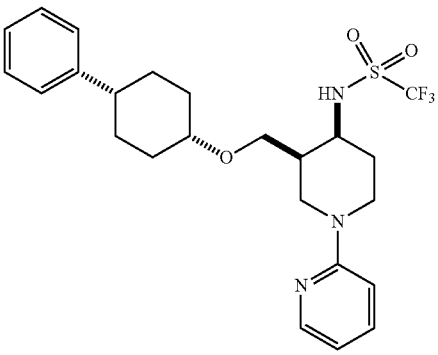 | 53 |

TABLE 1-continued

| Structure | Compound No. |
|---|---|
| (structure) | 54 |
| (structure) | 55 |
| (structure) | 56 |
| (structure) | 57 |
| (structure) | 58 |
| (structure) | 59 |
| (structure) | 60 |
| (structure) | 61 |

TABLE 1-continued

| Structure | Compound No. |
|---|---|
| | 62 |
| | 63 |
| | 64 |
| | 65 |
| | 66 |
| | 67 |
| | 68 |
| | 69 |

TABLE 1-continued

| Structure | Compound No. |
|---|---|
| (structure) | 70 |

The disclosed compounds possess one or more stereocenters, and each stereocenter may exist independently in either the R or S configuration. In one embodiment, compounds described herein are present in optically active or racemic forms. It is to be understood that the compounds described herein encompass racemic, optically-active, regioisomeric and stereoisomeric forms, or combinations thereof that possess the therapeutically useful properties described herein.

Preparation of optically active forms is achieved in any suitable manner, including by way of non-limiting example, by resolution of the racemic form with recrystallization techniques, synthesis from optically-active starting materials, chiral synthesis, or chromatographic separation using a chiral stationary phase. In one embodiment, a mixture of two or more isomers is utilized as the disclosed compound described herein. In another embodiment, a pure isomer is utilized as the disclosed compound described herein. In another embodiment, compounds described herein contain one or more chiral centers. These compounds are prepared by any means, including stereoselective synthesis, enantioselective synthesis or separation of a mixture of enantiomers or diastereomers. Resolution of compounds and isomers thereof is achieved by any means including, by way of non-limiting example, chemical processes, enzymatic processes, fractional crystallization, distillation, and chromatography.

In one embodiment, the disclosed compounds may exist as tautomers. All tautomers are included within the scope of the compounds presented herein.

Compounds described herein also include isotopically-labeled compounds wherein one or more atoms is replaced by an atom having the same atomic number, but an atomic mass or mass number different from the atomic mass or mass number usually found in nature. Examples of isotopes suitable for inclusion in the compounds described herein include and are not limited to $^{2}H$, $^{3}H$, $^{11}C$, $^{13}C$, $^{14}C$, $^{36}Cl$, $^{18}F$, $^{123}I$, $^{125}I$, $^{13}N$, $^{15}N$, $^{15}O$, $^{17}O$, $^{18}O$, $^{32}P$, and $^{35}S$. In one embodiment, isotopically-labeled compounds are useful in drug or substrate tissue distribution studies. In another embodiment, substitution with heavier isotopes such as deuterium affords greater metabolic stability (for example, increased in vivo half-life or reduced dosage requirements). In another embodiment, the compounds described herein include a $^{2}H$ (i.e., deuterium) isotope.

In yet another embodiment, substitution with positron emitting isotopes, such as $^{11}C$, $^{18}F$, $^{15}O$ and $^{13}N$, is useful in Positron Emission Topography (PET) studies for examining substrate receptor occupancy. Isotopically-labeled compounds are prepared by any suitable method or by processes using an appropriate isotopically-labeled reagent in place of the non-labeled reagent otherwise employed.

The specific compounds described herein, and other compounds encompassed by one or more of the Formulas described herein having different substituents are synthesized using techniques and materials described herein and as described, for example, in Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991), Larock's Comprehensive Organic Transformations (VCH Publishers Inc., 1989), March, Advanced Organic Chemistry 4$^{th}$ Ed., (Wiley 1992); Carey and Sundberg, Advanced Organic Chemistry 4th Ed., Vols. A and B (Plenum 2000, 2001), and Green and Wuts, Protective Groups in Organic Synthesis 3rd Ed., (Wiley 1999) (all of which are incorporated by reference for such disclosure). General methods for the preparation of compounds as described herein are modified by the use of appropriate reagents and conditions, for the introduction of the various moieties found in the Formulas as provided herein.

Compounds described herein are synthesized using any suitable procedures starting from compounds that are available from commercial sources or are prepared using procedures described herein.

Methods of Treatment

The compounds of the invention can be used in a method of treating a disease or condition in a subject, said method comprising administering to the subject a compound of the invention, or a pharmaceutical composition comprising a compound of the invention. In one embodiment of the methods described herein, the subject is human. In one aspect, the compounds provided herein are useful in treatment of a disease or condition by acting as an agonist of the orexin-2 receptor.

The compounds of the invention can be used to treat a disease or condition selected from the group consisting of narcolepsy, cataplexy, or hypersomnia in a subject in need thereof.

In one embodiment, the compounds of the invention can be used to treat narcolepsy in a subject. In one embodiment, the compounds of the invention can be used to treat cataplexy in a subject. In one embodiment, the compounds of the invention can be used to treat hypersomnia in a subject.

Orexin-2 receptors are important in a wide range of biological functions. This suggests that orexin-2 receptors play a role in diverse disease processes in humans or other species. The compound of the present invention is useful for treating, preventing, or ameliorating the risk of one or more of the following symptoms or diseases of various neurological and psychiatric diseases associated with alterations in sleep/wake function. That is, narcolepsy, narcolepsy with cataplexy, idiopathic hypersomnia, hypersomnia, sleep apnea syndrome, narcolepsy syndrome, hypersomnolence syndrome characterized by hypersomnia (e.g., in subjects with Kleine Levin syndrome, major depression with hypersomnia, Lewy body dementia, Parkinson's disease, progressive supranuclear paralysis, Prader-Willi syndrome, Mobius syndrome, hypoventilation syndrome, Niemann-Pick disease type C, brain contusion, cerebral infarction, brain tumor, muscular dystrophy, multiple sclerosis, multiple systems atrophy, acute disseminated encephalomyelitis, Guillain-Barre syndrome, Rasmussen's encephalitis, Wernicke's encephalitis, limbic encephalitis, or Hashimoto's encephalopathy), coma, loss of consciousness, obesity (e.g., malignant mastocytosis, exogenous obesity, hyperinsulinar obesity, hyperplasmic obesity, hypop hyseal adiposity, hypoplasmic obesity, hypothyroid obesity, hypothalamic obesity, symptomatic obesity, infantile obesity, upper body obesity, alimentary obesity, hypogonadal obesity, systemic mastocytosis, simple obesity, or central obesity), insulin resistance syndrome, Alzheimer's disease, disturbance of consciousness such as coma and the like, side effects and complications due to anesthesia, sleep disturbance, excessive daytime sleepiness, sleep problem, insomnia, intermittent sleep, nocturnal myoclonus, REM sleep interruption, jet lag, jet lag syndrome, sleep disorder of alternating worker, sleep disorder, night terror, depression, major depression, sleepwalking disease, enuresis, sleep disorder, Alzheimer's dusk, sundowning, diseases associated with circadian rhythm, fibromyalgia, condition arising from decline in the quality of sleep, overeating, obsessive compulsive eating disorder, obesity-related disease, hypertension, diabetes, elevated plasma insulin concentration and insulin resistance, hyperlipidemia, hyperlipemia, endometrial cancer, breast cancer, prostate cancer, colorectal cancer, cancer, osteoarthritis, obstructive sleep apnea, cholelithiasis, gallstones, cardiac disease, abnormal heartbeat, arrhythmia, myocardial infarction, congestive cardiac failure, cardiac failure, coronary heart disease, cardiovascular disorder, polycysticovarian disease, craniopharingioma, Prader-Willi syndrome, Froelich's syndrome, growth hormone deficient, normal mutant short stature, Turner's syndrome, children suffering from acute lymphoblastic leukemia, syndrome X, reproductive hormone abnormality, declining fertility, infertility, male gonadal function decline, sexual and reproductive dysfunction such as female male hirsutism, fetal defects associated with pregnant women obesity, gastrointestinal motility disorders such as obesity-related gastroesophageal reflux, obesity hypoventilation syndrome (Pickwick syndrome), respiratory diseases such as dyspnea, inflammation such as systemic inflammation of the vascular system, arteriosclerosis, hypercholesterolemia, hyperuricemia, lower back pain, gall bladder disease, gout, kidney cancer, risk of secondary outcomes of obesity, such as lowering the risk of left ventricular hypertrophy, migraine pain, headache, neuropathic pain, Parkinson's disease, psychosis, autoimmune encephalitis, cancer related fatigue (such as excessive daytime sleepiness or fatigue associated with cancer and/or chemotherapy), cancer related nausea and vomiting, corticobasal degeneration, Huntington's disease, neuromyelitis optica, nociception, progressive supranuclear palsy, schizophrenia, systemic lupus erythematosus, traumatic brain injury, facial flushing, night sweats, diseases of the genital/urinary system, diseases related to sexual function or fertility, dysthymic disorder, bipolar disorder, bipolar I disorder, bipolar II disorder, cyclothymic disorder, acute stress disorder, agoraphobia, generalized anxiety disorder, obsessive disorder, panic attack, panic disorder, post-traumatic stress disorder (PTSD), separation anxiety disorder, social phobia, anxiety disorder, acute neurological and psychiatric disorders such as cardiac bypass surgery and post-transplant cerebral deficit, stroke, ischemic stroke, cerebral ischemia, spinal cord trauma, head trauma, perinatal hypoxia, cardiac arrest, hypoglycemic nerve injury, Huntington's chorea, amyotrophic lateral sclerosis, eye damage, retinopathy, cognitive impairment, muscle spasm, tremor, epilepsy, disorders associated with muscle spasticity, delirium, amnestic disorder, age-related cognitive decline, schizoaffective disorder, delusional disorder, drug addiction, dyskinesia, chronic fatigue syndrome, fatigue, medication-induced Parkinsonism syndrome, Jill-do La Tourette's syndrome, chorea, myoclonus, tic, restless legs syndrome, dystonia, dyskinesia, attention deficit hyperactivity disorder (ADHD), behavior disorder, urinary incontinence, withdrawal symptoms, trigeminal neuralgia, hearing loss, tinnitus, nerve damage, retinopathy, macular degeneration, vomiting, cerebral edema, pain, bone pain, arthralgia, toothache, cataplexy, and traumatic brain injury (TBI).

Particularly, the compound of the present invention is useful as a therapeutic or prophylactic drug for narcolepsy, idiopathic hypersomnia, hypersomnia, sleep apnea syndrome, narcolepsy syndrome, hypersomnolence syndrome characterized by hypersomnia (e.g., in Parkinson's disease, Guillain-Barre syndrome or Kleine Levin syndrome), Alzheimer's disease, obesity, insulin resistance syndrome, cardiac failure, diseases related to bone loss, sepsis, disturbance of consciousness such as coma and the like, side effects and complications due to anesthesia, and the like, or anesthetic antagonist.

In one embodiment, the compound of the present invention has orexin-2 receptor agonist activity and is useful as a prophylactic or therapeutic agent for narcolepsy.

In another embodiment, the compound of the present invention is useful as a prophylactic or therapeutic agent for narcolepsy type-1. In another embodiment, the compound of the present invention is useful as a prophylactic or therapeutic agent for narcolepsy type-2. In another embodiment, the compound of the present invention is useful as a prophylactic or therapeutic agent for narcolepsy and excessive daytime sleepiness. In another embodiment, the compound of the present invention is useful as a prophylactic or therapeutic agent for narcolepsy, cataplexy, and excessive daytime sleepiness. In another embodiment, the compound of the present invention is useful as a prophylactic or therapeutic agent for narcolepsy and cataplexy. In another embodiment, the compound of the present invention is useful as a prophylactic or therapeutic agent for excessive daytime sleepiness. In another embodiment, the compound of the present invention is useful as a prophylactic or therapeutic agent for idiopathic hypersomnia. In another embodiment, the compound of the present invention is useful as a prophylactic or therapeutic agent for obstructive sleep apnea.

In another embodiment, the compound of the present invention has orexin-2 receptor agonist activity and is useful as a prophylactic or therapeutic agent for hypersomnia in Parkinson's disease.

In another embodiment, the compound of the present invention has orexin-2 receptor agonist activity and is useful as a prophylactic or therapeutic agent for hypersomnia. In another embodiment, the compound of the present invention has orexin-2 receptor agonist activity and is useful as a prophylactic or therapeutic agent for excessive daytime sleepiness associated with Parkinson's disease.

In another embodiment, the compound of the present invention has orexin-2 receptor agonist activity, and is useful as a prophylactic or therapeutic agent for excessive daytime sleepiness or fatigue associated with cancer and/or chemotherapy.

In another embodiment, the present invention provides a method of treating narcolepsy in a subject in need thereof comprising administering to the subject a compound of Formula I-A or I, or a pharmaceutically acceptable salt thereof.

In another embodiment, the present invention provides a method of treating narcolepsy type-1 in a subject in need thereof comprising administering to the subject a compound of Formula I-A or I, or a pharmaceutically acceptable salt thereof.

In another embodiment, the present invention provides a method of treating narcolepsy type-2 in a subject in need thereof comprising administering to the subject a compound of Formula I-A or I, or a pharmaceutically acceptable salt thereof.

In another embodiment, the present invention provides a method of treating narcolepsy and excessive daytime sleepiness in a subject in need thereof comprising administering to the subject a compound of Formula I-A or I, or a pharmaceutically acceptable salt thereof.

In another embodiment, the present invention provides a method of treating narcolepsy, cataplexy, and excessive daytime sleepiness in a subject in need thereof comprising administering to the subject a compound of Formula I-A or I, or a pharmaceutically acceptable salt thereof.

In another embodiment, the present invention provides a method of treating narcolepsy and cataplexy in a subject in need thereof comprising administering to the subject a compound of Formula I-A or I, or a pharmaceutically acceptable salt thereof.

In another embodiment, the present invention provides a method of treating excessive daytime sleepiness in a subject in need thereof comprising administering to the subject a compound of Formula I-A or I, or a pharmaceutically acceptable salt thereof.

In another embodiment, the present invention provides a method of treating idiopathic hypersomnia in a subject in need thereof comprising administering to the subject a compound of Formula I-A or I, or a pharmaceutically acceptable salt thereof.

In another embodiment, the present invention provides a method of treating excessive daytime sleepiness and idiopathic hypersomnia in a subject in need thereof comprising administering to the subject a compound of Formula I-A or I, or a pharmaceutically acceptable salt thereof.

In another embodiment, the present invention provides a method of treating obstructive sleep apnea in a subject in need thereof comprising administering to the subject a compound of Formula I-A or I, or a pharmaceutically acceptable salt thereof.

In another embodiment, the present invention provides a method of treating excessive daytime sleepiness and obstructive sleep apnea in a subject in need thereof comprising administering to the subject a compound of Formula I-A or I, or a pharmaceutically acceptable salt thereof.

In any of the methods as described herein, the subject is administered a compound of Formula I-A. In any of the methods as described herein, the subject is administered a compound of Formula I.

Each of the embodiments described herein with respect to the use of compounds of Formula I also applies to compounds of Formula I-A.

In any of the compositions or methods as described herein, the compound of Formula I-A or I, or a pharmaceutically acceptable salt thereof, is present and/or administered in a therapeutically effective amount.

Administration/Dosage/Formulations

In another aspect, provided herein is a pharmaceutical composition comprising at least one compound of the invention, together with a pharmaceutically acceptable carrier.

Actual dosage levels of the active ingredients in the pharmaceutical compositions of this invention may be varied so as to obtain an amount of the active ingredient that is effective to achieve the desired therapeutic response for a particular patient, composition, and mode of administration, without being toxic to the patient.

In particular, the selected dosage level will depend upon a variety of factors including the activity of the particular compound employed, the time of administration, the rate of excretion of the compound, the duration of the treatment, other drugs, compounds or materials used in combination with the compound, the age, sex, weight, condition, general health and prior medical history of the patient being treated, and like factors well, known in the medical arts.

A medical doctor, e.g., physician or veterinarian, having ordinary skill in the art may readily determine and prescribe the effective amount of the pharmaceutical composition required. For example, the physician or veterinarian could begin administration of the pharmaceutical composition to dose the disclosed compound at levels lower than that required in order to achieve the desired therapeutic effect and gradually increase the dosage until the desired effect is achieved.

In particular embodiments, it is especially advantageous to formulate the compound in dosage unit form for ease of administration and uniformity of dosage. Dosage unit form as used herein refers to physically discrete units suited as unitary dosages for the patients to be treated; each unit containing a predetermined quantity of the disclosed compound calculated to produce the desired therapeutic effect in association with the required pharmaceutical vehicle. The dosage unit forms of the invention are dictated by and directly dependent on (a) the unique characteristics of the disclosed compound and the particular therapeutic effect to be achieved, and (b) the limitations inherent in the art of compounding/formulating such a disclosed compound for the treatment of narcolepsy or cataplexy in a patient.

In one embodiment, the compounds of the invention are formulated using one or more pharmaceutically acceptable excipients or carriers. In one embodiment, the pharmaceutical compositions of the invention comprise a therapeutically effective amount of a disclosed compound and a pharmaceutically acceptable carrier.

In some embodiments, the dose of a disclosed compound is from about 1 mg to about 1,000 mg. In some embodiments, a dose of a disclosed compound used in compositions described herein is less than about 1,000 mg, or less than about 800 mg, or less than about 600 mg, or less than about 500 mg, or less than about 300 mg, or less than about 200 mg, or less than about 100 mg, or less than about 50 mg, or less than about 20 mg, or less than about 10 mg. For example, a dose is about 10 mg, 20 mg, 25 mg, 30 mg, 40 mg, 50 mg, 60 mg, 70 mg, 80 mg, 90 mg, 100 mg, 120 mg, 140 mg, 160 mg, 180 mg, 200 mg, 220 mg, 240, 260 mg, 280 mg, 300 mg, 350 mg, 400 mg, 450 mg, 500 mg, 550 mg, or about 600 mg.

Routes of administration of any of the compositions of the invention include oral, nasal, rectal, intravaginal, parenteral, buccal, sublingual or topical. The compounds for use in the invention may be formulated for administration by any suitable route, such as for oral or parenteral, for example, transdermal, transmucosal (e.g., sublingual, lingual, (trans) buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, and topical administration. In one embodiment, the preferred route of administration is oral.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions that would be useful in the present invention are not limited to the particular formulations and compositions that are described herein.

For oral application, particularly suitable are tablets, dragees, liquids, drops, suppositories, or capsules, caplets and gelcaps. The compositions intended for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For parenteral administration, the disclosed compounds may be formulated for injection or infusion, for example, intravenous, intramuscular or subcutaneous injection or infusion, or for administration in a bolus dose or continuous infusion. Suspensions, solutions or emulsions in an oily or aqueous vehicle, optionally containing other formulatory agents such as suspending, stabilizing or dispersing agents may be used.

Those skilled in the art will recognize or be able to ascertain using no more than routine experimentation, numerous equivalents to the specific procedures, embodiments, claims, and examples described herein. Such equivalents are considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

It is to be understood that wherever values and ranges are provided herein, all values and ranges encompassed by these values and ranges, are meant to be encompassed within the scope of the present invention. Moreover, all values that fall within these ranges, as well as the upper or lower limits of a range of values, are also contemplated by the present application.

The following examples further illustrate aspects of the present invention. However, they are in no way a limitation of the teachings or disclosure of the present invention as set forth herein.

EXAMPLES

The invention is further illustrated by the following examples, which should not be construed as further limiting. The practice of the present invention will employ, unless otherwise indicated, conventional techniques of organic synthesis, cell biology, cell culture, molecular biology, transgenic biology, microbiology and immunology, which are within the skill of the art.

General Procedures

Example 1: Synthesis Procedures

Synthesis procedures for preparation of the compounds of the invention are readily available to the ordinary skilled artisan. Unless otherwise indicated, starting materials were generally obtained from commercial sources.

The following abbreviations are used in the synthetic examples below:
DCM=dichloromethane
MsCl=methanesulfonyl chloride
MeOH=methanol
THF=tetrahydrofuran
EtOH=ethanol
DIPEA=N,N-diisopropylethylamine
ACN or MeCN=acetonitrile
$NEt_3$ or TEA=triethylamine
PE=petroleum ether
EtOAc=ethyl acetate
TFA=trifluoroacetic acid
min=minutes
hr=hours
NaH=sodium hydride
DMSO=dimethyl sulfoxide
TMSCl=trimethylsilyl chloride
Pd/C=palladium on carbon
Ms=methanesulfonyl
Bn=benzyl
Ph=phenyl
LiHMDS=lithium bis(trimethylsilyl)amide
$Pd(OH)_2$/C=Palladium hydroxide on carbon
DMAP=4-(dimethylamino)pyridine
KOAc=potassium acetate
$Pd(dppf)Cl_2$=[1,1'-bis(diphenylphosphino)ferrocene]dichloropalladium(II)
$Pd(PPh_3)_4$=tetrakis(triphenylphosphine)palladium(0)

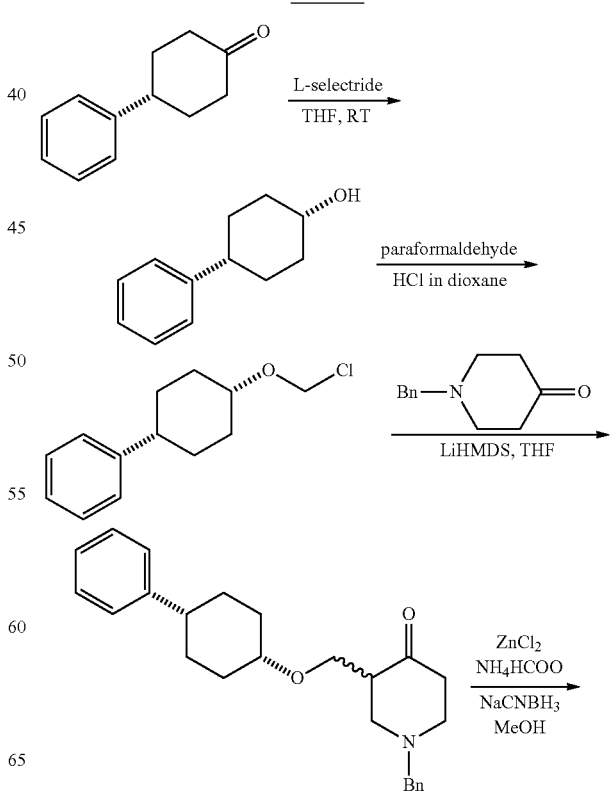

Scheme 1

49
-continued
50
-continued
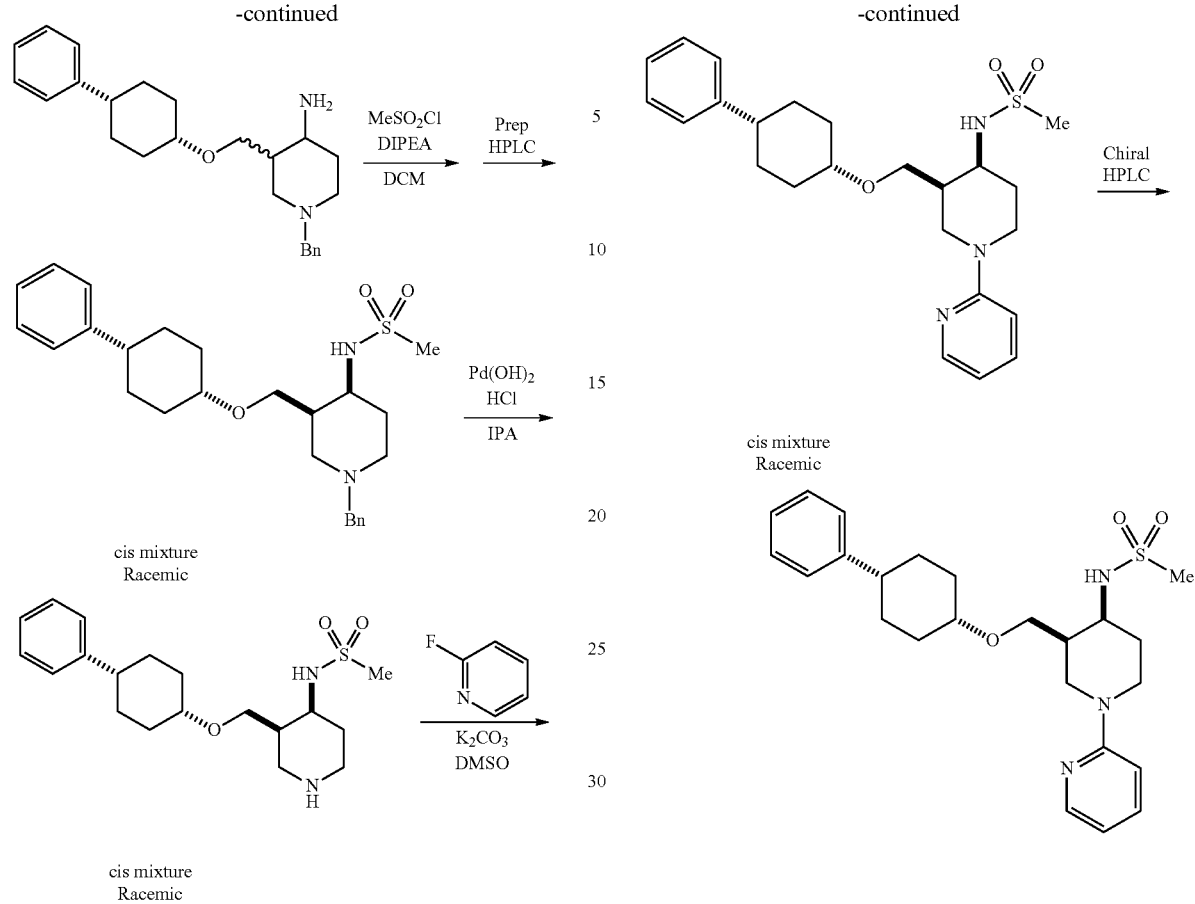
Scheme 2
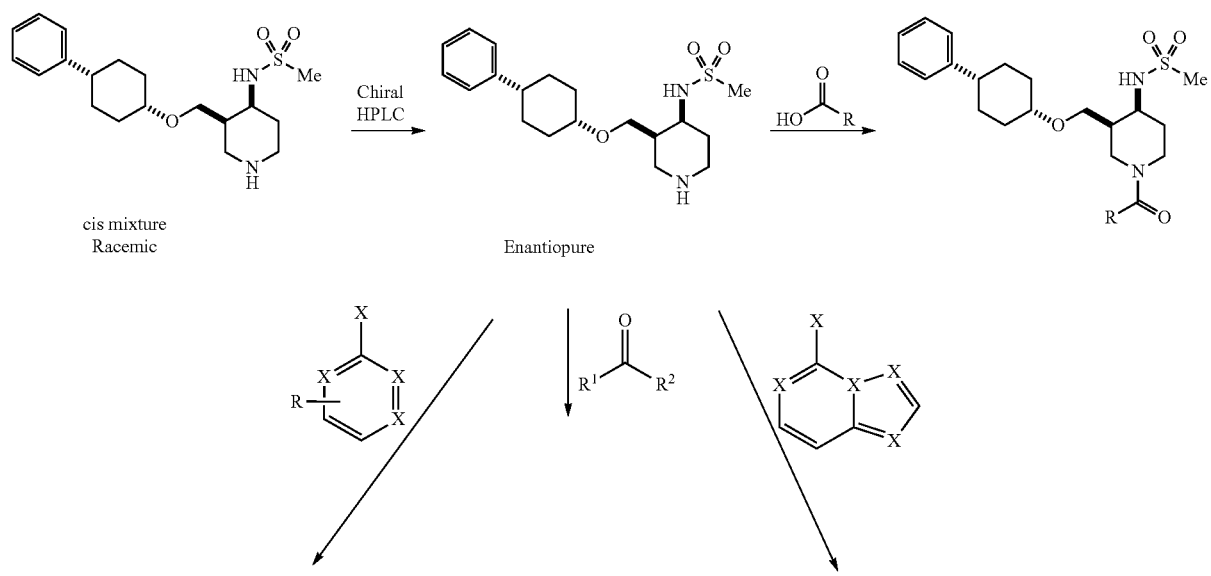

51 52
-continued
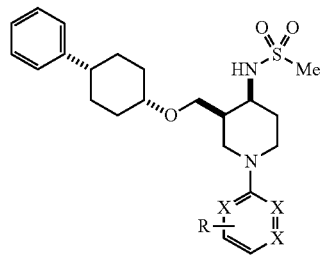 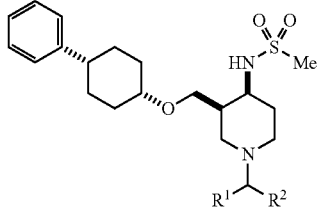 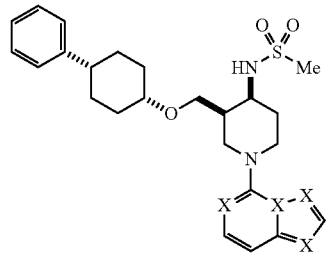
Scheme 3.
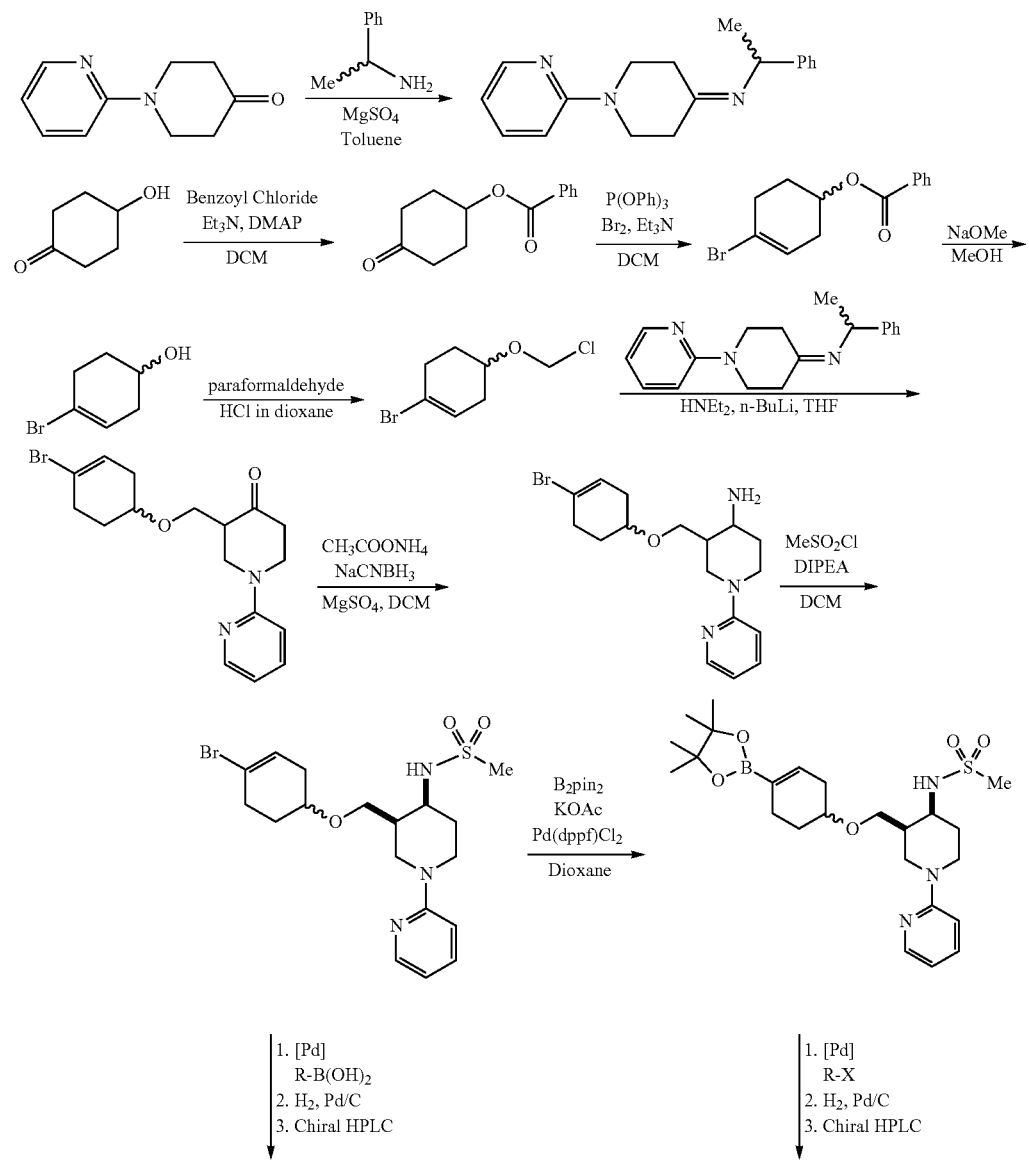

-continued

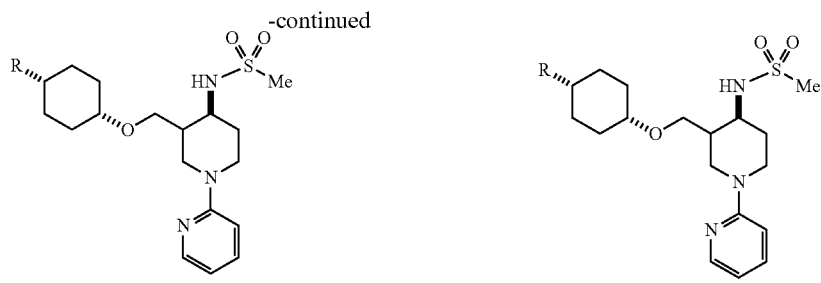

Scheme 4.

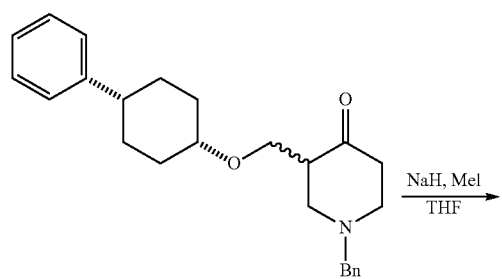

Racemic; prepared as shown herein

NaH, MeI
THF
→

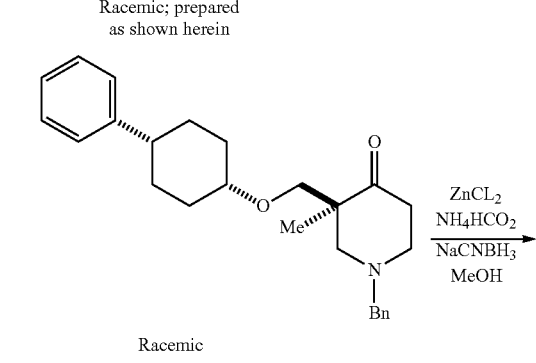

Racemic

ZnCl₂
NH₄HCO₂
NaCNBH₃
MeOH
→

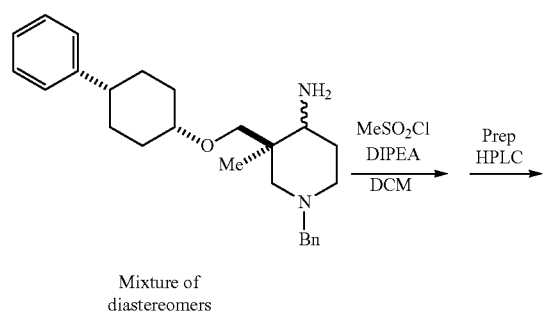

Mixture of diastereomers

MeSO₂Cl
DIPEA
DCM
→
Prep
HPLC
→

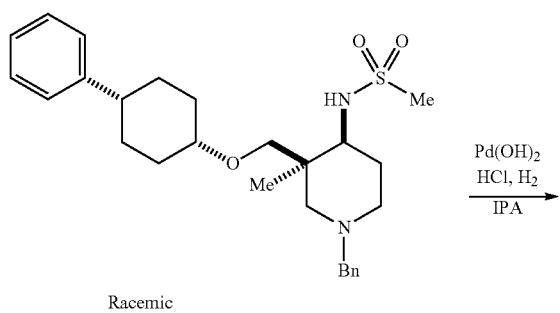

Racemic

Pd(OH)₂
HCl, H₂
IPA
→

-continued

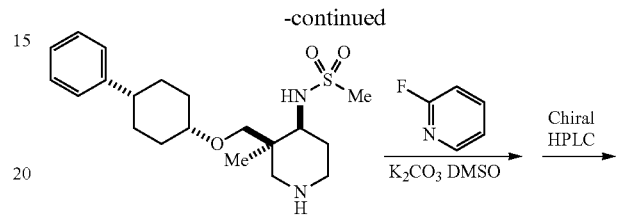

Racemic

K₂CO₃ DMSO
→
Chiral HPLC
→

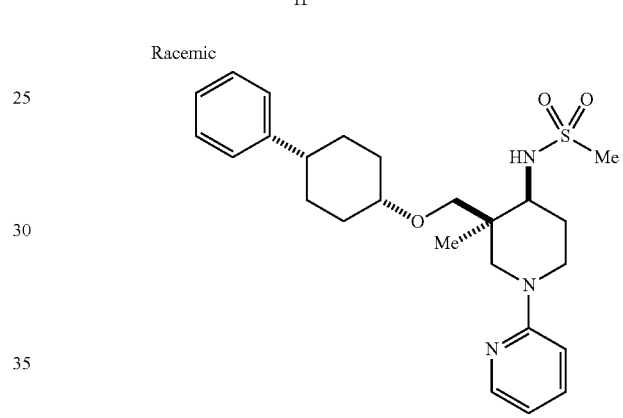

Example 1.1

To a stirred solution of 4-hydroxycyclohexan-1-one (2.00 g, 17.5 mmol, 1.00 equiv.) and benzoyl chloride (2.46 g, 17.522 mmol, 1.00 equiv.) in DCM (50.00 mL) was added triethylamine (2.66 g, 26.3 mmol, 1.50 equiv.) and DMAP (214.06 mg, 1.752 mmol, 0.10 equiv.) dropwise at 0 degrees C. The resulting mixture was stirred for two hours at room temperature. To the above mixture was added benzoyl chloride (1.23 g, 8.761 mmol, 0.50 equiv.) dropwise at room temperature. The resulting mixture was stirred for an additional three hours at room temperature. When the reaction was complete by TLC, the crude mixture was diluted with water. The aqueous layer was extracted with DCM (3×50 mL). The combined organic layers were dried over anhydrous MgSO₄. The residue was purified by silica gel chromatography, eluting with PE/EtOAc (4:1) to afford 4-oxo-cyclohexyl benzoate (3.37 g, 88.12% yield) as a solid.

LCMS: m/z (ES+), [M+H]+=219.65.

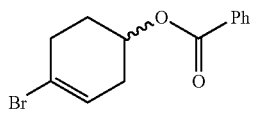

To a stirred solution of P(OPh)₃ (7.82 g, 25.2 mmol, 1.10 equiv.) in DCM (70.00 mL) was added Br₂ (1.41 mL, 8.81 mmol, 1.20 equiv.) dropwise at −60 degrees C. under nitrogen atmosphere. 30 minutes later, to the above mixture was added NEt₃ (4.14 mL, 40.9 mmol, 1.30 equiv.) and 4-oxocyclohexyl benzoate (5.00 g, 22.9 mmol, 1.00 equiv.) at −60 degrees C. The resulting mixture was stirred for 18 hr at room temperature. The reaction was quenched by the addition of saturated aqueous NaSO₃ (aqueous, 20 mL) at 0 degrees C. The resulting mixture was extracted with DCM (3×50 mL). The combined organic layers were washed with brine (2×50 mL), dried over anhydrous Na₂SO₄. After filtration, the filtrate was concentrated under reduced pressure. The residue was purified by silica gel column chromatography, eluted with PE/EtOAc (20:1) to afford 4-bromocyclohex-3-en-1-yl benzoate (5.8 g, 90.05%) as a solid in racemic form.

LCMS: m/z (ES+), [M+H]+=282.15.

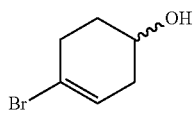

A solution of racemic 4-bromocyclohex-3-en-1-yl benzoate (3.00 g, 10.7 mmol, 1.00 equiv.) and sodium methoxide (634.11 mg, 11.738 mmol, 1.10 equiv.) in MeOH (30 mL) was stirred overnight at room temperature under nitrogen atmosphere. Desired product could be detected by TLC. The reaction was quenched with water (20 mL) at room temperature. The resulting mixture was extracted with DCM (4×50 mL). The combined organic layers were washed with water (3×30 mL), dried over anhydrous Na₂SO₄. After filtration, the filtrate was concentrated under reduced pressure. The residue was purified by silica gel column chromatography, eluted with PE/EtOAc (4:1) to afford 4-bromocyclohex-3-en-1-ol (1.7 grams, 90% yield) as an oil.

¹H-NMR (400 MHz, Chloroform-d) δ 5.94 (d, 1H), 4.08-3.95 (m, 1H), 2.68-2.32 (m, 3H), 2.23-1.74 (m, 3H).

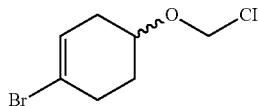

A solution of 4-bromocyclohex-3-en-1-ol (6.50 grams, 36.7 mmol, 1.00 equiv.) and paraformaldehyde (1.65 grams, 55.1 mmol, 1.50 equiv.) in TMSCl (19.5 mL, 180 mmol, 4.16 equiv.) was stirred overnight at room temperature under nitrogen atmosphere. Desired product could be detected by TLC. The resulting mixture was filtered, and the filter cake was washed with THE (3×10 mL). The filtrate was concentrated under reduced pressure, and the resulting crude product was used directly in the next step without purification.

¹H-NMR (400 MHz, Chloroform-d) δ 6.00-5.85 (m, 1H), 5.57 (s, 2H), 4.11 (d, 1H), 2.73-2.35 (m, 3H), 2.31-2.13 (m, 1H), 2.03-1.81 (m, 2H).

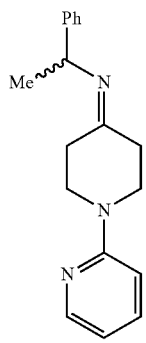

To a stirred mixture of 1-(pyridine-2-yl)piperidin-4-one (5.00 grams, 28.4 mmol, 1.00 equiv.) and MgSO₄ (10.25 grams, 85.12 mmol, 3.00 equiv.) in toluene (75 mL) was added racemic methylbenzylamine (3.44 grams, 28.4 mmol, 1.00 equiv.) dropwise at room temperature under nitrogen atmosphere. The resulting mixture was stirred overnight at room temperature under nitrogen atmosphere. Then, the crude reaction was filtered, and the filter cake was washed with toluene (2×20 mL). The filtrate was concentrated under reduced pressure. The resulting crude product was used directly in the next step without purification. Desired product could be detected by TLC.

¹H-NMR (400 MHz, Chloroform-d) δ 8.26-8.14 (m, 1H), 7.57-7.41 (m, 1H), 7.42-7.15 (m, 6H), 6.74-6.53 (m, 2H), 4.76 (q, 1H), 3.98-3.88 (m, 1H), 3.87-3.63 (m, 3H), 2.75-2.57 (m, 2H), 2.58-2.27 (m, 2H), 1.73 (s, 1H), 1.47 (dd, 3H).

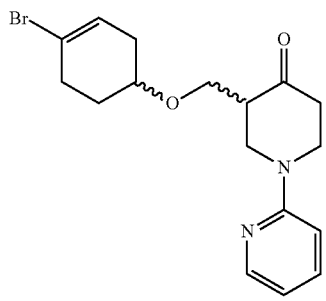 [SMILES: O=C1CCN(c2ccccn2)CC1COC1CC=C(Br)CC1]

To a stirred solution of diethylamine (2.45 grams, 33.5 mmol, 1.20 equiv.) in tetrahydrofuran (30 mL) was added n-butyllithium (13.4 mL, 33.5 mmol, 1.20 equiv.) dropwise at −78 degrees C. under nitrogen atmosphere. The resulting mixture was stirred for 30 minutes at −78 degrees C. under nitrogen atmosphere. To the above mixture was added the imine (1S)-1-phenyl-N-[1-(pyridine-2-yl)piperidine-4-ylidene]ethanamine (7.80 grams, 27.9 mmol, 1.00 equiv.) in THE (20 mL) dropwise over 15 minutes at −78 degrees C. The resulting mixture was stirred for an additional one hour. To the above mixture was added 1-bromo-4-(chloromethoxy)cyclohex-1-ene (7.56 grams, 33.5 mmol, 1.20 equiv.) in THE (20 mL) dropwise over 15 minutes at −78 degrees C. The resulting mixture was stirred for an additional one hour. Then, the reaction was quenched by the addition of sodium phosphate buffer (200 mL, 10% aqueous) and stirred for one hour.

The resulting mixture was extracted with DCM. The combined organic layers were washed with brine and dried over anhydrous MgSO₄. After filtration, the filtrate was concentrated under reduced pressure. The residue was purified by silica gel column chromatography, eluting with PE/EtOAc (4:1) to afford 3-[[(4-bromocyclohex-3-en-1-yl)oxy]methyl]-1-(pyridine-2-yl)piperidine-4-one (3 grams, 29% yield) as an oil.

LCMS: m/z (ES+), [M+H]+=366.27.

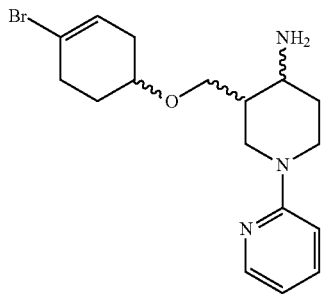 [SMILES: NC1CCN(c2ccccn2)CC1COC1CC=C(Br)CC1]

To a stirred solution of 3-[[(4-bromocyclohex-3-en-1-yl)oxy]methyl]-1-(pyridine-2-yl)piperidin-4-one (5.20 grams, 14.2 mmol, 1.00 equiv.) in methanol (40 mL) was added $ZnCl_2$ (2.85 mL, 1.99 mmol, 0.14 equiv.) dropwise at room temperature under nitrogen atmosphere. The reaction mixture was irradiated with microwave radiation for 30 minutes at room temperature. To the above mixture was added $HCOONH_4$ (13.46 grams, 213.5 mmol, 15.00 equiv.) at room temperature. The resulting mixture was stirred for an additional one hour at room temperature. To the above mixture was added $ZnCl_2$ (2.85 mL, 1.99 mmol, 0.14 equiv.) at 0 degrees C. The resulting mixture was stirred for an additional two days at room temperature. The reaction was then quenched by the addition of water (20 mL) at room temperature. The mixture was then extracted with DCM (3×100 mL), and the combined organics layers were washed with brine (2×50 mL) and dried over anhydrous $Na_2SO_4$. After filtration, the filtrate was concentrated under reduced pressure. The residue was purified by silica gel chromatography, eluting with DCM/MeOH (6:1) to afford 3-[[(4-bromocyclohex-3-en-1-yl)oxy]methyl]-1-(pyridine-2-yl)piperidine-4-amine (3.7 grams, 71% yield) as an oil.

LCMS: m/z (ES+), [M+H]+=367.30.

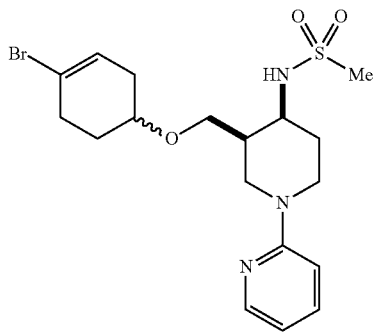

To a stirred solution of 3-[[(4-bromocyclohex-3-en-1-yl)oxy]methyl]-1-(pyridine-2-yl)piperidin-4-amine (1.90 grams, 5.187 mmol, 1.00 equiv.) and diisopropylethylamine (2.01 grams, 15.6 mmol, 3.00 equiv.) in DCM (30 mL) was added methanesulfonyl chloride (0.89 grams, 7.78 mmol, 1.50 equiv.) dropwise at room temperature under nitrogen atmosphere. The resulting mixture was stirred for 30 minutes at room temperature under nitrogen atmosphere. The crude residue was purified by silica gel column chromatography, eluting with PE/EtOAc (1:1) to afford N-[3-([[(1R)-4-bromocyclohex-3-en-1-yl]oxy]methyl)-1-(pyridin-2-yl)piperidin-4-yl]methanesulfonamide (1.3 grams, 65% yield) as an oil. This product was then purified by Prep-HPLC with the following conditions (Column: DAICEL DCpak® (Daicel Corporation, Osaka, Japan) P4VP, 20 mm*250 mm, 5um; Mobile Phase A: $CO_2$, Mobile Phase B: ACN/MeOH=4:1 (0.1% 2M $NH_3$—MeOH); Flow rate: 50 mL/min; Gradient: 25% B; 254 nm) to afford N-[3-([[(1R)-4-bromocyclohex-3-en-1-yl]oxy]methyl)-1-(pyridin-2-yl)piperidin-4-yl]methanesulfonamide (375 mg, 18.8% yield) as an oil.

LCMS: m/z (ES+), [M+H]+=445.39.

$^1$H-NMR (400 MHz, Chloroform-d) δ 8.23-8.08 (m, 1H), 7.50 (dd, 1H), 6.80-6.54 (m, 2H), 5.92 (dt, 1H), 5.11 (dd, 1H), 4.46-4.17 (m, 2H), 3.79-3.61 (m, 3H), 3.61-3.43 (m, 2H), 3.02 (d, 3H), 2.93 (t, 1H), 2.74 (dt, 1H), 2.61-2.47 (m, 2H), 2.47-2.32 (m, 1H), 2.27 (d, 1H), 2.16 (dt, 1H), 2.04-1.91 (m, 1H), 1.84 (d, 2H), 1.68-1.54 (m, 1H).

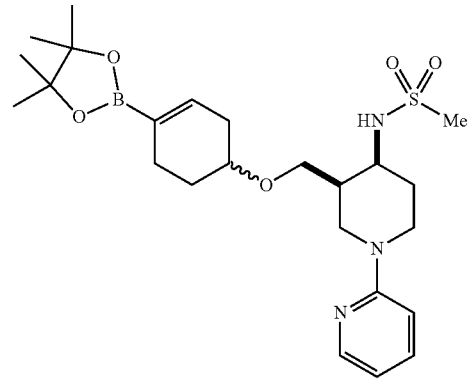 [SMILES: CC1(C)OB(C2=CCC(OC[C@@H]3CN(c4ccccn4)CC[C@@H]3NS(C)(=O)=O)CC2)OC1(C)C]

To a stirred solution of N-(3-[[(4-bromocyclohex-3-en-1-yl)oxy]methyl]-1-(pyridin-2-yl)piperidin-4-yl)methanesulfonamide (1.00 grams, 2.25 mmol, 1.00 equiv.) and bis(pinacolato)diboron (857.15 mg, 3.375 mmol, 1.50 equiv.) in dioxane was added KOAc (0.66 grams, 6.751 mmol, 3.00 equiv.) at room temperature under air atmosphere. To the above mixture was added Pd(dppf)$Cl_2$ (0.16 grams, 0.225 mmol, 0.10 equiv.) at room temperature. The resulting mixture was stirred for 4 hr at 100 degrees C. under nitrogen atmosphere. The resulting crude product was extracted with EtOAc (3×50 mL). The combined organic layers were washed with brine (20 mL) and dried over anhydrous $Na_2SO_4$. After filtration, the filtrate was concentrated under reduced pressure. The residue was purified by silica gel column chromatography, eluting with PE/EtOAc (1:1) to afford N-[1-(pyridin-2-yl)-3-([[(1R)-4-(4,4,5,5-tetramethyl-1,3,2-dioxaborolan-2-yl)cyclohex-3-en-1-yl]oxy]methyl)piperidin-4-yl]methanesulfonamide (1.0 grams, 90% yield) as a solid.

LCMS (E07880-030): m/z (ES+), [M+H]+=492.45.

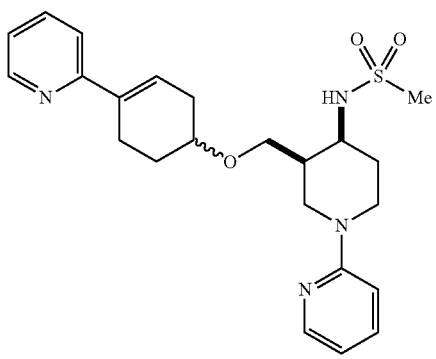 [SMILES: CS(=O)(=O)N[C@H]1CCN(c2ccccn2)C[C@H]1COC1CC=C(c2ccccn2)CC1]

To a stirred solution of N-(3-[[(4-bromocyclohex-3-en-1-yl)oxy]methyl]-1-(pyridin-2-yl)piperidin-4-yl)methanesulfonamide (200.0 mg, 0.450 mmol, 1.00 equiv.) and 2-bromopyridine (71.1 mg, 0.450 mmol, 1.00 equiv.) in 1,4-dioxane (5 mL) and water (1 mL) were added Cs$_2$CO$_3$ (366.6 mg, 1.125 mmol, 2.50 equiv.) and Pd(PPh$_3$)$_4$ (52.0 mg, 0.045 mmol, 0.10 equiv.) at room temperature under nitrogen atmosphere. The resulting mixture was stirred overnight at 80 degrees C. under nitrogen atmosphere. The resulting residue was purified by Prep-TLC (EtOAc) to afford N-[1-(pyridin-2-yl)-3-([[4-(pyridin-2-yl)cyclohex-3-en-1-yl]oxy]methyl)piperidin-4-yl]methanesulfonamide (170 mg, 85.4% yield) as an oil.

LCMS: m/z (ES+), [M+H]+=443.58.

(Compound 2)

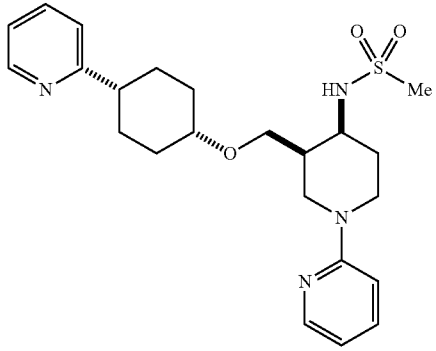

To a room temperature, stirred solution of N-[1-(pyridin-2-yl)-3-([[4-(pyridin-2-yl)cyclohex-3-en-1-yl]oxy]methyl)piperidin-4-yl]methanesulfonamide (150.0 mg, 0.339 mmol, 1.00 equiv.) in MeOH (10 mL) was added Pd/C (72.1 mg, 0.0678 mmol, 2.00 equiv.). The atmosphere was exchanged for hydrogen, and the resulting mixture was stirred for two hours at room temperature under hydrogen atmosphere. The resulting mixture was filtered, and the filter cake was washed with methanol (3×20 mL). The filtrate was concentrated under reduced pressure. The residue was purified by reverse flash chromatography with the following conditions: column, C$_{18}$ silica gel; mobile phase, MeCN in TFA/water, 0% to 20% gradient over 30 minutes; detector, UV 254 nm. This resulted in the product N-[1-(pyridin-2-yl)-3-([[4-(pyridin-2-yl)cyclohexyl]oxy]methyl)piperidin-4-yl]methanesulfonamide (60 mg, 40% yield) as an oil as a mixture of isomers.

LCMS: m/z (ES+), [M+H]+=445.59.

This mixture of isomers (60 mg) was purified further by CHIRAL-Prep-HPLC with the following conditions (Column: CHIRALPAK® (Daicel Corporation, Osaka, Japan) IE, 2 cm*25 cm, 5 um; Mobile Phase A: Hexanes (with 0.2% diethylamine); Mobile Phase B: IPA; Flow rate: 20 mL/min; Isocratic 40% B over 25 min; Detector: 220/254 nm) to afford N-[(3R,4S)-1-(pyridin-2-yl)-3-([[(1s,4s)-4-(pyridin-2-yl)cyclohexyl]oxy]methyl)piperidin-4-yl]methanesulfonamide (15.8 mg, 26.33%) as a solid.

LCMS: (E07273-129): m/z (ES+), [M+H]+=445.59.

$^1$H-NMR (400 MHz, Methanol-d$_4$) δ 8.43 (d, 1H), 8.06 (dd, 1H), 7.78 (d, 1H), 7.52 (d, 1H), 7.35 (dt, 1H), 7.25 (d, 1H), 6.92-6.84 (m, 1H), 6.63 (d, 1H), 3.87 (dq, 2H), 3.75 (dd, 1H), 3.71-3.60 (m, 2H), 3.59-3.52 (m, 2H), 3.47 (dd, 1H), 3.05 (s, 3H), 2.76 (t, 1H), 2.29 (dt, 1H), 2.09 (d, 2H), 2.00-1.80 (m, 4H), 1.75-1.52 (m, 4H).

Example 1.2

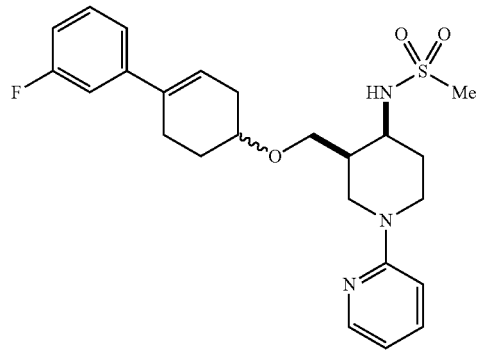

Into a 20 mL sealed tube were added N-(3-[[(4-bromocyclohex-3-en-1-yl)oxy]methyl]-1-(pyridin-2-yl)piperidin-4-yl)methanesulfonamide (200.00 mg, 0.450 mmol, 1.00 equiv.), Na$_2$CO$_3$ (143.10 mg, 1.350 mmol, 3.00 equiv.), 3-fluorophenylboronic acid (94.46 mg, 0.675 mmol, 1.50 equiv.), dioxane (4.00 mL), water (1.00 mL) and Pd(dppf)Cl$_2$ (19.76 mg, 0.027 mmol, 0.06 equiv.) at room temperature. The resulting mixture was stirred for two hours at 80 degrees C. under nitrogen atmosphere. The aqueous layer was extracted with EtOAc (1×10 mL). The resulting mixture was concentrated under reduced pressure, and the crude product was purified by reverse flash chromatography with the following conditions: column, C$_{18}$ silica gel; mobile phase: ACN water, 10% to 60% gradient over 20 minutes; detector, UV 254 nm. This resulted in N-[3-([[4-(3-fluorophenyl)cyclohex-3-en-1-yl]oxy]methyl)-1-(pyridin-2-yl)piperidin-4-yl]methanesulfonamide (200 mg, 96.7% yield) as a solid.

LCMS: m/z (ES+), [M+H]+=460.

(Compound 6)

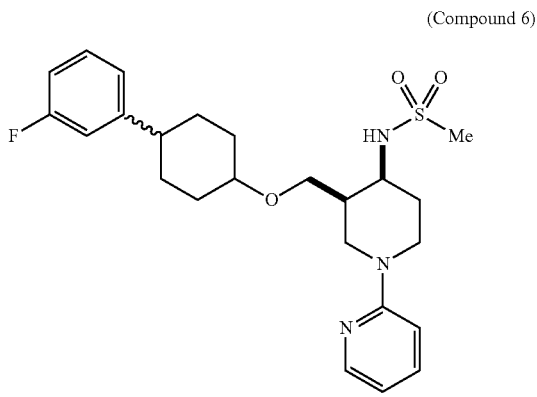 [SMILES: CS(=O)(=O)N[C@H]1CCN(c2ccccn2)C[C@H]1COC1CCC(c2cccc(F)c2)CC1]

A solution/mixture of N-[3-([[4-(3-fluorophenyl)cyclohex-3-en-1-yl]oxy]methyl)-1-(pyridin-2-yl)piperidin-4-yl]methanesulfonamide (187 mg, 0.407 mmol, 1.00 equiv.) and Pd/C (49.8 mg, 0.468 mmol, 1.15 equiv.) in ethyl acetate (15.0 mL) was stirred for two hours at room temperature under hydrogen atmosphere. Desired product could be detected by LCMS. The resulting mixture was filtered, and the filter cake was washed with EtOAc (3×10 mL). The filtrate was concentrated under reduced pressure. The residue was purified by reverse phase chromatography with the following conditions: column, $C_{18}$ silica gel; mobile phase, ACN in water; 10% to 60% gradient over 20 minutes; detector, UV 254 nm. This resulted in N-[3-([[4-(3-fluorophenyl)cyclohexyl]oxy]methyl)-1-(pyridin-2-yl)piperidin-4-yl]methanesulfonamide (97 mg, 52% yield) as a solid as a mixture of isomers.

LCMS: m/z (ES+), [M+H]+=462.

This mixture of isomers (97 mg) was purified by Prep-CHIRAL-HPLC with the following conditions: column, CHIRALPAK® IE, 2*25 cm, 5um; mobile phase A: hexanes with 0.2% diethylamine; mobile phase B, ethanol; flow rate, 20 mL/min; isocratic 35% B over 15.5 min; detector, 220/254 nm. This afforded N-[(3R,4S)-1-(pyridin-2-yl)-3-([[(1s,4s)-4-(3-fluorophenyl)cyclohexyl]oxy]methyl)piperidin-4-yl]methanesulfonamide (20.7 mg, 21.34%) as a solid.

LCMS: m/z (ES+), [M+H]+=462.

$^1$H-NMR (400 MHz, MeOD) δ 1.56 (m, 1H), 1.61 (m, 3H), 1.77 (m, 1H), 1.88 (m, 3H), 2.06 (m, 2H), 2.30 (dt, 1H), 2.58 (m, 1H), 3.05 (s, 3H), 3.46 (dt, 1H), 3.56 (m, 2H), 3.64 (m, 2H), 3.76 (m, 1H), 3.86 (m, 2H), 6.64 (ddd, 1H), 6.88 (m, 2H), 6.97 (dt, 1H), 7.05 (dt, 1H), 7.27 (m, 1H), 7.52 (ddd, 1H), 8.07 (ddd, 1H).

Example 1.3

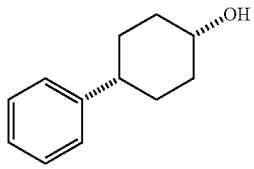

Into a 500 mL 3-necked round-bottom flask were added 4-phenylcyclohexan-1-one (15.00 g, 86.087 mmol, 1.00 equiv.), THF (130.00 mL), and L-selectride (129.08 mL, 679.021 mmol, 7.02 equiv.) at room temperature. The resulting mixture was stirred for 16 hr at room temperature under nitrogen atmosphere. Then, water (0.16 mL, 8.609 mmol, 0.10 equiv.) and EtOH (0.10 mL, 2.171 mmol, 0.02 equiv.) were added. The resulting mixture was stirred for 1 hr at room temperature under nitrogen atmosphere. NaOH (5.99 g, 149.791 mmol, 1.74 equiv.) and $H_2O_2$ (0.02 mL, 0.590 mmol, 0.01 equiv.) were added, and the resulting mixture was stirred for 1 hr at 0 degrees C. under nitrogen atmosphere. The resulting mixture was washed with water (2×50 mL). The residue was purified by silica gel column chromatography, eluted with PE/EtOAc (9:1) to afford 4-phenylcyclohexan-1-ol (11.4 g, 75.1%) as a solid.

$^1$H-NMR (400 MHz, Chloroform-d) δ 7.41-7.15 (m, 5H), 4.16 (p, J=3.0 Hz, 1H), 2.57 (tt, J=12.0, 3.2 Hz, 1H), 2.04-1.84 (m, 4H), 1.71 (tdd, J=14.5, 5.3, 2.4 Hz, 4H), 1.46 (d, J=3.0 Hz, 1H).

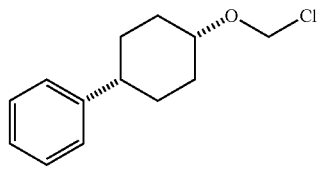

A solution of 4-phenylcyclohexan-1-ol (10.00 g, 56.735 mmol, 1.00 equiv.) in 4N HCl in dioxane (160.00 mL, 640.00 mmol, 11.3 equiv.) was treated with paraformaldehyde (2.56 g, 28.367 mmol, 0.50 equiv.) at room temperature under nitrogen atmosphere. The resulting mixture was stirred for 5 hr at room temperature under nitrogen atmosphere. The resulting mixture was concentrated under reduced pressure. The resulting mixture was used in the next step directly without further purification.

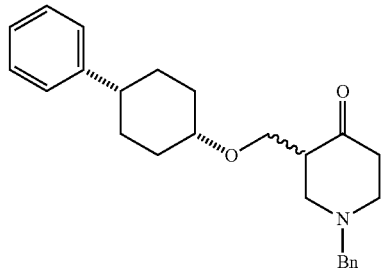

Racemic

To a stirred solution of [4-(chloromethoxy)cyclohexyl]benzene (12.6 g, 56.067 mmol, 1.00 equiv.) in THF (200.00 mL) was added LiHMDS (56.07 mL, 56.070 mmol, 1.00 equiv.) dropwise at −78 degrees C. under nitrogen atmosphere over 15 minutes. The resulting mixture was stirred for 1.5 hr at −78 degrees C. under nitrogen atmosphere. To the above mixture was added [4-(chloromethoxy)cyclohexyl]benzene (12.6 g, 56.067 mmol, 1.00 equiv.) as a solution in THF (50 mL) dropwise over 20 minutes at −78 degrees C. The resulting mixture was stirred for an additional 2 hours at −78 degrees C. The reaction was quenched with saturated aqueous $NH_4Cl$ at 0 degrees C. The resulting mixture was extracted with EtOAc (3×100 mL). The combined organic layers were washed with brine (2×130 mL) and dried over anhydrous sodium sulfate. After filtration, the filtrate was concentrated under reduced pressure. The residue was purified by reverse flash chromatography with the following conditions: column, $C_{18}$ silica gel; mobile phase, MeCN in water, 10% to 100% gradient in 15 minutes; detector, UV 220 nm to afford 1-benzyl-3-[[(4-phenylcyclohexyl)oxy]methyl]piperidin-4-one (6.1 g, 28.80%) as an oil.

LCMS: m/z (ES+), [M+H]+=378.30.

¹H-NMR (400 MHz, Chloroform-d) δ 7.42-7.29 (m, 7H), 7.21 (dtd, J=7.0, 3.5, 1.7 Hz, 3H), 3.80 (dd, J=9.6, 4.7 Hz, 1H), 3.77-3.61 (m, 2H), 3.59 (p, J=3.1 Hz, 1H), 3.49 (dd, J=9.6, 8.3 Hz, 1H), 3.33 (ddd, J=11.4, 5.7, 2.4 Hz, 1H), 3.04 (ddd, J=11.7, 5.7, 2.8 Hz, 1H), 2.91 (tt, J=9.7, 5.3 Hz, 1H), 2.68-2.35 (m, 5H), 2.00 (dt, J=13.9, 3.2 Hz, 2H), 1.73 (tdd, J=15.1, 12.4, 3.4 Hz, 2H), 1.61 (d, J=13.4 Hz, 2H), 1.57-1.43 (m, 2H).

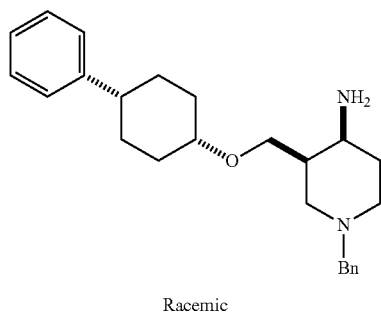

Racemic

To a stirred solution of 1-benzyl-3-[[(4-phenylcyclohexyl)oxy]methyl]piperidin-4-one (2.00 g, 5.298 mmol, 1.00 equiv.) in methanol (12.00 mL) was added ZnCl₂ (1.06 mL, 1.060 mmol, 0.2 equiv.) dropwise at room temperature under nitrogen atmosphere. The resulting mixture was stirred for 30 minutes at room temperature under nitrogen atmosphere. To the above mixture was added HCOONH₄ (4.00 g, 63.413 mmol, 11.97 equiv.) in portions at room temperature. The resulting mixture was stirred for an additional 1 hour at room temperature. Solid NaBH₃CN (665.83 mg, 10.595 mmol, 2.0 equiv.) was added. The reaction was then stirred for 3 hr at ambient temperature and terminated by the addition of water. The quenched reaction was partitioned between 5M NaOH and DCM. The aqueous layer was extracted with DCM, and combined organic layers were dried over sodium sulfate, filtered and concentrated under reduced pressure. The crude product was used in the next step directly without further purification.

LCMS: m/z (ES+), [M+H]+=379.35.

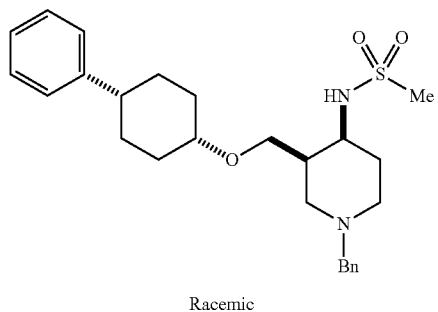

Racemic

To a stirred solution of 1-benzyl-3-[[(4-phenylcyclohexyl)oxy]methyl]piperidin-4-amine (2.00 g, 5.283 mmol, 1.00 equiv.) in DCM (40.00 mL) were added DIPEA (1.02 g, 7.925 mmol, 1.50 equiv.) and methanesulfonyl chloride (726.16 mg, 6.340 mmol, 1.20 equiv.) at 0 degrees C. under nitrogen atmosphere. The resulting mixture was stirred for additional 1 hr at room temperature. The reaction was quenched with methanol at room temperature. The resulting mixture was concentrated under reduced pressure. The crude product (2.0 g) was purified by Prep-HPLC with the following conditions (Column: XBridge® (Waters Technologies Corp., Milford, Massachusetts) Prep OBD C18 Column, 30×150 mm 5um; Mobile Phase A: Water (10 mmol/L NH₄HCO₃), Mobile Phase B: ACN; Flow rate: 60 mL/min; Gradient: 52 B to 86 B in 8 min; 254/220 nm) to afford (cis)-N-(1-benzyl-3-[[(4-phenylcyclohexyl)oxy]methyl]piperidin-4-yl)methanesulfonamide (420 mg, 17.5%) as a solid.

LCMS: m/z (ES+), [M+H]+=457.35.

¹H-NMR: (400 MHz, Chloroform-d) δ 7.37-7.17 (m, 13H), 3.70-3.61 (m, 2H), 3.52 (d, J=11.8 Hz, 2H), 3.42 (d, J=13.5 Hz, 1H), 2.98 (s, 3H), 2.75 (s, 1H), 2.56 (tt, J=10.8, 4.3 Hz, 2H), 2.31 (d, J=26.5 Hz, 3H), 2.13-1.90 (m, 4H), 1.73 (d, J=9.9 Hz, 4H).

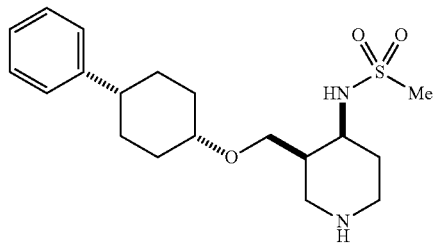

Racemic

To a stirred solution of N-[(cis)-1-benzyl-3-[[(4-phenylcyclohexyl)oxy]methyl]piperidin-4-yl]methanesulfonamide (420.00 mg, 0.920 mmol, 1.00 equiv.) and Pd(OH)₂/C (258.39 mg, 0.368 mmol, 0.4 equiv.) in isopropanol (30.00 mL) was added 4N HCl (230.00 microL, 0.920 mmol, 1.0 equiv.) dropwise at room temperature under hydrogen atmosphere. The resulting mixture was stirred overnight at room temperature under hydrogen atmosphere. The resulting mixture was filtered, the filter cake was washed with MeOH (3×10 mL). The filtrate was concentrated under reduced pressure. The crude product was used in the next step directly without further purification.

LCMS: m/z (ES+), [M+H]+=367.20.

(Compound 10)

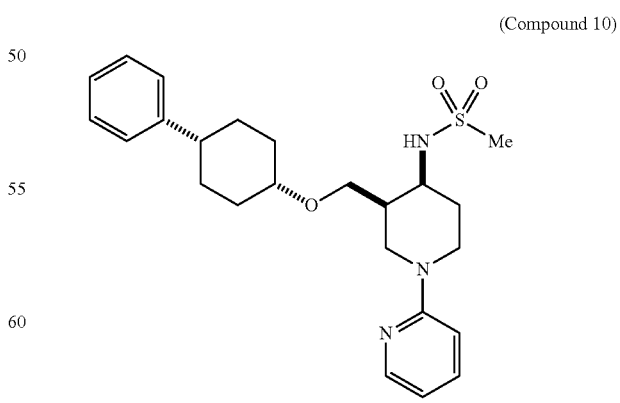

To a stirred solution of N-[(cis)-3-([[(1s,4s)-4-phenylcyclohexyl]oxy]methyl)piperidin-4-yl]methanesulfonamide (350.00 mg, 0.955 mmol, 1.00 equiv.) and K₂CO₃ (395.93 mg, 2.865 mmol, 3.00 equiv.) in DMSO (20.00 mL) was added 2-fluoropyridine (185.43 mg, 1.910 mmol, 2.00 equiv.) in portions at room temperature under nitrogen atmosphere. The resulting mixture was stirred for an additional 8 hr at 120 degrees C. The residue was purified by reverse flash chromatography with the following conditions: column, $C_{18}$ silica gel; mobile phase, ACN in water, 60% to 100% gradient in 15 min; detector, UV 254 nm to afford N-[(cis)-1-(pyridin-2-yl)-3-([[(1s,4s)-4-phenylcyclohexyl]oxy]methyl)piperidin-4-yl]methanesulfonamide (280 mg, 66.10%) as a solid. The racemic mixture was separated by chiral prep-HPLC to afford the enantiopure product (95.1 mg) as a solid.

LCMS: m/z (ES+), [M+H]+=444.20.

$^1$H-NMR (400 MHz, Methanol-$d_4$) δ 8.07 (ddd, J=5.0, 2.0, 0.8 Hz, 1H), 7.52 (ddd, J=8.8, 7.1, 2.0 Hz, 1H), 7.29-7.20 (m, 5H), 7.18-7.12 (m, 1H), 6.88 (d, J=8.7 Hz, 1H), 6.64 (ddd, J=7.2, 5.0, 0.8 Hz, 1H), 3.92-3.82 (m, 2H), 3.76 (dd, J=13.3, 6.8 Hz, 1H), 3.66 (dd, J=9.4, 5.8 Hz, 1H), 3.63-3.60 (m, 1H), 3.59-3.52 (m, 2H), 3.46 (dt, J=13.2, 5.8 Hz, 1H), 3.05 (s, 3H), 2.55 (tt, J=12.3, 3.4 Hz, 1H), 2.30 (ddt, J=9.7, 6.9, 3.6 Hz, 1H), 2.11-2.02 (m, 2H), 1.93-1.78 (m, 4H), 1.65-1.54 (m, 4H).

Example 1.4

(Compound 19)

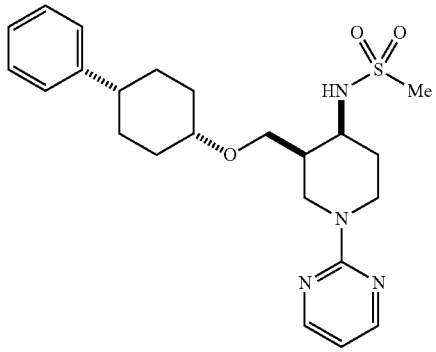

To a stirred mixture of N-((3R,4S)-3-[[(4-phenylcyclohexyl)oxy]methyl]piperidin-4-yl)methanesulfonamide (50.00 mg, 0.136 mmol, 1.00 equiv.) and 2-fluoropyrimidine (20.07 mg, 0.205 mmol, 1.50 equiv.) in DMSO (10 mL) was added $K_2CO_3$ (47.13 mg, 0.341 mmol, 2.5 equiv.) at room temperature under air atmosphere. The resulting mixture was stirred for 2 hr at room temperature under nitrogen atmosphere. The resulting mixture was filtered, and the filter cake was washed with MeCN (3×5 mL). The filtrate was concentrated under reduced pressure. The residue was purified by reverse flash chromatography with the following conditions: column, $C_{18}$ silica gel; mobile phase, MeCN in water, 0 to 0 gradient in 10 min, 0 to 100% gradient in 15 min, 100% to 100% in 15 min; detector, UV 254 nm. This resulted in N-[(3R,4S)-1-(pyrimidin-2-yl)-3-([[(1s,4s)-4-phenylcyclohexyl]oxy]methyl)piperidin-4-yl]methanesulfonamide (53 mg, 85.64%) as a solid.

LCMS: m/z (ES+), [M+H]+=445.

$^1$H-NMR (400 MHz, Methanol-$d_4$) δ 8.30 (d, J=4.8 Hz, 2H), 7.31-7.22 (m, 4H), 7.20-7.12 (m, 1H), 6.56 (t, J=4.8 Hz, 1H), 4.06 (td, J=14.7, 13.8, 6.4 Hz, 2H), 3.92-3.84 (m, 2H), 3.87 (s, 2H), 3.83-3.73 (m, 1H), 3.64 (dd, J=9.6, 6.1 Hz, 2H), 3.54 (dd, J=9.4, 7.3 Hz, 1H), 3.05 (s, 3H), 2.60-2.50 (m, 1H), 2.25 (s, 2H), 1.71-1.49 (m, 6H), 1.31 (s, 1H).

Example 1.5

(Compound 37)

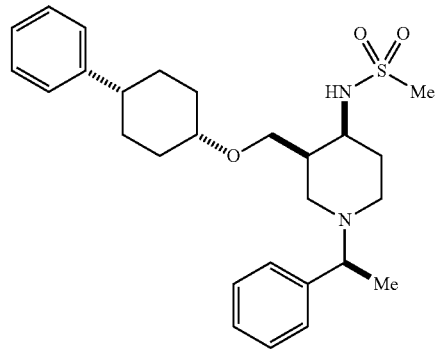

To a solution of N-((3R,4S)-3-((((1s,4S)-4-phenylcyclohexyl)oxy)methyl)piperidin-4-yl)methanesulfonamide (200 mg, 1.00 equiv., 546 micromol) in acetophenone (393 mg, 6.00 equiv., 3.27 mmol) were added titanium(IV) isopropoxide (620 mg, 662 microL, 2.18 mmol, 4.00 equiv.). The reaction mixture was stirred at 25 degrees C. for 30 minutes. To the above reaction mixture was added EtOH (2 mL) and sodium cyanoborohydride (343 mg, 5.46 mmol, 10.0 equiv.). The reaction mixture was stirred for one hour at 25 degrees C. under a nitrogen atmosphere. The resulting mixture was diluted with water (50 mL) and extracted with EtOAc (3*50 mL). The combined organic layers were washed with brine (3×50 mL), dried over anhydrous $Na_2SO_4$ and concentrated under reduced pressure. The crude was purified by reverse flash chromatography with the following conditions ($C_{18}$ column; mobile phase A: 0.08% $NH_4HCO_3$ (aq), mobile phase B: ACN, 1% to 100% gradient in 30 min; detector, UV 254 nm) to afford N-((3R,4S)-3-((((1s,4S)-4-phenylcyclohexyl)oxy)methyl)-1-((S)-1-phenylethyl)piperidin-4-yl)methanesulfonamide (180 mg, 382 micromol, 70.1%) as an oil. The racemic mixture was separated by chiral prep-HPLC to afford the enantiopure product (88.3 mg, 0.188 mmol, 34.4% overall yield) as a solid.

LCMS: m/z (ES+), [M+H]+=471.25.

$^1$H-NMR (400 MHz, Methanol-$d_4$) δ 7.37-7.27 (m, 4H), 7.26 (d, 2H), 7.25-7.18 (m, 2H), 7.22-7.11 (m, 2H), 3.64 (d, 2H), 3.56-3.41 (m, 1H), 2.98 (s, 3H), 2.53 (ddd, 1H), 2.16 (d, 1H), 1.99 (d, 2H), 1.85 (q, 2H), 1.81-1.64 (m, 2H), 1.57 (s, 5H), 1.40 (d, 3H).

Example 1.6

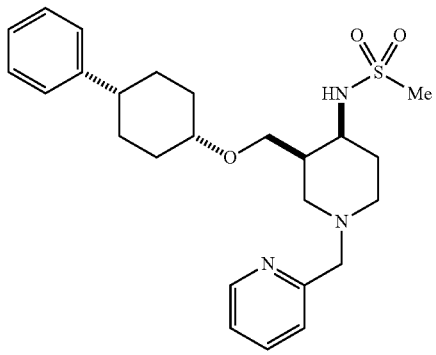

(Compound 39)

To a solution of N-((3R,4S)-3-((((1s,4S)-4-phenylcyclohexyl)oxy)methyl)piperidin-4-yl)methanesulfonamide (100 mg, 273 micromol, 1.00 equiv.) and picolinaldehyde (117 mg, 1.09 mmol, 4.00 equiv.) in methanol (5 mL) were added diisopropylethylamine (106 mg, 143 microL, 819 micromol, 3.00 equiv.) and sodium triacetoxyborohydride (578 mg, 2.73 mmol, 10.0 equiv.). The reaction mixture was stirred for 2 hr at 25 degrees C. under a nitrogen atmosphere. The crude was purified by reverse flash chromatography with the following conditions ($C_{18}$ column; mobile phase A: water, mobile phase B: ACN, 1% to 100% gradient in 30 min; detector, UV 254 nm) to afford N-((3R,4S)-3-((((1s,4S)-4-phenylcyclohexyl)oxy)methyl)-1-(pyridin-2-ylmethyl)piperidin-4-yl)methanesulfonamide (48.1 mg, 105 μmol, 38.5%) as a solid.

LCMS: m/z (ES+), [M+H]+=458.40.

$^1$H-NMR (400 MHz, Methanol-$d_4$) δ 8.46 (dt, 2H), 7.79 (td, 2H), 7.56 (d, 2H), 7.32-7.21 (m, 6H), 7.21-7.10 (m, 6H), 3.74-3.61 (m, 8H), 3.64-3.53 (m, 4H), 3.00 (s, 6H), 2.70 (s, 2H), 2.56 (s, 3H), 2.55 (d, 1H), 2.51 (dt, 4H), 2.23 (q, 2H), 2.06-2.01 (m, 1H), 2.00 (s, 3H), 1.99-1.94 (m, 1H), 1.92-1.63 (m, 9H), 1.57 (ddt, 9H).

Example 1.7

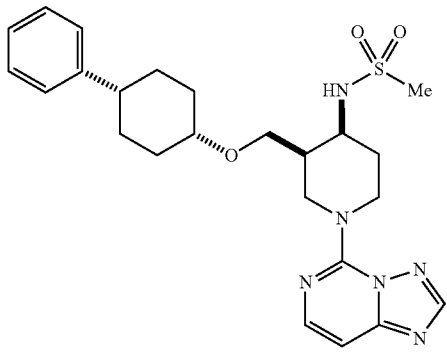

(Compound 44)

To a solution of N-((3R,4S)-3-((((1s,4S)-4-phenylcyclohexyl)oxy)methyl)piperidin-4-yl)methanesulfonamide (33 mg, 90 micromol, 1.00 equiv.) and 5-chloro[1,2,4]triazolo[1,5-c]pyrimidine (17 mg, 0.11 mmol, 1.2 equiv.) in DMSO (1.5 mL) was added $K_2CO_3$ (25 mg, 0.18 mmol, 2.0 equiv.). The resulting mixture was stirred for 18 hr at 120 degrees C. and then filtered. The filter cake was washed with DCM (3×2 mL), and the filtrate was concentrated under reduced pressure. The crude was purified by reverse flash chromatography with the following conditions ($C_{18}$ column; mobile phase A: water (0.1% $NH_4HCO_3$), mobile phase B: ACN, 65% to 75% gradient in 30 min; detector, UV 254 nm) to afford N-((3R,4S)-1-([1,2,4]triazolo[1,5-c]pyrimidin-5-yl)-3-((((1s,4S)-4-phenylcyclohexyl)oxy)methyl)piperidin-4-yl)methanesulfonamide (22.3 mg, 46.0 μmol, 51%) as a solid.

LCMS: m/z (ES+), [M+H]+=485.

$^1$H-NMR (400 MHz, Methanol-$d_4$) δ 8.31 (s, 1H), 7.97 (d, J=6.1 Hz, 1H), 7.26 (dd, J=8.3, 7.0 Hz, 2H), 7.20-7.12 (m, 3H), 7.09 (d, J=6.1 Hz, 1H), 4.45-4.28 (m, 2H), 4.17 (dd, J=13.5, 3.4 Hz, 1H), 4.06 (dd, J=13.5 Hz, 1H), 3.89 (m, 1H), 3.68 (dd, J=9.6, 5.6 Hz, 1H), 3.57 (dd, J=9.6, 8.0 Hz, 1H), 3.52-3.46 (m, 1H), 3.06 (s, 4H), 2.54-2.43 (m, 1H), 2.43-2.37 (m, 1H), 2.16-1.91 (m, 2H), 1.85 (d, J=13.1 Hz, 1H), 1.75 (td, J=12.8, 3.9 Hz, 1H), 1.71 (td, J=12.7 Hz, 1H), 1.65 (td, J=13.8, 3.1 Hz, 1H), 1.59-1.51 (m, 2H), 1.49-1.41 (m, 2H).

Example 1.8

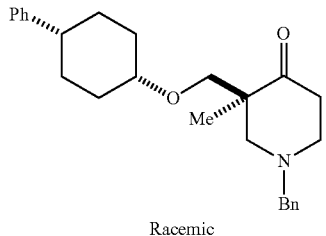 [SMILES: C[C@@]1(CO[C@H]2CC[C@@H](c3ccccc3)CC2)CN(Cc2ccccc2)CCC1=O]

Racemic

To a suspension of NaH (53.0 mg, 60% weight, 1.32 mmol, 1.00 equiv.) in THF (10 mL) was added 1-benzyl-3-((((1S,4S)-4-phenylcyclohexyl)oxy)methyl)piperidine-4-one (500 mg, 1.32 mmol, 1.00 equiv.) in THF (10 mL) at 0 degrees C. The resulting mixture was stirred for 30 minutes at 0 degrees C. To the reaction was added a solution of methyl iodide (0.166 mL, 0.376 grams, 2.65 mmol, 2.00 equiv.) in THF (10 mL) dropwise at 0 degrees C. under nitrogen atmosphere. The resulting mixture was stirred for an additional 2 hr at 25 degrees C. Then, the reaction was quenched by the addition of saturated aqueous ammonium chloride at 0 degrees C. The resulting mixture was extracted with ethyl acetate (3×50 mL EtOAc). The combined organic layers were concentrated under reduced pressure. The resulting residue was purified by prep-TLC (PE/EtOAc=8/1) to afford (S)-1-benzyl-3-methyl-3-((((1S,4R)-4-phenylcyclohexyl)oxy)methyl)piperidin-4-one (124 mg, 0.317 mmol, 20% yield) as an oil.

LCMS: m/z (ES+), [M+H]+=312.

$^1$H-NMR (400 MHz, Chloroform-d) δ 7.45-7.31 (m, 7H), 7.25-7.19 (m, 3H), 3.75-3.54 (m, 5H), 2.89-2.78 (m, 2H), 2.72-2.42 (m, 5H), 2.01 (dd, 2H), 1.84-1.71 (m, 2H), 1.67-1.59 (m, 2H), 1.51 (dd, 2H), 1.23 (s, 3H).

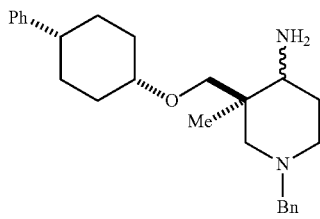 [SMILES: C[C@@]1(CO[C@H]2CC[C@@H](c3ccccc3)CC2)CN(Cc2ccccc2)CCC1N]

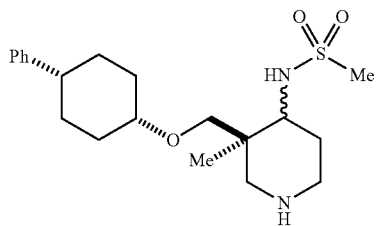

To a stirred solution of (S)-1-benzyl-3-methyl-3-((((1S,4R)-4-phenylcyclohexyl)oxy)methyl)piperidin-4-one (230 mg, 0.587 mmol, 1.00 equiv.) in methanol (10 mL) was added zinc chloride (117 microL, 0.7 molar, 82.2 micromol, 0.14 equiv.) at 25 degrees C. The resulting mixture was stirred for 10 minutes at 25 degrees C. To the above mixture was added ammonium formate (741 mg, 11.7 mmol, 20.0 equiv.) at 25 degrees C. under nitrogen atmosphere. The resulting mixture was stirred for additional 30 minutes at 25 degrees C. To the above mixture was added NaCNBH$_3$ (221 mg, 3.52 mmol, 6.00 equiv.) at 25 degrees C. under nitrogen atmosphere. The reaction was stirred for additional three hours at 25 degrees C., and then it was cooled to 0 degrees C. and quenched by the addition of saturated aqueous ammonium chloride. The resulting mixture was extracted with dichloromethane (3×50 mL). The combined organic layers were washed with brine, dried over anhydrous Na$_2$SO$_4$, and filtered. The filtrate was concentrated under reduced pressure to afford (3R)-1-benzyl-3-methyl-3-((((1S,4S)-4-phenylcyclohexyl)oxy)methyl)piperidin-4-amine (220 mg, 560 μmol, 95.4% yield) as an oil. The crude product was used in the next step directly without further purification.

LCMS: m/z (ES+), [M+H]+=393.

To a solution of N-((3R)-1-benzyl-3-methyl-3-((((1s,4S)-4-phenylcyclohexyl)oxy)methyl)piperidin-4-yl)methanesulfonamide (140 mg, 297 micromol, 1.00 equiv.) in isopropanol (15 mL) was added palladium hydroxide on carbon (1.25 g, 10% weight, 892 micromol, 3.00 equiv.) at nitrogen atmosphere. To the above mixture was added HCl (744 microL, 4 molar, 2.97 mmol, 10.0 equiv.). The resulting mixture was hydrogenated at room temperature for 12 hr under hydrogen atmosphere using a hydrogen balloon, filtered through a Celite® pad, and concentrated under reduced pressure to afford the crude product. This crude product was used in the next step directly without further purification.

LCMS: m/z (ES+), [M+H]+=381.

(Compound 29)

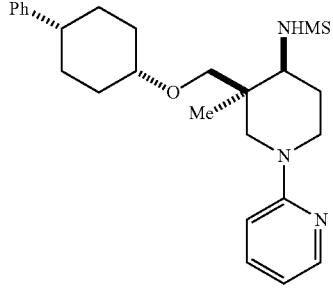

To a solution of N-((3R)-3-methyl-3-((((1s,4S)-4-phenylcyclohexyl)oxy)methyl)piperidin-4-yl)methanesulfonamide (113 mg, 297 micromol, 1.00 equiv.) and K$_2$CO$_3$ (82.1 mg, 594 micromol, 2.00 equiv.) in DMSO (4 mL) was added 2-fluoropyridine (86.5 mg, 891 micromol, 3.00 equiv.). The resulting mixture was stirred for 24 hr at 120 degrees C. The crude product was purified by prep chiral HPLC with the following conditions: column, DZ-CHIRALPAK® IG-3, 4.6*50 mm 3 um; mobile phase A, hexanes with 0.2% isopropanol; mobile phase B, EtOH:DCM=1:1; isocratic 85:15; flow rate, 1 mL/min. This afforded N-((3R,4S)-3-methyl-3-((((1s,4S)-4-phenylcyclohexyl)oxy)methyl)-1-(pyridin-2-yl)piperidin-4-yl)methanesulfonamide (10 mg, 22 μmol, 33%) as a solid.

LCMS: m/z (ES+), [M+H]+=458.

$^1$H-NMR (400 MHz, Methanol-d$_4$) δ 8.04 (dd, 1H), 7.50 (dd, 1H), 7.33-7.23 (m, 2H), 7.23-7.11 (m, 3H), 6.89 (d, 1H), 6.62 (dd, 1H), 4.43-4.29 (m, 1H), 4.20 (dd, 1H), 3.57 (d, 1H), 3.51-3.36 (m, 3H), 3.09-2.89 (m, 4H), 2.74 (d, 1H), 2.54 (dd, 1H), 2.08-1.98 (m, 3H), 1.98-1.83 (m, 1H), 1.77 (d, 2H), 1.66-1.47 (m, 2H), 1.42-1.29 (m, 1H), 1.24 (s, 3H).

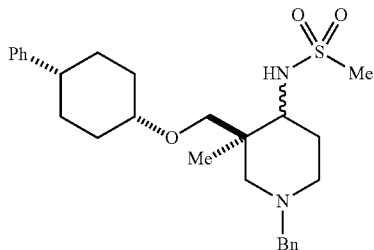 [SMILES: C[C@@]1(CO[C@H]2CC[C@@H](c3ccccc3)CC2)CN(Cc2ccccc2)CCC1NS(C)(=O)=O]

To a solution of (3R)-1-benzyl-3-methyl-3-((((1S,4S)-4-phenylcyclohexyl)oxy)methyl)piperidine-4-amine (230 mg, 0.586 mmol, 1.00 equiv.) and diisopropylethylamine (0.306 mL, 227 mg, 1.76 mmol, 3.00 equiv.) in DCM (20 mL) was added methanesulfonyl chloride (0.0685 mL, 101 mg, 0.879 mmol, 1.50 equiv.). The resulting mixture was stirred for one hour at 25 degrees C. The residue was purified by prep-TLC (PE/EtOAC=2/1) to afford N-((3R)-1-benzyl-3-methyl-3-((((1s,4S)-4-phenylcyclohexyl)oxy)methyl)piperidin-4-yl)methanesulfonamide (90 mg, 0.19 mmol, 33%) as an oil.

LCMS: m/z (ES+), [M+H]+=471.

$^1$H-NMR (400 MHz, DMSO-d$_6$) δ 7.31-7.16 (m, 10H), 6.84 (d, 1H), 3.87 (s, 1H), 3.66-3.51 (m, 2H), 3.49-3.38 (m, 3H), 3.23 (s, 1H), 3.18 (s, 1H), 3.07-2.99 (m, 1H), 2.93 (s, 3H), 2.80 (d, 2H), 2.55 (d, 1H), 2.00 (d, 2H), 1.87-1.38 (m, 12H), 1.25 (dd, 6H), 0.98 (s, 3H).

Example 2: Human OX$_2$R IP1 Assay

T-Rex CHO cells stably overexpressing the human orexin-2 receptor (OX$_2$R) were induced overnight with 1 μg/mL of doxycycline in a T225 flask. 24 hours post induction, cells were lifted with accutase and plated into a 384-well proxy plate at 30,000 cells/well. Cells were then treated with different test compounds in 1× stimulation buffer containing 10 mM Hepes, 1 mM $CaCl_2$, 0.5 mM $MgCl_2$, 4.2 mM KCl, 146 mM NaCl, 5.5 mM glucose, and 50 mM LiCl, pH 7.4, for 1 hr at 37 degrees C. Following incubation, the reaction was terminated by the addition of detection mix, which is composed of IP1-d2 and anti-IP1-cryptate diluted in lysis buffer as well as 1× stimulation buffer. The plates were allowed to incubate for 1 hour at room temperature and were then read in the EnVision® multimode plate reader, measuring inositol phosphate levels.

Cisbio IP1 is a cell-based functional assay quantifying the accumulation of inositol monophosphate (IP), a metabolite released as a result of orexin 2 receptor activation through the phospholipase C-Gq signaling pathway. This is a competitive immunoassay in which the IP1 produced by the cells upon receptor activation competes with the IP1 analog coupled to the d2 fluorophore (acceptor) for binding to an anti-IP1 monoclonal antibody labeled with Eu cryptate (donor). The measured HTRF-FRET based signal is inversely proportional to the IP1 concentration produced.

The $EC_{50}$ values reported in Table 2 were obtained according to the human $OX_2R$ IP1 assay described above. Data are the mean $EC_{50}$ values±S.E.M. The compound methyl (2R,3S)-3-((methylsulfonyl)amino)-2-(((cis-4-phenylcyclohexyl)oxy)methyl)-piperidine-1-carboxylate (sometimes referred to herein as Reference Compound A) is a reference compound which is disclosed in Example 5 of PCT publication no. WO2017/135306.

TABLE 2

| Compound | Compound No. | $EC_{50}$ (nM) |
|---|---|---|
| [structure] | 1 | * |
| [structure] | 2 | *** |
| [structure] | 3 | *** |
| [structure] | 4 | *** |
| [structure] | 5 | *** |
| [structure] | 6 | *** |

TABLE 2-continued
| Compound | Compound No. | EC$_{50}$ (nM) |
|---|---|---|
| 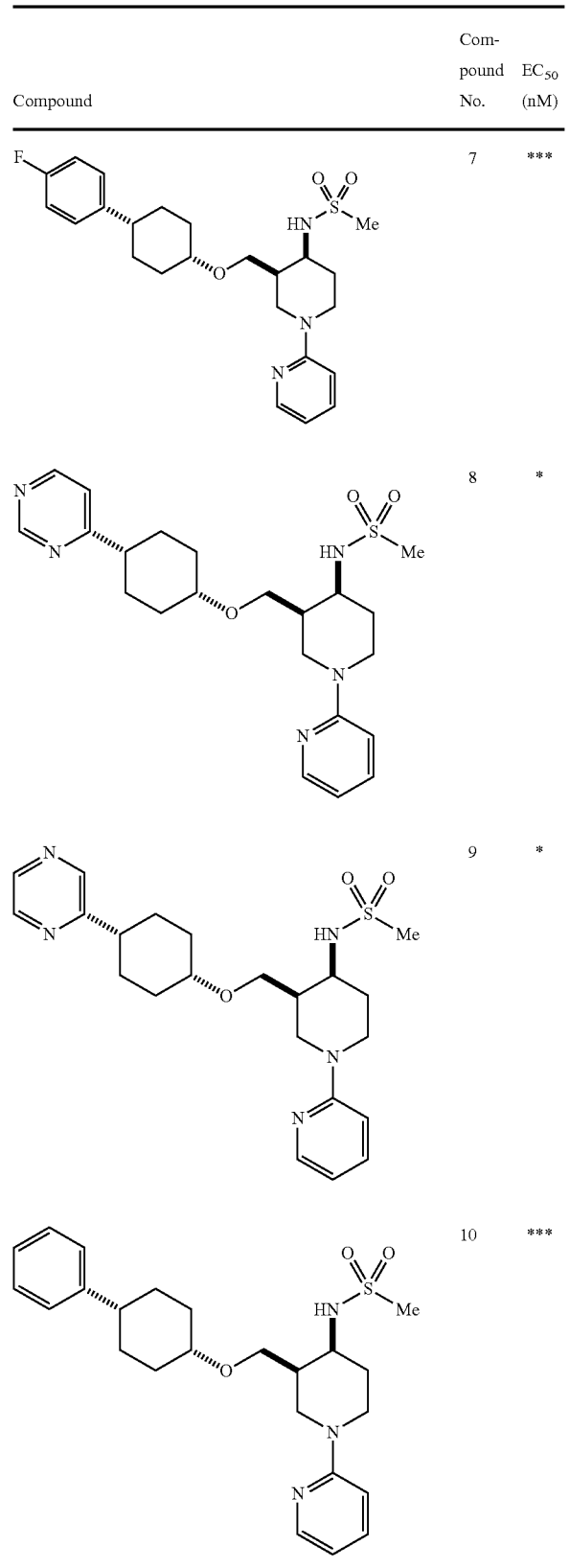 | 7 | *** |
| | 8 | * |
| | 9 | * |
| | 10 | *** |
| 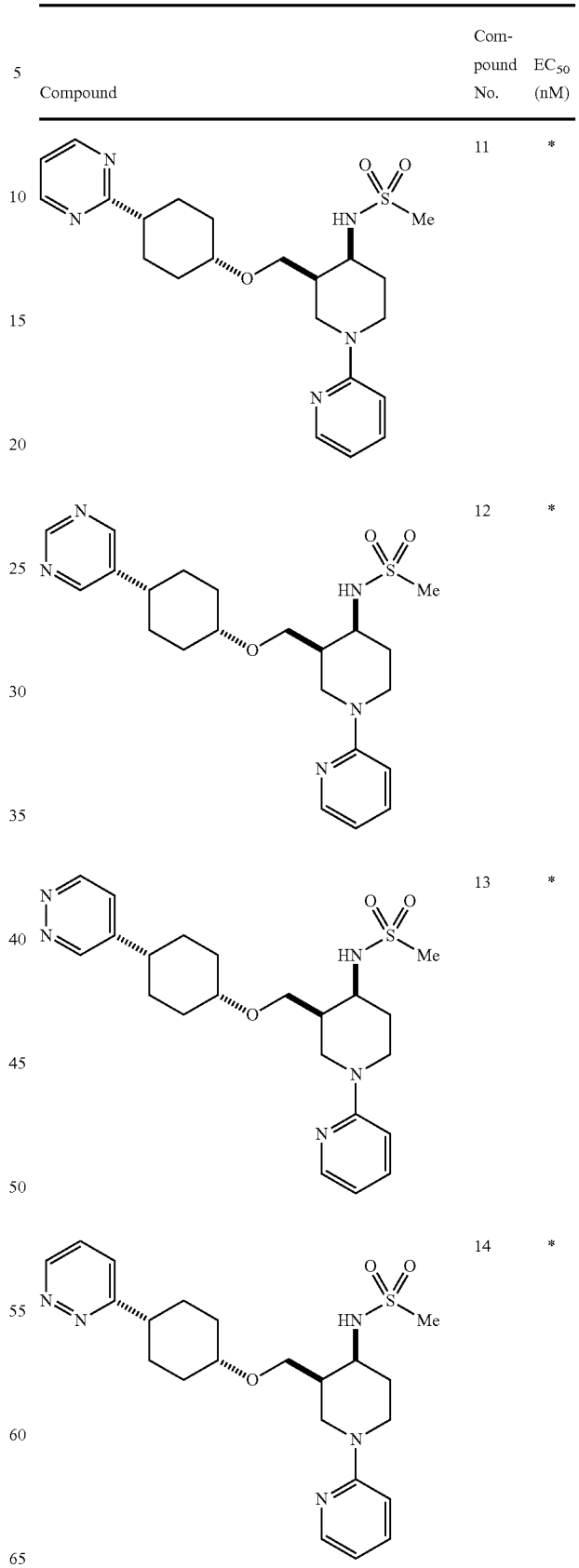 | 11 | * |
| | 12 | * |
| | 13 | * |
| | 14 | * |

TABLE 2-continued

| Compound | Compound No. | EC$_{50}$ (nM) |
|---|---|---|
| 2-methylphenyl-cyclohexyl-O-CH2-piperidine-methylsulfonamide, N-pyridin-2-yl | 15 | *** |
| 3-methylphenyl-cyclohexyl-O-CH2-piperidine-methylsulfonamide, N-pyridin-2-yl | 16 | *** |
| 2,3-dimethylphenyl-cyclohexyl-O-CH2-piperidine-methylsulfonamide, N-pyridin-2-yl | 17 | *** |
| 3,5-dimethylphenyl-cyclohexyl-O-CH2-piperidine-methylsulfonamide, N-pyridin-2-yl | 18 | *** |

TABLE 2-continued

| Compound | Compound No. | EC$_{50}$ (nM) |
|---|---|---|
| phenyl-cyclohexyl-O-CH2-piperidine-methylsulfonamide, N-pyrimidin-2-yl | 19 | *** |
| phenyl-cyclohexyl-O-CH2-piperidine-methylsulfonamide, N-pyrimidin-4-yl | 20 | *** |
| phenyl-cyclohexyl-O-CH2-piperidine-methylsulfonamide, N-pyrazin-2-yl | 21 | *** |
| phenyl-cyclohexyl-O-CH2-piperidine-methylsulfonamide, N-pyridazin-3-yl | 22 | *** |

TABLE 2-continued

| Compound | Compound No. | EC$_{50}$ (nM) |
|---|---|---|
| (structure) | 23 | *** |
| (structure) | 24 | *** |
| (structure) | 26 | *** |
| (structure) | 27 | *** |
| (structure) | 28 | *** |
| (structure) | 29 | *** |
| (structure) | 30 | ** |
| (structure) | 31 | *** |

TABLE 2-continued

| Compound | Compound No. | EC$_{50}$ (nM) |
|---|---|---|
| (4-hydroxyphenyl-cyclohexyl-oxymethyl-piperidine-methanesulfonamide, N-pyridin-2-yl) | 32 | *** |
| (3-trifluoromethylphenyl-cyclohexyl-oxymethyl-piperidine-methanesulfonamide, N-pyridin-2-yl) | 33 | ** |
| (3-cyanophenyl-cyclohexyl-oxymethyl-piperidine-methanesulfonamide, N-pyridin-2-yl) | 35 | *** |
| (phenyl-cyclohexyl-oxymethyl-piperidine-methanesulfonamide, N-benzyl) | 36 | * |
| (phenyl-cyclohexyl-oxymethyl-piperidine-methanesulfonamide, N-(1-phenylethyl)) | 37 | * |
| (phenyl-cyclohexyl-oxymethyl-piperidine-methanesulfonamide, N-(1-phenylethyl) enantiomer) | 38 | * |
| (phenyl-cyclohexyl-oxymethyl-piperidine-methanesulfonamide, N-(pyridin-2-ylmethyl)) | 39 | * |
| (phenyl-cyclohexyl-oxymethyl-piperidine-methanesulfonamide, N-(pyridin-3-ylmethyl)) | 40 | * |

TABLE 2-continued

| Compound | Compound No. | EC$_{50}$ (nM) |
|---|---|---|
| [structure: phenyl-cyclohexyl-O-CH2-piperidine(N-CH2-pyridin-4-yl) with NHS(O)2Me] | 41 | * |
| [structure: phenyl-cyclohexyl-O-CH2-piperidine(N-pyrazolo[1,5-a]pyridin-6-yl) with NHS(O)2Me] | 42 | * |
| [structure: phenyl-cyclohexyl-O-CH2-piperidine(N-[1,2,4]triazolo[1,5-a]pyridin-5-yl) with NHS(O)2Me] | 43 | * |
| [structure: phenyl-cyclohexyl-O-CH2-piperidine(N-[1,2,4]triazolo[1,5-a]pyrimidin-5-yl) with NHS(O)2Me] | 44 | ** |
| [structure: phenyl-cyclohexyl-O-CH2-piperidine(N-oxazolo[4,5-c]pyridin-4-yl) with NHS(O)2Me] | 45 | *** |
| [structure: phenyl-cyclohexyl-O-CH2-piperidine(N-pyridin-2-yl) with NHS(O)2CF3] | 53 | *** |
| methyl (2R,3S)-3-((methylsulfonyl)amino)-2-(((cis-4-phenylcyclohexyl)oxy)methyl)-piperidine-1-carboxylate | — | *** |

***EC$_{50}$ < 100 nM
**EC$_{50}$ 100-1,000 nM
*EC$_{50}$ > 1,000 nM

Example 3: MDCK-MDR$_1$ Permeability Assay

The bidirectional permeability (Apical to Basal and Basal to Apical directions) of test compounds in MDCK-MDR$_1$ cells were evaluated using MDCK-MDR$_1$ cells seeded in Solvo PreadyPort™ MDCK 96-well plate. Once the plate was received from ReadyCell (Barcelona, Spain), it was treated as per PreadyPort™ user's manual.

For the Apical to Basolateral (A→B) permeability, 80 μL of test compound (3 μM) co-dosed with LY (Lucifer Yellow) (100 μM) in HBSS (Hank's Balanced Salt Solution) assay buffer was added to the donor side (A) while 250 μL of HBSS buffer was added to the receiver side (B). For the Basolateral to Apical (B→A) permeability, 255 μL of test compound (3 μM) in HBSS assay buffer was added to the donor side (B) while 75 μL of HBSS buffer containing LY (100 μM) was added to the receiver side (A).

The plate was placed in an incubator set at 37 degrees C. After 10 minutes of pre-warming, 5 μL aliquot was taken from donor compartment and set aside as the dosing solution. The MDCK-MDR$_1$ incubation plate was placed back into the incubator for 2 hours of incubation at 37 degrees C. After 2 hours of incubation, 25 μL and 5 μL aliquots were removed from the receiver and donor sides, respectively. To the 5 μL aliquots taken from the donor sides (before and after a 2-hour incubation) were diluted with 20 μL of the HBSS buffer. All samples were mixed with 150 µL with acetonitrile containing internal standard (IS) and 200 µL water, and analyzed by LC-MS/MS.

The apparent permeability ($P_{app}$) was calculated using the following formula:

$$P_{app} = dQ/dt \times 1/A \times C_0$$

where:
- dQ/dt: amount of translocated material over incubation time (nmol/s)
- A: area of insert (0.14 cm² for PreadyPort™ MDR$_1$-96)
- $C_0$: initial concentration of product applied in apical (A→B) or basal (B→A) compartment (nmol/mL).

The efflux ratio (ER) was measured by dividing the $P_{app}$ (basolateral to apical direction) by $P_{app}$ (apical to basolateral direction). It is a general measure of the involvement of active processes. An ER >2 is considered positive for active transport.

Percent recovery was measured using the following equation:

$$\text{Percent Recovery} = 100 \times \frac{C_R^{final} \times V_R + C_D^{final} \times V_D}{V_D \times C_N}$$

where:
- $V_R$: Volume of the receiver compartment (mL)
- $V_D$: Volume of the donor compartment (mL)
- $C_N$: Concentration of dosing solution (µM) collected after 10 minutes of incubation
- $C_R^{final}$: Receiver concentration at the end of the incubation (µM)
- $C_D^{final}$: Donor concentration at the end of the incubation (µM)

The data reported in Table 3 were obtained according to the MDCK-MDR$_1$ permeability assay described above.

TABLE 3

| Compound No. | $P_{app}$ A → B ($10^{-6}$ cm/s) | Efflux ratio (ER) |
|---|---|---|
| 1 | 2.7 | 12 |
| 3 | 1.7 | 24 |
| 4 | 1.2 | 14 |
| 5 | <0.9 | >7.2 |
| 6 | 1.3 | 2.8 |
| 7 | <1.2 | >4.3 |
| 8 | 1.8 | 15 |
| 9 | 0.97 | 25 |
| 10 | 5.6 | 1.4 |
| 11 | 1.6 | 11 |
| 12 | 1.0 | 33 |
| 13 | 0.67 | 18 |
| 14 | <0.12 | >56 |
| 15 | <0.33 | >6.9 |
| 16 | <0.90 | >7.9 |
| 17 | <0.28 | >6.9 |
| 18 | <1.8 | >2.6 |
| 19 | 1.2 | 14 |
| 20 | 1.1 | 17 |
| 21 | 0.69 | 35 |
| 22 | 1.3 | 23 |
| 23 | <2.0 | >5.4 |
| 24 | 0.28 | 30 |
| 25 | <0.41 | >58 |
| 26 | 0.31 | 37 |
| 27 | 2.7 | 3.0 |
| 28 | <1.2 | >3.4 |
| 29 | <0.42 | >17 |
| 30 | 0.70 | 28 |

TABLE 3-continued

| Compound No. | $P_{app}$ A → B ($10^{-6}$ cm/s) | Efflux ratio (ER) |
|---|---|---|
| 31 | 1.0 | 18 |
| 32 | 0.41 | 34 |
| 33 | 0.07 | 15 |
| 35 | 1.3 | 12 |
| 36 | <0.21 | >12 |
| 37 | 0.38 | 12 |
| 38 | 0.74 | 3.2 |
| 39 | 1.4 | 15 |
| 40 | 1.3 | 8.2 |
| 41 | 1.7 | 16 |
| 42 | 0.86 | 2.9 |
| 43 | 2.4 | 8.8 |
| 44 | 3.0 | 6.4 |
| 45 | 1.9 | 2.2 |
| Reference Compound A | 5.0 | 5.9 |

Example 4: Hepatocytes Stability Assay

In vitro metabolic stability was assessed using cryopreserved hepatocytes from male Sprague Dawley rats and a pool of 50 mixed gender humans (BioIVT, Baltimore, MD). The incubation mixtures were prepared by mixing 250 µL of pre-warmed KHB (Krebs-Henseleit buffer) containing $2 \times 10^6$ cell/mL of hepatocytes with 250 µL of pre-warmed KHB buffer containing 2 µM of test compounds in a 48-well plate, giving a final concentration of 1 µM test compound (0.1% DMSO) and $1 \times 10^6$ cell/mL of hepatocytes. The reaction mixture was incubated at 37 degrees C. A 50 µL aliquot of incubation mixture was taken at time points (0, 15, 30, 60, 120 and 240 minutes) and transferred into a 96-well plate containing 300 µL ice-cold acetonitrile (containing 30 ng/mL of labetalol and 10 ng/mL of Naltrexone-d3 as internal standards) and immediately placed in ice to terminate the reaction. Samples were centrifuged, and supernatants were transferred into 96-well plates for liquid chromatography with tandem mass spectrometry (LC-MS/MS) analysis to monitor the depletion of the test compound.

Data was calculated as percent remaining by assuming zero-minute time point peak area ratio (analyte/IS) as 100% and dividing remaining time point peak area ratios by zero-minute time point peak area ratio. Data were fitted to a first-order decay model to determine half-life. From a plot of log (ln) peak area against time, the slope of the line was determined. Subsequently, half-life ($T_{1/2}$) and intrinsic clearance ($CL_{int}$) were calculated using the equations below:

Elimination rate constant (k)=(−slope)
Half-life ($T_{1/2}$) min=0.693/k
Intrinsic Clearance ($CL_{int}$) (mL/min/million cells)=(V× 0.693)/$T_{1/2}$
V=incubation volume mL/number of cells The in vitro $T_{1/2}$ was converted to in vitro intrinsic clearance ($CL_{int,hep}$) in units of mL/min/kg using the formula shown below:

$$CLint, hep = \frac{0.693}{T1/2} \times \frac{\text{mL incubation}}{\text{million cells}} \times \frac{120 \text{ million cells}}{\text{g Liver}} \times \frac{\text{g liver}}{\text{kg body}}$$

The in vitro intrinsic clearance ($CL_{int,hep}$) was scaled to in vivo hepatic clearance ($CL_{,hep}$) using the following equation which was adapted from a well-stirred model.

$$CL, hep = \frac{Q \times fu \times CLint, hep}{Q + fu \times CLint, hep}$$

where Q is the liver blood flow and fu is the fraction unbound (assumed to be unity in this case). All parameters used in the calculation are shown below (Table 4).

TABLE 4

Physiological Parameters Used in the In Vitro To In Vivo Scaling

|  | Mouse | Rat | Dog | Monkey | Human |
|---|---|---|---|---|---|
| Body Weight (kg) | 0.02 | 0.25 | 10 | 5 | 70 |
| Liver weight (g/kg) | 87.5 | 40 | 32 | 30 | 25.7 |
| Liver Blood Flow (mL/min/kg) | 90 | 55.2 | 30.9 | 43.6 | 20.7 |

Davies B. and Morris T. (1993) Physiological Parameters in Laboratory Animals and Humans. Pharma Res. 10 (7):1093-1095.

The extraction ratio (ER) was calculated by dividing the hepatic clearance of a compound to the liver blood flow. The data reported in Table 5 were obtained according to the human hepatocytes stability assay described above.

TABLE 5

| Compound No. | $CL_{int}$ (μL/min/million cells) | Extraction Ratio (ER) |
|---|---|---|
| 1 | 31 | 0.82 |
| 2 | 53 | 0.89 |
| 3 | 50 | 0.88 |
| 4 | 57 | 0.89 |
| 5 | 49 | 0.88 |
| 6 | 44 | 0.87 |
| 7 | 39 | 0.85 |
| 8 | 30 | 0.82 |
| 9 | 45 | 0.87 |
| 10 | 73 | 0.92 |
| 11 | 21 | 0.76 |
| 12 | 35 | 0.84 |
| 13 | 16 | 0.71 |
| 14 | 22 | 0.77 |
| 15 | 64 | 0.91 |
| 16 | 43 | 0.87 |
| 17 | 32 | 0.83 |
| 18 | 36 | 0.84 |
| 19 | 93 | 0.93 |
| 20 | 60 | 0.90 |
| 21 | 101 | 0.94 |
| 22 | 56 | 0.89 |
| 23 | 25 | 0.79 |
| 24 | 42 | 0.86 |
| 25 | 73 | 0.92 |
| 26 | 55 | 0.89 |
| 27 | 75 | 0.92 |
| 28 | 154 | 0.96 |
| 29 | 30 | 0.82 |
| 30 | 45 | 0.87 |
| 31 | 81 | 0.92 |
| 32 | 110 | 0.94 |
| 33 | 79 | 0.92 |
| 35 | 102 | 0.94 |
| 36 | 58 | 0.90 |
| 37 | 99 | 0.94 |
| 38 | 91 | 0.93 |
| 39 | 59 | 0.90 |
| 40 | 86 | 0.93 |
| 41 | 107 | 0.94 |

TABLE 5-continued

| Compound No. | $CL_{int}$ (μL/min/million cells) | Extraction Ratio (ER) |
|---|---|---|
| 42 | 100 | 0.94 |
| 43 | 102 | 0.94 |
| 44 | 133 | 0.95 |
| 45 | 103 | 0.94 |
| Reference Compound A | 76 | 0.92 |

Example 5: Assessment of Wake Promotion in Sprague-Dawley Rats

Wake promotion was assessed using electroencephalography (EEG) and electromyography (EMG) in adult male Sprague-Dawley rats. All rats (Charles River Laboratories, Raleigh, NC, USA) were intraperitoneally implanted with telemetry devices (F50-EEE, Data Sciences International Inc., MN, USA) under isoflurane anesthesia. For EEG, stainless steel screws were implanted over frontal cortex and parietal cortex, and reference screws were placed over cerebellum. Additionally, an electrode was placed in neck muscle for EMG. Rats were given carprofen post-surgery and underwent a 7 to 10-day recovery period. Rats habituated to the experimental room for 7 days and were maintained on a 12-hour light-dark cycle.

EEG and EMG data were recorded using the DSI telemetry system and Ponemah software (Data Sciences International Inc., MN, USA). Sleep-wake stages were scored both manually and with Somnivore, a supervised machine learning software platform, in 10 second epochs. Records were visually inspected as needed post-processing.

All test compounds were dissolved in 5% DMSO and suspended in 95% saline with 0.5% methylcellulose and 0.5% tween. In a cross-over design, rats were dosed during the inactive light phase at zeitgeber time 5 (ZT5) at a dose volume of 3.33 ml/kg body weight. Unless otherwise indicated, all compounds were dosed orally. Recordings for each rat were initiated immediately after dosing and lasted for 6 hours post-dose.

Two key endpoints include wakefulness time and cortical activation time. Wakefulness time is derived from the sleep-wake stage analysis. Cortical activation time is based on the duration in which frontal gamma oscillatory activity (30-100 Hz), a key feature of wakefulness, was elevated relative to a pre-treatment baseline. Mean cortical activation time was computed relative to vehicle treatment for the 6-hour post-dose period. Results are shown in Table 6 below.

TABLE 6

| Compound | Route | Dose (mpk) | Mean cortical activation time (% vehicle treatment) |
|---|---|---|---|
| 53 | PO | 3 | 105.00 |
| Reference Compound A | SC | 3 | 118.75 |

PO (oral); SC (subcutaneous); mpk (milligram per kilogram)

While this invention has been particularly shown and described with references to preferred embodiments thereof, it will be understood by those skilled in the art that various changes in form and details may be made therein without departing from the scope of the invention encompassed by the appended claims.

What is claimed is:
1. A compound of Formula I-A or a pharmaceutically acceptable salt thereof:

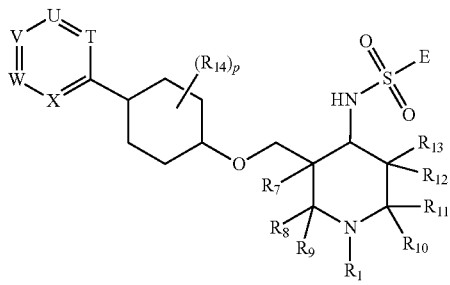

(I-A)

wherein:
T is $CR_6$ or N;
U is $CR_5$ or N;
V is $CR_4$ or N;
W is $CR_3$ or N;
X is $CR_2$ or N;
and provided that

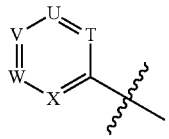

includes no more than 3 nitrogen atoms in the ring;
E is selected from the group consisting of $NR_aR_b$, $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, and $C_1$-$C_3$ alkylene-(4 to 10-membered heterocyclyl) wherein the $C_1$-$C_3$ alkylene-$NR_aR_b$, $C_1$-$C_3$ alkyl, $C_2$-$C_4$ alkenyl, $C_2$-$C_4$ alkynyl, $C_3$-$C_8$ cycloalkyl, $C_1$-$C_3$ alkylene-($C_3$-$C_8$ cycloalkyl), 4- to 10-membered heterocyclyl, or $C_1$-$C_3$ alkylene-(4 to 10-membered heterocyclyl) is unsubstituted or substituted with one or more halogen, hydroxyl, $C_1$-$C_3$ alkyl, or $C_1$-$C_3$ alkoxyl;
$R_a$ and $R_b$ are each, independently, H or unsubstituted $C_1$-$C_3$ alkyl;
$R_1$ is $(CR_cR_d)_n$-($C_6$-$C_{10}$ aryl) or $(CR_cR_d)_n$-(5 to 10-membered heteroaryl) wherein the aryl or heteroaryl is unsubstituted or substituted with one or more halogen, hydroxyl, unsubstituted $C_1$-$C_3$ alkyl, or $C_1$-$C_3$ alkyl substituted with one or more halogen or deuterium;
$R_c$ and $R_d$ are each, independently, H, unsubstituted $C_1$-$C_3$ alkyl, or $C_1$-$C_3$ alkyl substituted with one or more halogen or deuterium;
n is 0 or 1;
each of $R_2$, $R_3$, $R_4$, $R_5$, and $R_6$, when present, is, independently, selected from the group consisting of H, halogen, deuterium, hydroxyl, cyano, unsubstituted $C_1$-$C_3$alkyl, and $C_1$-$C_3$alkyl substituted with one or more halogen or deuterium;

each of $R_7$, $R_8$, $R_9$, $R_{10}$, $R_{11}$, $R_{12}$, and $R_{13}$ is, independently, H, halogen, unsubstituted $C_1$-$C_3$ alkyl, or $C_1$-$C_3$ alkyl substituted with one or more halogen or deuterium;
or, alternatively, $R_8$ and $R_{11}$, together form an unsubstituted $C_1$-$C_3$ alkylene or a $C_1$-$C_3$ alkylene substituted with one or more halogen;
or, alternatively, $R_9$ and $R_{10}$, together form an unsubstituted $C_1$-$C_3$ alkylene or a $C_1$-$C_3$ alkylene substituted with one or more halogen;
p is 0, 1, 2, 3, or 4; and
each $R_{14}$ is, independently, selected from the group consisting of deuterium, halogen, hydroxyl, and cyano.

2. The compound of claim 1, wherein

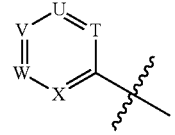

is selected from the group consisting of:

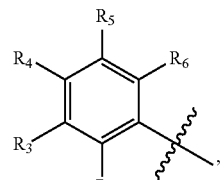 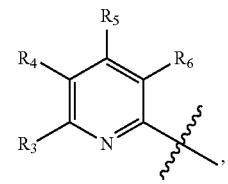

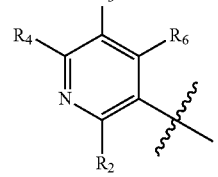 and 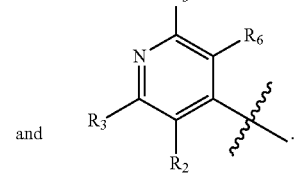.

3. The compound of claim 1, wherein

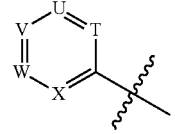

is selected from the group consisting of:

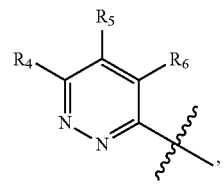, 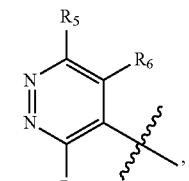,

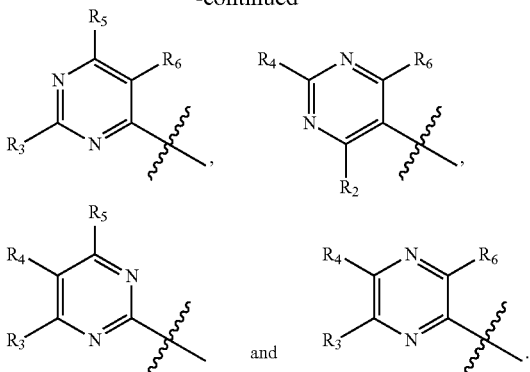

4. The compound of claim 1, wherein

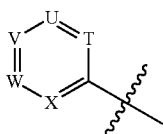

is selected from the group consisting of:

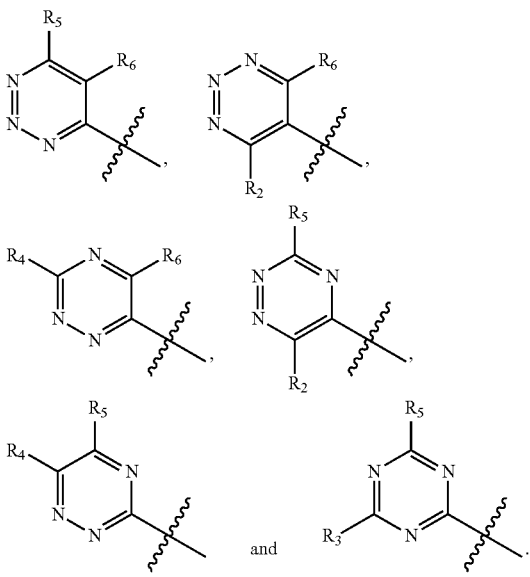

5. The compound of claim 1, wherein

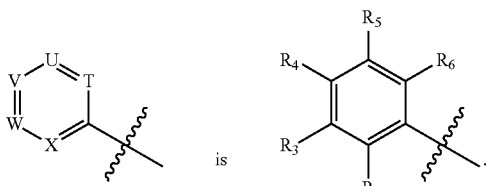

6. The compound of claim 1, wherein p is 0.
7. The compound of claim 1, wherein p is 1 or 2.
8. The compound of claim 1, wherein E is $NR_aR_b$.

9. The compound of claim 1, wherein E is $C_1$-$C_3$ alkylene-$NR_aR_b$.

10. The compound of claim 1, wherein E is unsubstituted $C_1$-$C_3$ alkyl, unsubstituted $C_2$-$C_4$ alkenyl, or unsubstituted $C_2$-$C_4$ alkynyl.

11. The compound of claim 1, wherein E is $C_1$-$C_3$ alkyl, $C_2$-$C_4$ alkenyl or $C_2$-$C_4$ alkynyl substituted with one or more halogen, hydroxyl, $C_1$-$C_3$ alkyl, or $C_1$-$C_3$ alkoxyl.

12. The compound of claim 1, wherein E is unsubstituted $C_1$-$C_3$ alkyl.

13. The compound of claim 1, wherein E is $C_1$-$C_3$ alkyl substituted with one or more halogen, hydroxyl, $C_1$-$C_3$ alkyl, or $C_1$-$C_3$ alkoxyl.

14. The compound of claim 1, wherein E is unsubstituted $C_3$-$C_8$ cycloalkyl, substituted $C_3$-$C_8$ cycloalkyl, unsubstituted $C_1$-$C_3$ alkylene-($C_3$-$C_8$ cycloalkyl), substituted $C_1$-$C_3$ alkylene-($C_3$-$C_8$ cycloalkyl), unsubstituted 4- to 10-membered heterocyclyl, substituted 4- to 10-membered heterocyclyl, unsubstituted $C_1$-$C_3$ alkylene-(4- to 10-membered heterocyclyl), or substituted $C_1$-$C_3$ alkylene-(4- to 10-membered heterocyclyl).

15. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is unsubstituted.

16. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium.

17. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is unsubstituted and further wherein n is 0.

18. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

19. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is unsubstituted and further wherein n is 1.

20. The compound of claim 1, wherein $R_1$ is $(CR_cR_d)_n$-($C_6$-$C_{10}$ aryl) or $(CR_cR_d)_n$-(5- to 10-membered heteroaryl) wherein the aryl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 1.

21. The compound of claim 1, wherein $R_1$ is $(CR_cR_d)_n$-($C_6$-$C_{10}$ aryl) wherein the aryl is unsubstituted.

22. The compound of claim 1, wherein $R_1$ is $(CR_cR_d)_n$-($C_6$-$C_{10}$ aryl) wherein the aryl is substituted with one or more halogen, hydroxyl, unsubstituted $C_1$-$C_3$ alkyl, or $C_1$-$C_3$ alkyl substituted with one or more halogen or deuterium.

23. The compound of claim 1, wherein $R_1$ is $(CR_cR_d)_n$-($C_6$-$C_{10}$ aryl) wherein the aryl is unsubstituted and further wherein n is 0.

24. The compound of claim 1, wherein $R_1$ is $(CR_cR_d)_n$-($C_6$-$C_{10}$ aryl) wherein the aryl is substituted with one or more halogen, hydroxyl, unsubstituted $C_1$-$C_3$ alkyl, or $C_1$-$C_3$ alkyl substituted with one or more halogen or deuterium and further wherein n is 0.

25. The compound of claim 1, wherein $R_1$ is $(CR_cR_d)_n$-(5- to 10-membered heteroaryl) wherein the heteroaryl is unsubstituted, $(CR_cR_d)_n$-(5- to 10-membered heteroaryl) wherein the heteroaryl is substituted with one or more halogen, hydroxyl, unsubstituted $C_1$-$C_3$ alkyl, or $C_1$-$C_3$ alkyl substituted with one or more halogen or deuterium, $(CR_cR_d)_n$-(5- to 10-membered heteroaryl) wherein the heteroaryl is unsubstituted and further wherein n is 0, or $(CR_cR_d)_n$-(5- to 10-membered heteroaryl) wherein the heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

26. The compound of claim 1, wherein $R_1$ is $(CR_cR_d)_n$-(phenyl) or $(CR_cR_d)_n$-(5- to 7-membered heteroaryl) wherein the phenyl or heteroaryl is unsubstituted.

27. The compound of claim 1, wherein $R_1$ is $(CR_cR_d)_n$-(phenyl) or $(CR_cR_d)_n$-(5- to 7-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium.

28. The compound of claim 1, wherein $R_1$ is $(CR_cR_d)_n$-(phenyl) or $(CR_cR_d)_n$-(5- to 7-membered heteroaryl) wherein the phenyl or heteroaryl is unsubstituted and further wherein n is 0.

29. The compound of claim 1, wherein $R_1$ is $(CR_cR_d)_n$-(phenyl) or $(CR_cR_d)_n$-(5- to 7-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

30. The compound of claim 1, wherein $R_1$ is $(CR_cR_d)_n$-(phenyl) or $(CR_cR_d)_n$-(6-membered heteroaryl) wherein the phenyl or heteroaryl is unsubstituted.

31. The compound of claim 1, wherein $R_1$ is $(CR_cR_d)_n$-(phenyl) or $(CR_cR_d)_n$-(6-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium.

32. The compound of claim 1, wherein $R_1$ is $(CR_cR_d)_n$-(phenyl) or $(CR_cR_d)_n$-(6-membered heteroaryl) wherein the phenyl or heteroaryl is unsubstituted and further wherein n is 0.

33. The compound of claim 1, wherein $R_1$ is $(CR_cR_d)_n$-(phenyl) or $(CR_cR_d)_n$-(6-membered heteroaryl) wherein the phenyl or heteroaryl is substituted with one or more halogen, hydroxyl, unsubstituted $C_1$-$C_3$ alkyl, or $C_1$-$C_3$ alkyl substituted with one or more halogen or deuterium and further wherein n is 0.

34. The compound of claim 1, wherein each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H.

35. The compound of claim 1, wherein each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or unsubstituted $C_1$-$C_3$ alkyl.

36. The compound of claim 1, wherein each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

37. The compound of claim 1, wherein $R_1$ is $(CR_cR_d)_n$-(5- to 10-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H.

38. The compound of claim 1, wherein $R_1$ is $(CR_cR_d)_n$-(5- to 10-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl.

39. The compound of claim 1, wherein $R_1$ is $(CR_cR_d)_n$-(5- to 10-membered heteroaryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

40. The compound of claim 1, wherein $R_1$ is $(CR_cR_d)_n$-(5- to 7-membered heteroaryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is independently H, unsubstituted $C_1$-$C_3$ alkyl, or fluorine.

41. The compound of claim 1, wherein $R_1$ is $(CR_cR_d)_n$-($C_6$-$C_{10}$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H.

42. The compound of claim 1, wherein $R_1$ is $(CR_cR_d)_n$-($C_6$-$C_{10}$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is H or unsubstituted $C_1$-$C_3$ alkyl.

43. The compound of claim 1, wherein $R_1$ is $(CR_cR_d)_n$-($C_6$-$C_{10}$ aryl), each of $R_2$, $R_3$, $R_4$, $R_5$, and $R_6$, when present, is H and each of $R_7$, $R_8$, $R_9$, $R_{10}$, $R_{11}$, $R_{12}$, and $R_{13}$ is H or fluorine.

44. The compound of claim 1, wherein $R_1$ is $(CR_cR_d)_n$-($C_6$ aryl), each of $R_2$, $R_3$, $R_4$, $R_5$, and $R_6$, when present, is H, and each of $R_7$, $R_8$, $R_9$, $R_{10}$, $R_{11}$, $R_{12}$, and $R_{13}$ is independently H, unsubstituted $C_1$-$C_3$ alkyl, or fluorine.

45. A pharmaceutical composition comprising a compound of claim 1 or a pharmaceutically acceptable salt thereof, and a pharmaceutically acceptable carrier.

46. A method of treating narcolepsy in a subject in need thereof comprising administering to the subject a compound of claim 1 or a pharmaceutically acceptable salt thereof, or a composition according to claim 45.

47. A method of treating cataplexy in a subject in need thereof comprising administering to the subject a compound of claim 1 or a pharmaceutically acceptable salt thereof, or a composition according to claim 45.

* * * * *